(12) United States Patent
Dumas et al.

(10) Patent No.: US 10,962,097 B2
(45) Date of Patent: Mar. 30, 2021

(54) CONTROL OF A LIMITED SLIP DIFFERENTIAL BASED ON A STEERING ANGLE OF A VEHICLE

(71) Applicant: BOMBARDIER RECREATIONAL PRODUCTS INC., Valcourt (CA)

(72) Inventors: Francois-Charles Dumas, Saint-Denis-de-Brompton (CA); Jean-Philippe Houle, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/648,680

(22) PCT Filed: Sep. 13, 2018

(86) PCT No.: PCT/IB2018/057021
§ 371 (c)(1),
(2) Date: Mar. 19, 2020

(87) PCT Pub. No.: WO2019/058227
PCT Pub. Date: Mar. 28, 2019

(65) Prior Publication Data
US 2020/0256444 A1 Aug. 13, 2020

Related U.S. Application Data

(60) Provisional application No. 62/586,427, filed on Nov. 15, 2017, provisional application No. 62/560,591, filed on Sep. 19, 2017.

(51) Int. Cl.
*F16H 48/22* (2006.01)
*F16H 59/46* (2006.01)
(Continued)

(52) U.S. Cl.
CPC ............. *F16H 48/22* (2013.01); *F16H 59/46* (2013.01); *F16H 59/50* (2013.01); *F16H 48/08* (2013.01);
(Continued)

(58) Field of Classification Search
CPC .............. F16H 59/58; F16H 2048/204; F16H 2048/205; F16H 48/22; F16H 59/46; F16H 59/50
See application file for complete search history.

(56) References Cited

U.S. PATENT DOCUMENTS

| 4,014,561 A | 3/1977 | Tomiya et al. |
| 4,644,823 A | 2/1987 | Mueller |

(Continued)

FOREIGN PATENT DOCUMENTS

| DE | 10346113 A1 | 8/2012 |
| DE | 102014225490 A1 | 6/2015 |

OTHER PUBLICATIONS

International Search Report of PCT/IB2018/057021; Blaine Copenheaver; dated Dec. 27, 2018.
(Continued)

*Primary Examiner* — Stacey A Fluhart
(74) *Attorney, Agent, or Firm* — BCF LLP

(57) ABSTRACT

A limited slip differential (LSD) transfers a torque from an engine to left and right wheels of a vehicle. A current angle of a steering device is determined. Rotational speeds of 5 the left and right driven wheels are also determined. A current wheel slip of is calculated as a difference between the rotational speeds of the left and right wheels. Maximum and minimum allowed wheel slips are calculated as a function of the current steering angle. The LSD is controlled so that the current wheel slip stays in a range between the maximum and minimum allowed wheel slips. To this end, the LSD is (Continued)

loaded if the wheel slip falls outside of the range 0 between the maximum and minimum allowed wheel slips.

20 Claims, 25 Drawing Sheets

(51) Int. Cl.
    *F16H 59/50*     (2006.01)
    *F16H 48/08*     (2006.01)
    *F16H 48/20*     (2012.01)

(52) U.S. Cl.
    CPC .. *F16H 2048/205* (2013.01); *F16H 2059/506* (2013.01)

(56) References Cited

U.S. PATENT DOCUMENTS

| | | | |
|---|---|---|---|
| 4,679,463 A | 7/1987 | Ozaki et al. | |
| 4,741,407 A | 5/1988 | Torii et al. | |
| 4,776,234 A | 10/1988 | Shea | |
| 4,776,235 A | 10/1988 | Gleasman et al. | |
| 4,874,059 A * | 10/1989 | Kasegawa | B60K 23/04 180/249 |
| 4,895,217 A * | 1/1990 | Hueckler | B60K 17/3462 180/233 |
| 4,953,654 A | 9/1990 | Imaseki et al. | |
| 4,984,649 A | 1/1991 | Leiber et al. | |
| 5,020,391 A | 6/1991 | Aoki et al. | |
| 5,172,787 A * | 12/1992 | Kobayashi | B60K 23/04 180/197 |
| 5,208,755 A * | 5/1993 | Tezuka | B60K 23/04 180/197 |
| 5,301,766 A * | 4/1994 | Momiyama | B60K 23/04 180/197 |
| 5,332,059 A * | 7/1994 | Shirakawa | B60K 23/04 180/197 |
| 5,479,348 A * | 12/1995 | Sasaki | B60K 23/04 180/197 |
| 6,092,881 A | 7/2000 | Schantz et al. | |
| 6,398,686 B1 | 6/2002 | Irwin | |
| 6,857,982 B2 | 2/2005 | Tomari et al. | |
| 6,887,177 B1 | 5/2005 | Yamada | |
| 7,059,991 B2 | 6/2006 | Puiu | |
| 7,278,945 B2 | 10/2007 | Hamrin et al. | |
| 7,325,636 B2 * | 2/2008 | Yeoman | B62D 9/002 180/419 |
| 7,810,601 B2 | 10/2010 | Hamrin et al. | |
| 9,046,160 B2 * | 6/2015 | Hoff | F16H 48/22 |
| 9,132,730 B2 * | 9/2015 | Hoeck | B60K 23/04 |
| 9,309,957 B2 | 4/2016 | Creager | |
| 9,321,480 B2 | 4/2016 | Suzuki et al. | |
| 2006/0011405 A1 | 1/2006 | Bayer et al. | |
| 2006/0162981 A1 | 7/2006 | Kurosawa et al. | |
| 2007/0184929 A1 | 8/2007 | Piyabongkarn et al. | |
| 2011/0082634 A1 | 4/2011 | Povirk et al. | |
| 2011/0295474 A1 | 12/2011 | Ma et al. | |
| 2012/0029779 A1 | 2/2012 | Dickinson et al. | |
| 2016/0039403 A1 | 2/2016 | Kato | |
| 2017/0089439 A1 | 3/2017 | Monticello | |
| 2019/0337497 A1 | 11/2019 | Scheuerell et al. | |

OTHER PUBLICATIONS

English translation of DE102014225490A1 provided by the ISA/US with the International Search Report of PCT/IB2018/057028.
English translation of DE10346113A1 provided by the ISA/US with the International Search Report of PCT/IB2018/057029.

* cited by examiner

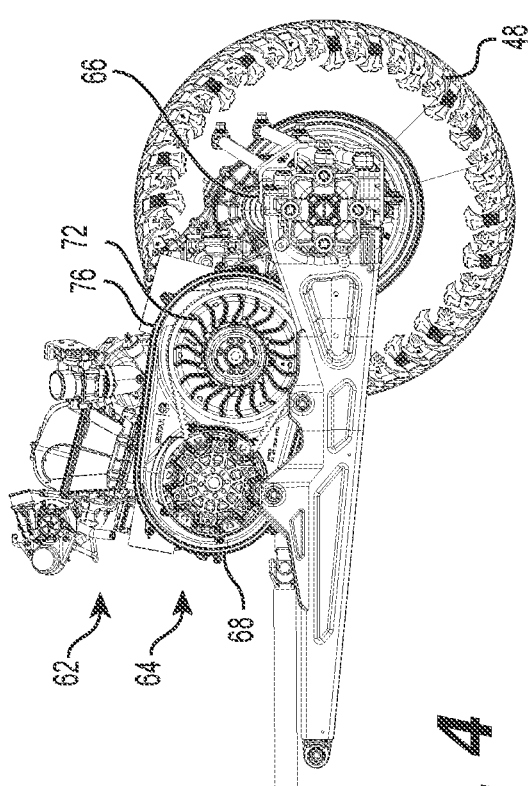
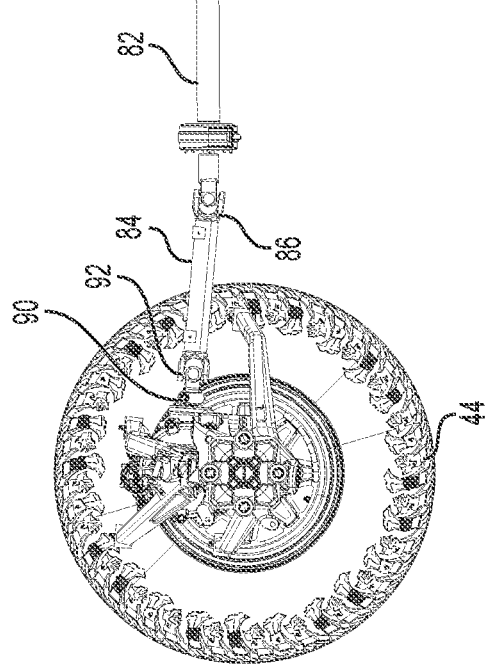
FIG. 4
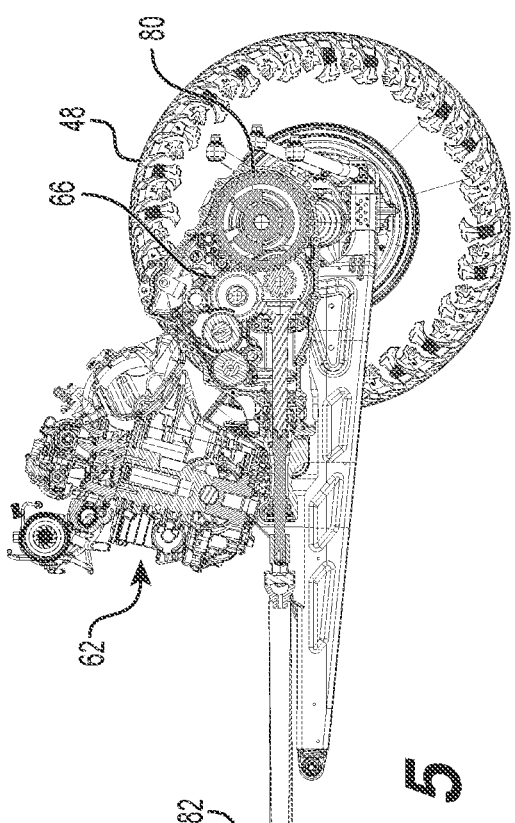
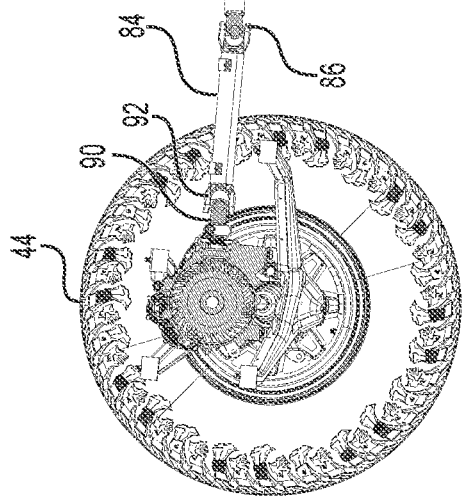
FIG. 5

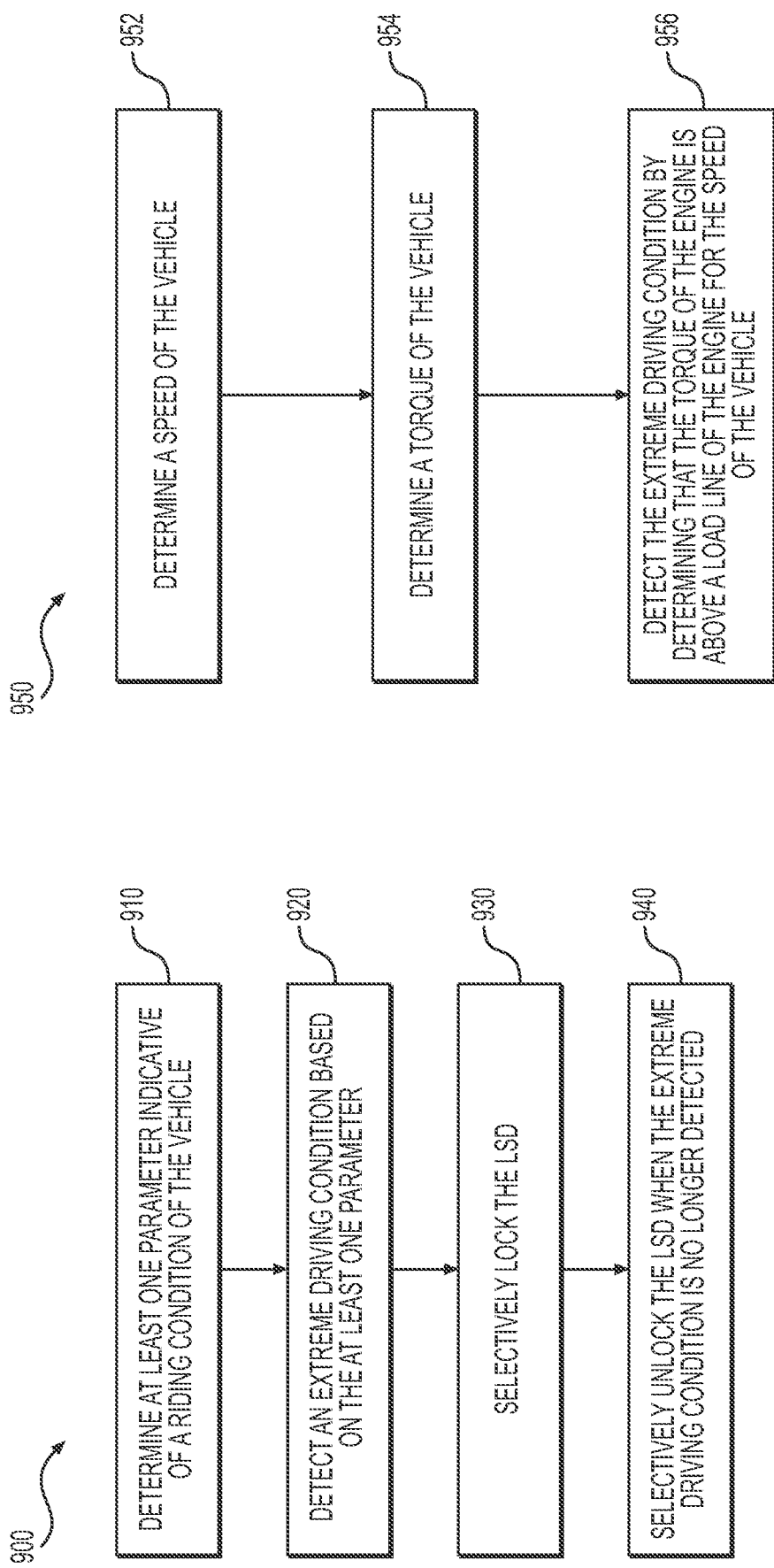

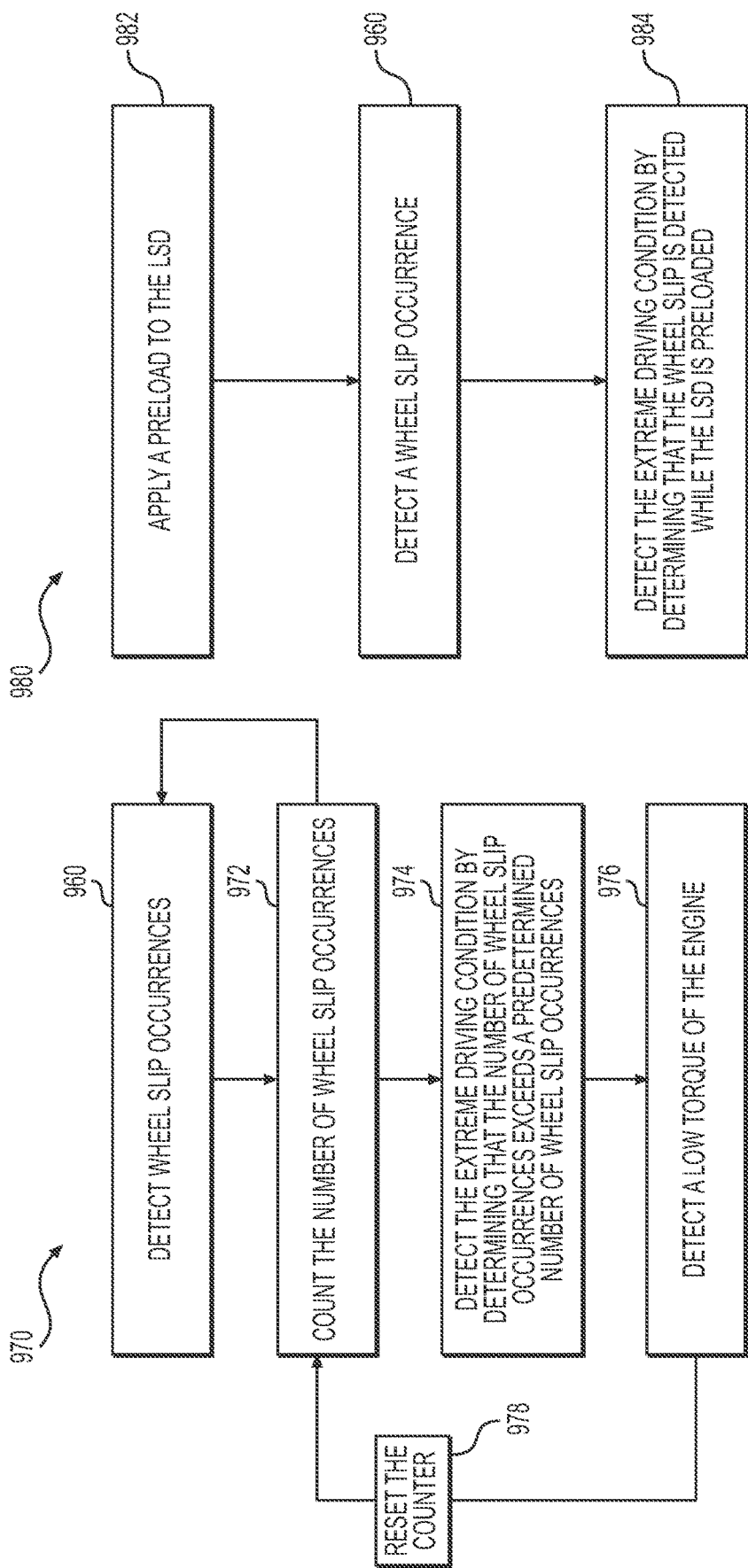

CONTROL OF A LIMITED SLIP DIFFERENTIAL BASED ON A STEERING ANGLE OF A VEHICLE

CROSS-REFERENCE

The present application claims priority from U.S. Provisional Patent Application No. 62/560,591, filed on Sep. 19, 2017 and from United States Provisional Patent Application No. 62/586,427, filed on Nov. 15, 2017, the entirety of which being incorporated herein by reference.

FIELD OF TECHNOLOGY

The present technology relates to a control of a limited slip differential based on a steering angle of a vehicle, to a method of controlling a limited slip differential, and to a vehicle including the limited slip differential.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain and to operate on various surfaces including, but not limited to, sand, dirt and mud. These conditions represent unique challenges not typically encountered when designing on-road vehicles such as cars. One such challenge lies in the provision of torque to each driving wheel under various conditions such as amount of steering, vehicle orientation when climbing a hill, rate of acceleration, slippery or rocky terrain, and the like.

A differential is commonly used to receive torque from a driving shaft and to redirect the torque via half-shafts toward two driving wheels of the vehicle. The differential allows the half-shafts and corresponding wheels to rotate at distinct rates, as it is desirable to allow the inside wheel to rotate at a somewhat lower rate than the outside wheel when the vehicle is in a turn. However, when one of the wheels is on slippery terrain, the differential may direct all torque on that one wheel, which may spin unnecessarily without allowing the vehicle to move, no torque being delivered on the other wheel. A limited slip differential (LSD) is conventionally used to limit the rotational speed difference between left and right driven wheels of a wheel set. In a vehicle equipped with a LSD, should the left wheel (for example) be on a patch of low friction terrain, it will only spin to a small extent before the LSD starts transmitting torque on the opposite right wheel. As the right wheel may be on terrain providing better traction, this allows the vehicle to move until both wheels are on terrain providing better traction.

Conventional LSDs suffer from a number of operational limitations.

A conventional LSD may lock both wheels of the wheel set as soon as there is some rotational speed difference between the two wheels. This may cause the LSD to lock both wheels when the vehicle is in a curve even though both wheels may have good traction at the time. While locking the LSD may prevent wheel spin, steering of the vehicle becomes difficult when the LSD is locked because a locked LSD acts counter to natural speed differences between the slower wheel on the inside of a curve and the faster wheel on the outside of the curve.

To prevent locking of the LSD during every turn of the vehicle, the LSD may be configured to allow a fairly large rotational speed difference between the two wheels of the axis. While this design may prevent unnecessary locking of the LSD at every turn, it may delay the transfer of torque to the wheel having better traction when the opposite wheel is on slippery terrain. Such delays in the locking of the LSD may render the vehicle difficult to control on slippery terrain and lead to a negative driver experience. This lack of proactivity of the conventional LSD may even cause the vehicle to remain stuck on low friction terrain, such as when on mud or ice, or lose momentum when climbing on rocky terrain. Moreover, delays in the locking of the LSD may cause important spinning of the driven wheels upon heavy acceleration from a standing start.

When a vehicle is travelling in deep mud or in similar slippery driving conditions, the torque being applied to the wheels may change frequently and may change by a large amount. This could cause the LSD to constantly lock and unlock again. This behavior of the LSD is not only inefficient, but may be detrimental to the driving experience while potentially causing premature damage to the LSD. Some LSDs have a manual locking mode that may be used to overcome this constant locking and unlocking problem. The user of the vehicle may manually lock the LSD, for example when the user predicts that the vehicle is about to encounter a mud patch. The LSD remains locked until unlocked by the user. While this may help preventing that the vehicle becomes stuck in the mud patch, it may render the vehicle difficult to drive if the LSD is still manually locked when better surface conditions are met again, steering becoming difficult for example. In some off-road paths, the user might need to frequently lock and unlock again the LSD. The vehicle may remain stuck in a mud patch if the user does not react in good time to manually lock the LSD when slippery driving conditions are met.

There is therefore a desire for a control of limited slip differentials that addresses the above issues.

SUMMARY

It is an object of the present technology to ameliorate at least some of the inconveniences present in the prior art.

The present technology provides a limited slip differential (LSD) controlled according to a steering angle of a vehicle. The LSD is controlled to maintain within a predetermined range a relative speed difference of two driven wheels connected to the LSD, this difference being called a wheel slip. In the context of the present disclosure, the wheel slip may for example be calculated as the speed of the left wheel minus the speed of the right wheel. The wheel slip is positive when the left wheel rotates faster than the right wheel and negative when the left wheel rotates at a slower rate than the right wheel. The wheel slip may as well be calculated as the speed of the right wheel minus the speed of the left wheel. The present technology relates to the relative speed difference between the two driven wheels. A current angle of a steering device is determined. Rotational speeds of the left and right driven wheels are also determined. A maximum allowed wheel slip and a minimum allowed wheel slip are calculated as a function of the current steering angle. A current wheel slip is calculated as a difference between the rotational speeds of the left and right driven wheels. The LSD is controlled so that the current wheel slip remains within a range defined by the maximum and minimum allowed wheel slips. The maximum and minimum allowed wheel slips may be calculated according to a slip margin and according to an expected wheel slip that, in turn, is calculated based on the current steering angle, on a configuration of the vehicle as defined by a slip ratio, and on a rotational speed of the wheels connected to the LSD.

According to one aspect of the present technology, there is provided a method of controlling a limited slip differential (LSD) of a vehicle, the vehicle having a steering device, the LSD, and left and right driven wheels operably connected to the LSD. The method comprises: determining rotational speeds of the left and right driven wheels; calculating a current wheel slip as a rotational speed difference between one of the left and right driven wheels and the other one of the left and right driven wheels; determining a current angle of the steering device; calculating a maximum allowed wheel slip and a minimum allowed wheel slip as a function of the current angle of the steering device; detecting that the current wheel slip is outside a range between the maximum and minimum allowed wheel slips; and in response to detecting that the current wheel slip is outside the range between the maximum and minimum allowed wheel slips, loading the LSD.

In some implementations of the present technology, calculating the maximum allowed wheel slip and the minimum allowed wheel slip as a function of the current angle of the steering device comprises: determining an average of the rotational speeds of the left and right driven wheels; calculating an expected wheel slip based on: a ratio between the current angle of the steering device and a maximum steering angle, the average of the rotational speeds of the left and right driven wheels, and a slip ratio for the vehicle; while the LSD is not loaded, calculating the maximum allowed wheel slip by adding a slip margin to the expected wheel slip; and while the LSD is not loaded, calculating the minimum allowed wheel slip by subtracting the slip margin from the expected wheel slip.

In some implementations of the present technology, the slip margin is selected based on the average of the rotational speeds of the left and right driven wheels.

In some implementations of the present technology, the method further comprises, while the LSD is loaded: calculating the maximum allowed wheel slip as the greater of: the slip margin, and a sum of the expected wheel slip and the slip margin; and calculating the minimum allowed wheel slip as the lesser of: zero minus the slip margin, and the expected wheel slip minus the slip margin.

In some implementations of the present technology, a loading level of the LSD is calculated based on a magnitude of an excess of the current wheel slip in relation to the range between the maximum and minimum allowed wheel slips.

In some implementations of the present technology, the method further comprises, after loading the LSD in response to detecting that the current wheel slip is outside the range between the maximum and minimum allowed wheel slips: detecting that the current wheel slip has returned within the range between the maximum and minimum allowed wheel slips; and in response to detecting that the current wheel slip has returned within the range between the maximum and minimum allowed wheel slips, unloading the LSD.

In some implementations of the present technology, unloading the LSD comprises gradually unloading the LSD.

In some implementations of the present technology, loading the LSD comprises compressing a clutch of the LSD to reduce the rotational speed difference between the left and right driven wheels.

In some implementations of the present technology, compressing the clutch of the LSD comprises using an electric motor to drive a gear set and a ball ramp to apply a torque on the clutch.

In some implementations of the present technology, compressing the clutch of the LSD further comprises using a solenoid to lock the gear set.

In some implementations of the present technology, the method further comprises, in response to detecting that the current wheel slip is outside the range between the maximum and minimum allowed wheel slips, calculating an initial torque for application to the clutch; following the application of the initial torque on the clutch: increasing the torque applied on the clutch if the current wheel slip is still outside the range between the maximum and minimum allowed wheel slips, decreasing the torque applied on the clutch if the current wheel slip falls within the range between the maximum and minimum allowed wheel slips, and terminating the loading to the LSD when the torque applied on the clutch falls to zero.

According to another aspect of the present technology, there is provided a differential assembly for use in a vehicle having a steering device and left and right driven wheels. The differential assembly comprises: a limited slip differential (LSD) operatively connectable to a driveshaft and to the left and right driven wheels, the LSD being adapted for transferring torque from the driveshaft to the left and right driven wheels; a steering angle sensor operatively connectable to the steering device; wheel speed sensors operatively connectable to the left and right driven wheels; and a control unit operatively connected to the LSD, to the steering angle sensor and to the wheel speed sensors, the control unit being adapted for: calculating, based on measurements of rotational speeds of the left and right driven wheels received from the wheel speed sensors, a current wheel slip as a rotational speed difference between one of the left and right driven wheels and the other one of the left and right driven wheels, calculating, based on a measurement received from the steering angle sensor, a maximum allowed wheel slip and a minimum allowed wheel slip as a function of a current angle of the steering device; detect that the current wheel slip is outside a range between the maximum and minimum allowed wheel slips, and in response to detecting that the current wheel slip is outside the range between the maximum and minimum allowed wheel slips, controlling loading of the LSD.

In some implementations of the present technology, the differential assembly further comprises an electric motor, the control unit commanding the electric motor to load the LSD.

In some implementations of the present technology, the LSD further comprises a compressible clutch, the electric motor loading the LSD by applying a torque on the clutch.

In some implementations of the present technology, the LSD further comprises a gear set and a ball ramp, the gear set being adapted for transferring the torque from the electric motor to the ball ramp for compressing the clutch.

In some implementations of the present technology, the differential assembly further comprises a solenoid having a tooth adapted for engaging the gear set when the solenoid is energized, the control unit being further adapted for controlling the solenoid for locking the LSD.

In some implementations of the present technology, the control unit is further adapted for controlling the LSD to apply a maximum load before locking the LSD.

In some implementations of the present technology, the control unit comprises: an input port adapted for receiving measurements from the steering angle sensor and from the wheel speed sensors; an output port adapted for forwarding control commands to the LSD; and a processor operatively connected to the input port and to the output port, the processor being adapted for: calculating the maximum and minimum allowed wheel slips, calculating the current wheel slip, detecting that the current wheel slip is outside the range between the maximum and minimum allowed wheel slips, and in response to detecting that the current wheel slip is outside the range between the maximum and minimum allowed wheel slips, causing the output port to forward a control command for loading the LSD.

In some implementations of the present technology, the control unit further comprises a memory storing configuration information for controlling the LSD; the processor is operatively connected to the memory; and the configuration information comprises: a maximum steering angle for the vehicle, a slip ratio for the vehicle, and a slip mapping table of relations between values of the slip margin speed values for the left and right driven wheels.

In some implementations of the present technology, the processor is further adapted for: determining an average of the rotational speeds of the left and right driven wheels; calculating an expected wheel slip based on: a ratio between the current angle of the steering device and a maximum steering angle, the average of the rotational speeds of the left and right driven wheels, and a slip ratio for the vehicle; reading from the slip mapping table a slip margin for the average of the rotational speeds of the left and right driven wheels; while the LSD is not loaded, calculating the maximum allowed wheel slip by adding the slip margin to the expected wheel slip; and while the LSD is not loaded, calculating the minimum allowed wheel slip by subtracting the slip margin from the expected wheel slip.

In some implementations of the present technology, the processor is further adapted for, while the LSD is loaded: calculating the maximum allowed wheel slip as the greater of: the slip margin, and a sum of the expected wheel slip and the slip margin; and calculating the minimum allowed wheel slip as the lesser of: zero minus the slip margin, and the expected wheel slip minus the slip margin.

In some implementations of the present technology, the processor is further adapted for: calculating a loading level of the LSD based on a magnitude of an excess of the current wheel slip in relation to the range between the maximum and minimum allowed wheel slips; and configuring the control command to load the LSD according to the calculated loading level.

In some implementations of the present technology, the processor is further adapted for, after causing the output port to forward the control command for loading the LSD: causing the output port to forward a control command to increase the load to the LSD if the current wheel slip is still outside the range between the maximum and minimum allowed wheel slips; and causing the output port to forward a control command to decrease the load to the LSD if the current wheel slip falls within the range between the maximum and minimum allowed wheel slips.

According to a further aspect of the present technology, there is provided a vehicle, comprising: a frame; a front suspension assembly connected to the frame; a rear suspension assembly connected to the frame; a left driven wheel and a right driven wheel connected to one of the front and rear suspension assemblies; at least one other wheel connected to an other one of the front and rear suspension assemblies; a steering device operatively connected to one of both driven wheels and the at least one other wheel; an engine connected to the frame; a transmission operatively connected to the engine for receiving torque from the engine; a driveshaft operatively connected to the transmission for transferring torque from the transmission to the left and right driven wheels; and a differential assembly. The differential assembly comprises: a limited slip differential (LSD) operatively connected to the driveshaft and to the left and right driven wheels, the LSD being adapted for transferring torque from the driveshaft to the left and right driven wheels; a steering angle sensor operatively connectable to the steering device; wheel speed sensors operatively connectable to the left and right driven wheels; and a control unit operatively connected to the LSD, to the steering angle sensor and to the wheel speed sensors, the control unit being adapted for: calculating, based on measurements of rotational speeds of the left and right driven wheels received from the wheel speed sensors, a current wheel slip as a rotational speed difference between one of the left and right driven wheels and the other one of the left and right driven wheels, calculating, based on a measurement received from the steering angle sensor, a maximum allowed wheel slip and a minimum allowed wheel slip as a function of a current angle of the steering device; detect that the current wheel slip is outside a range between the maximum and minimum allowed wheel slips, and in response to detecting that the current wheel slip is outside the range between the maximum and minimum allowed wheel slips, controlling loading of the LSD.

In some implementations of the present technology, the vehicle further comprises: a transaxle for transferring torque from the transmission to the at least one other wheel; and a selector adapted for selectively operatively connecting the LSD to the driveshaft.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is a left side elevation view of a powertrain of the vehicle of FIG. 1;

FIG. 5 is a left side cutaway view of the powertrain of FIG. 4;

FIGS. 19a to 19e provide logic diagrams showing operations of a method for controlling a limited slip differential based on driving conditions;

DETAILED DESCRIPTION

Generally stated, the present technology provides control of a limited slip differential (LSD) mounted on an axle of a vehicle, this control being based at least in part on measurements provided by various sensors to a control unit operatively connected to the LSD.

The present technology will be described with respect to a four-wheel, off-road vehicle having two side-by-side seats and a steering wheel. However, it is contemplated that at least some aspects of the present technology may apply to other types of vehicles such as, but not limited to, off-road vehicles having a handlebar and a straddle seat (i.e. an all-terrain vehicle (ATV)), off-road vehicles having more or less than four wheels, and on-road vehicles having three or more wheels and having one or more seats.

Description of the Vehicle

Figure 1:
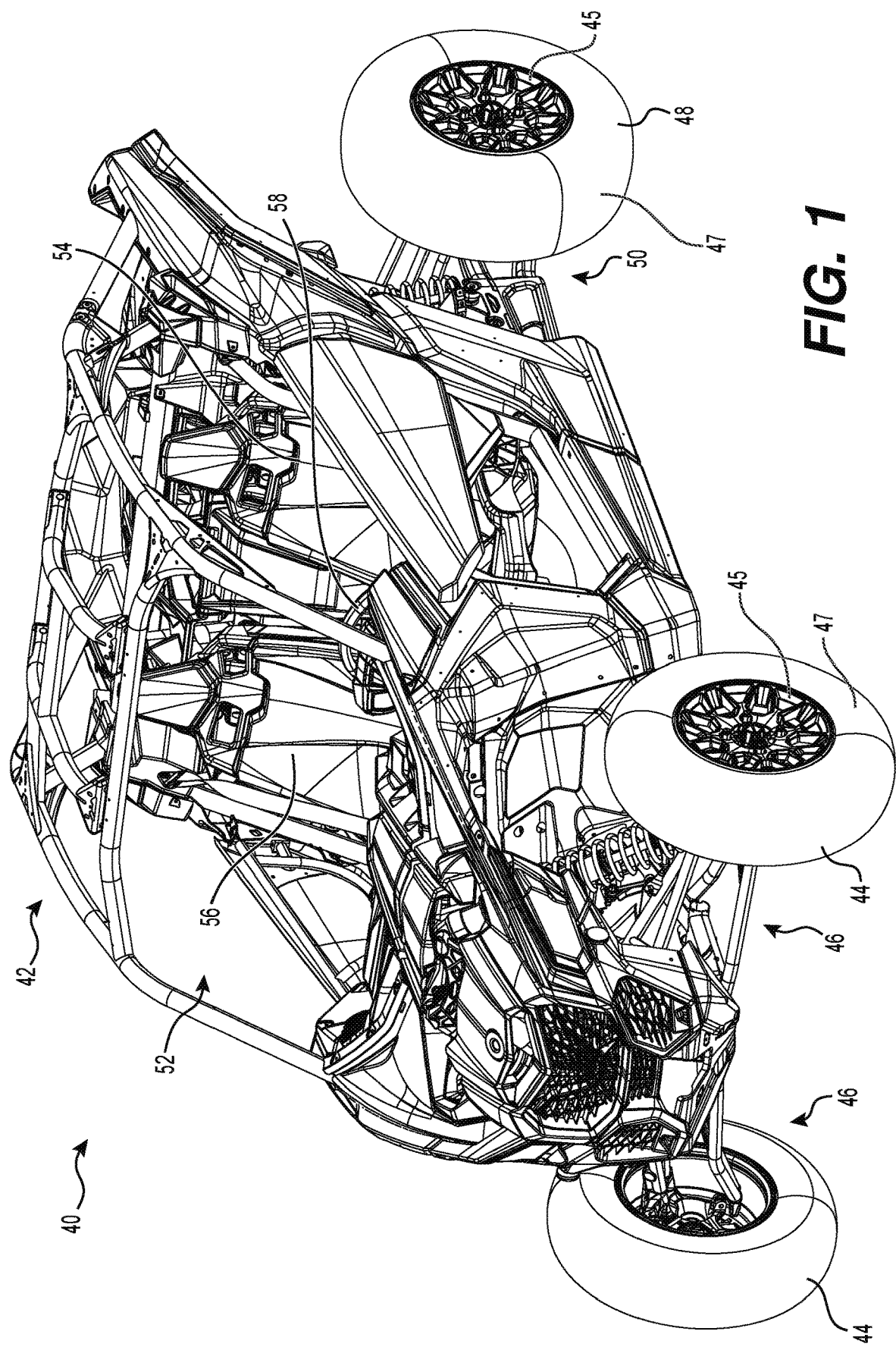
FIG. 1 is a perspective view of an off-road vehicle taken from a front, left side.

The general features of the off-road vehicle 40 will be described with respect to FIGS. 1, 2 and 3. The vehicle 40 has a frame 42, two front wheels 44 connected to a front of the frame 42 by a front suspension assembly 46 and two rear wheels 48 connected to the frame 42 by a rear suspension assembly 50. Each one of the front and rear wheels 44, 48 has a rim 45 and a tire 47. The rims 45 and tires 47 of the front wheels 44 may differ in size from the rims and tires of the rear wheels 48. In addition, although four wheels 44, 48 are illustrated in the Figures, the vehicle 40 could include more or less than four wheels 44, 48.

The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. It is also contemplated that the vehicle 40 could include a single seat for the driver, or a larger number of seats, or a bench accommodating the driver and at least one passenger. The driver operates the steering wheel 58 from the driver seat 54 to control an angle of the front wheels 44.

Figure 2:
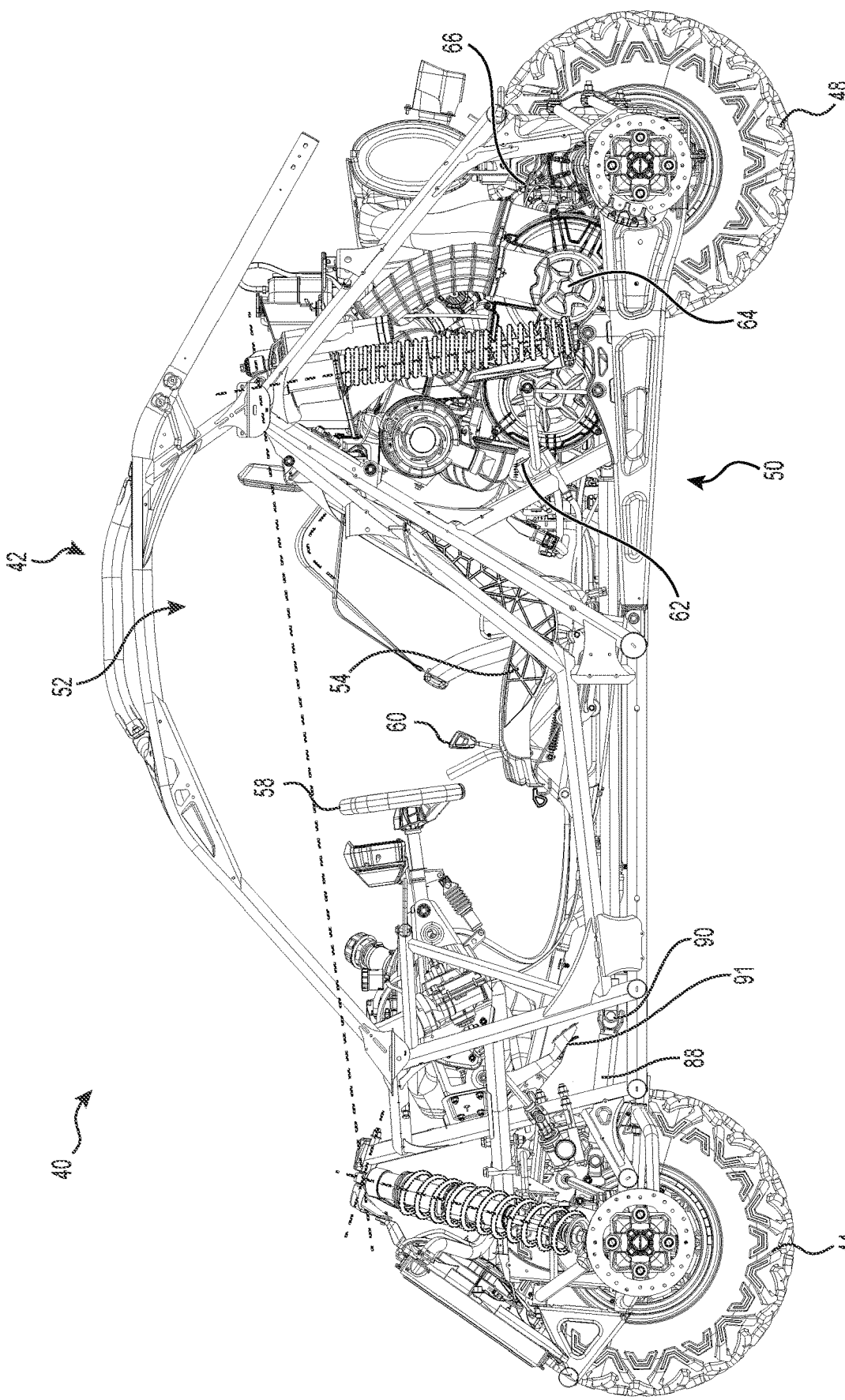
FIG. 2 is a left side elevation view of the vehicle of FIG. 1.
Figure 3:
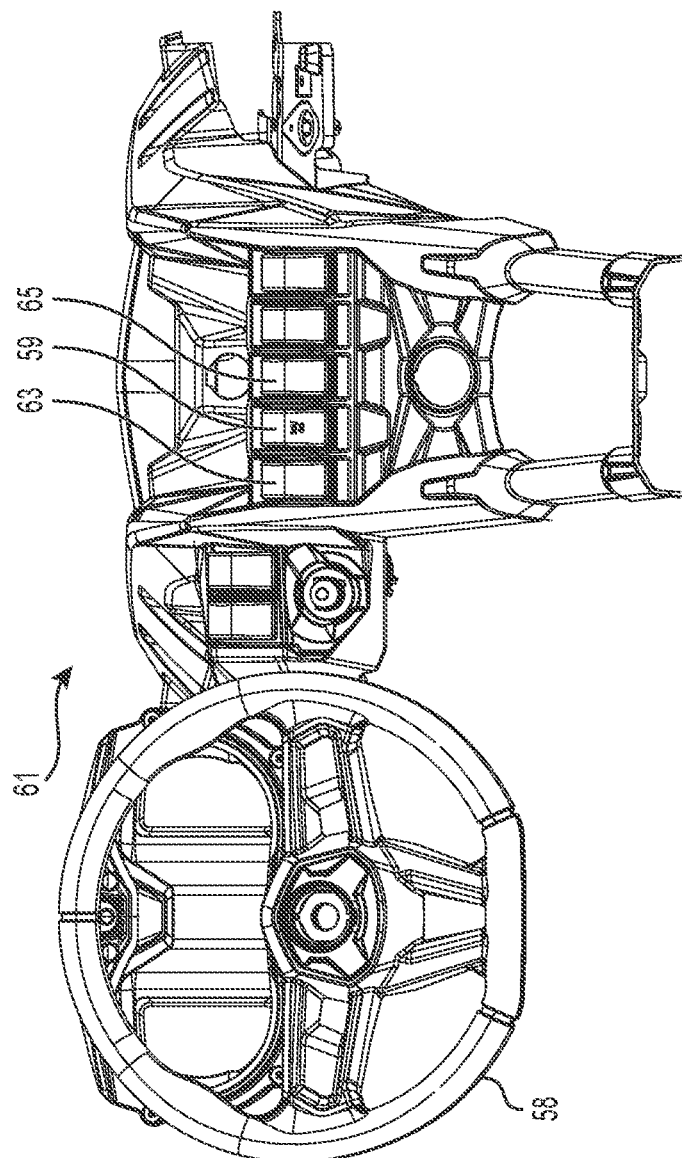
FIG. 3 is a rear elevation view of an instrument panel of the vehicle of FIG. 1.

As can be seen in FIG. 2, an engine 62 is connected to the frame 42 in a rear portion of the vehicle 40. The engine 62 is connected to a continuously variable transmission (CVT) 64 disposed on a left side of the engine 62. The CVT 64 is operatively connected to a transaxle 66 to transmit torque from the engine 62 to the transaxle 66. The transaxle 66 is disposed behind the engine 62. The transaxle 66 is operatively connected to the front and rear wheels 44, 48 to propel the vehicle 40. The engine 62, the CVT 64 and the transaxle 66 are supported by the frame 42. A variant of the vehicle 40 having another transmission type is also contemplated.

The transaxle 66 is mechanically connected to a shifter 60 disposed laterally between the two seats 54, 56. The shifter 60 allows the driver to select from a plurality of combinations of engagement of gears of the transaxle 66, commonly referred to as gears. In the present implementation, the shifter 60 allows the driver to select between a reverse gear, two forward gears (high and low) and a neutral position in which the transaxle 66 does not transmit torque to the wheels 44, 48. It is contemplated that other types of connections between the shifter 60 and the transaxle 66 could be used.

In an implementation, operative connection of the transaxle 66 to the front wheels 44 is selectable, the selection being made using a drive mode selector provided in the vicinity of the driver. The drive mode selector may comprise a toggle switch 59 (FIG. 3) mounted on an instrument panel 61 of the vehicle 40. The toggle switch 59 has two (2) positions for selecting a two-wheel mode or an all-wheel mode for the vehicle 40. The drive mode selector may also comprise a toggle switch 63 having two (2) positions for manually locking and unlocking a limited slip differential (shown on later Figures). The drive mode selector may further comprise a toggle switch 65 having four (4) positions for selecting one of a normal mode, a trail active mode, a mud mode and a rock crawling mode. It is contemplated that the toggle switch 65 may only permit selection of one or two of the trail active mode, the mud mode and the rock crawling mode in a vehicle that only has one or two of these modes available. Use of a rotary knob for selecting one of the various modes and use of distinct switches for turning on and off each of the trail active mode, mud mode and rock crawling mode are also contemplated. It is also contemplated to the rotary knob or additional toggle switches may be used to select other modes, for example a sand mode, a snow mode, and the like.

Figure 6:
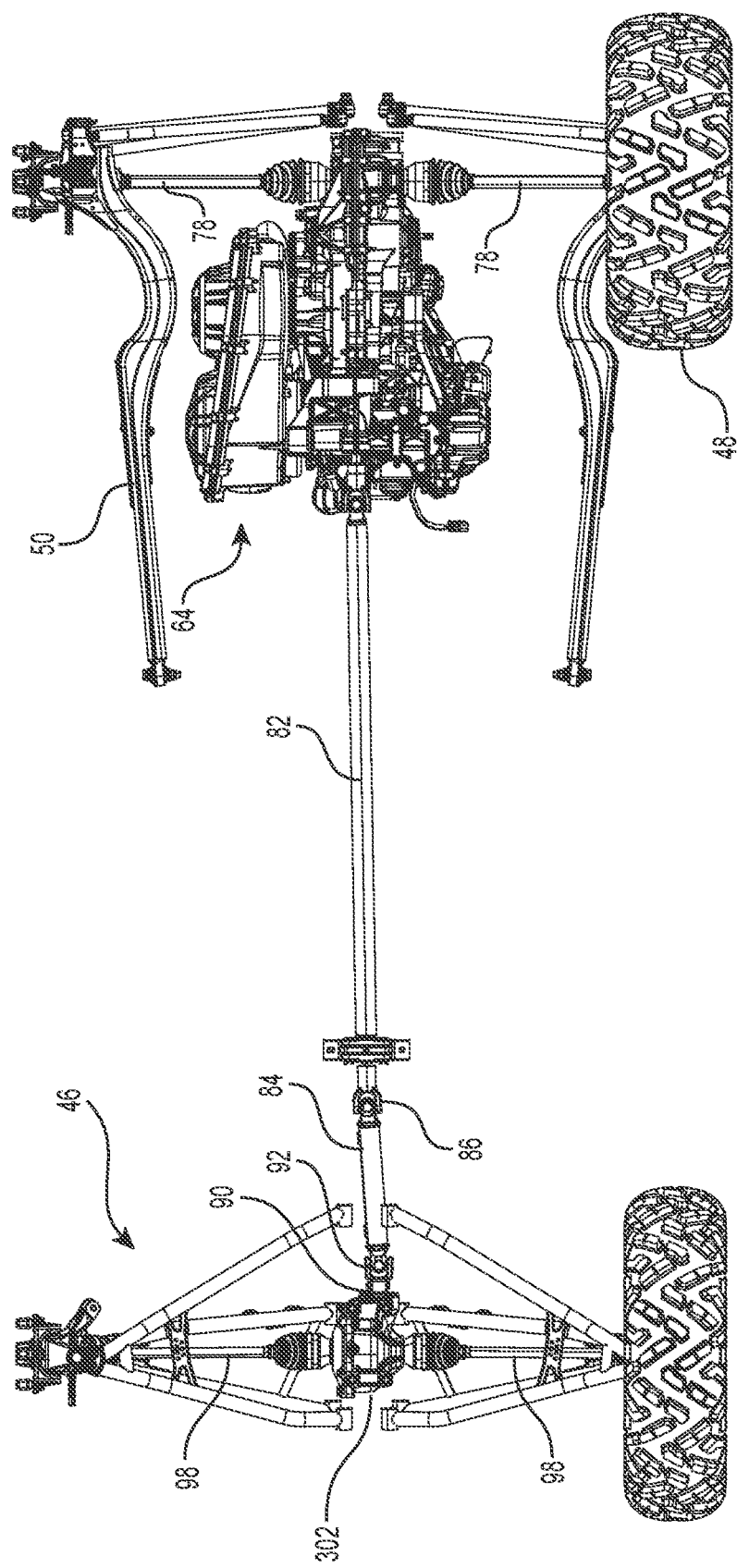
FIG. 6 is a bottom plan view of the powertrain FIG. 4.

Referring to FIGS. 4 to 6, the CVT 64 has a driving pulley 68 connected to and driven by the engine 62 as well as a driven pulley 72 mounted to the transaxle 66. A belt 76 transmits a torque imparted on the driving pulley 64 by the engine 62 to the driven pulley 72 that in turn transmits the torque to the transaxle 66. The driving pulley 68 and the driven pulley 72 permit a continuously variable transmission ratio by virtue of the opening or closing of opposed conical side faces of one or more of the pulleys. It should be understood that alternative transmission configurations may be used.

In the vehicle 40, the transaxle 66 transmits the torque applied thereon by the driven pulley 72 to drive the rear wheels 48, when the drive mode selector is in a two-wheel mode, or to drive the front and rear wheels 44, 48, when the drive mode selector in an all-wheel mode. The transaxle applies a torque to the rear wheels 48 via corresponding half-shafts 78. To this end, the transaxle 66 includes a differential 80 operatively connected to the half shafts 78. Instead of the differential 80, use of a spool gear is also contemplated. When the drive mode selector is in the all-wheel mode, the transaxle 66 applies a portion of the torque on the half shafts 78, and also applies another portion of the torque on a front driveshaft 82. A front end of the front driveshaft 82 is connected to another driveshaft 84 via a universal joint 86. A front end of the driveshaft 84 drives an input shaft 90 of a limited slip differential (LSD) 302 via another universal joint 92.

The LSD 302 is operatively connected to and drives left and right front half-shafts 98. Laterally outward ends of the front half-shafts 98 are operatively connected to and drive the front wheels 44.

Description of an Example of the Limited Slip Differential Assembly

Figure 7:
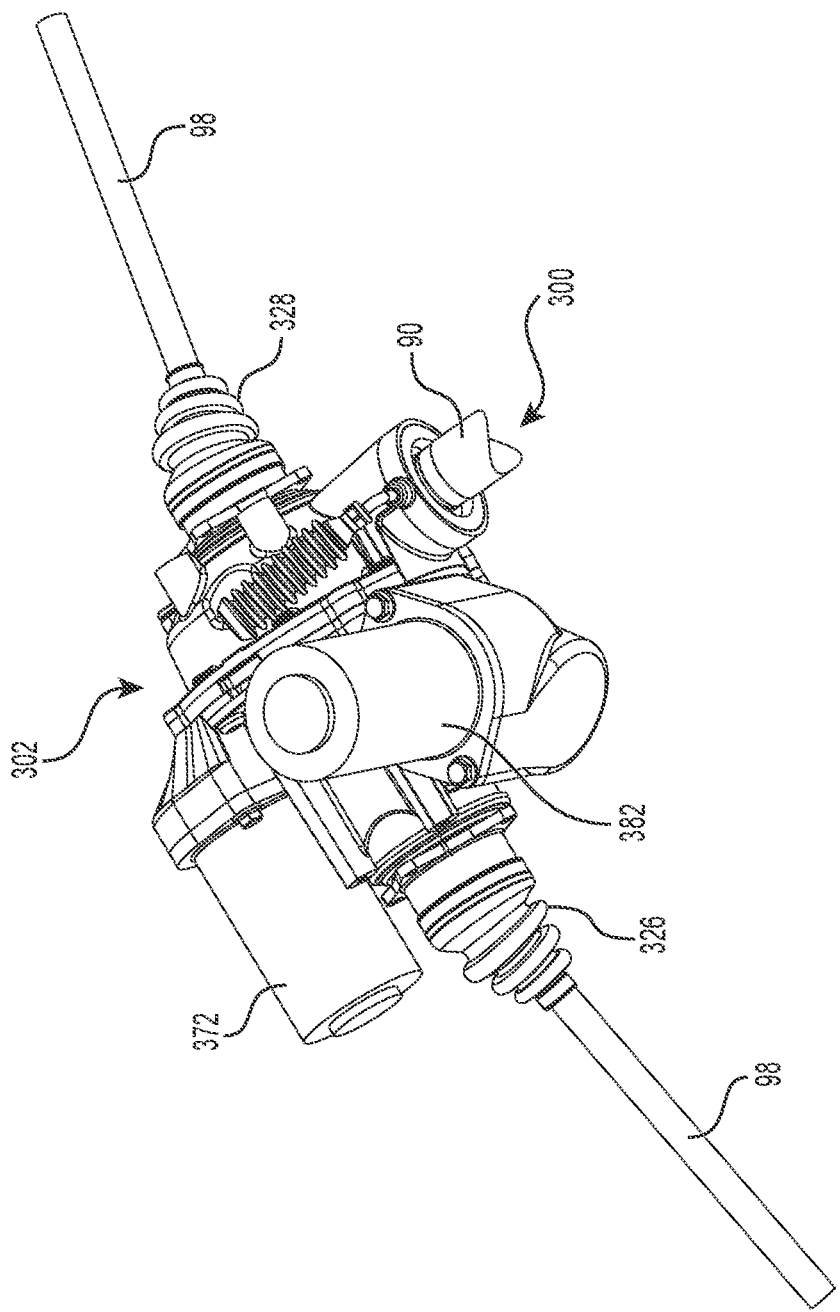
FIG. 7 is a perspective view, taken from a rear, left side, of a front differential assembly of the powertrain of FIG. 4.
Figure 8:
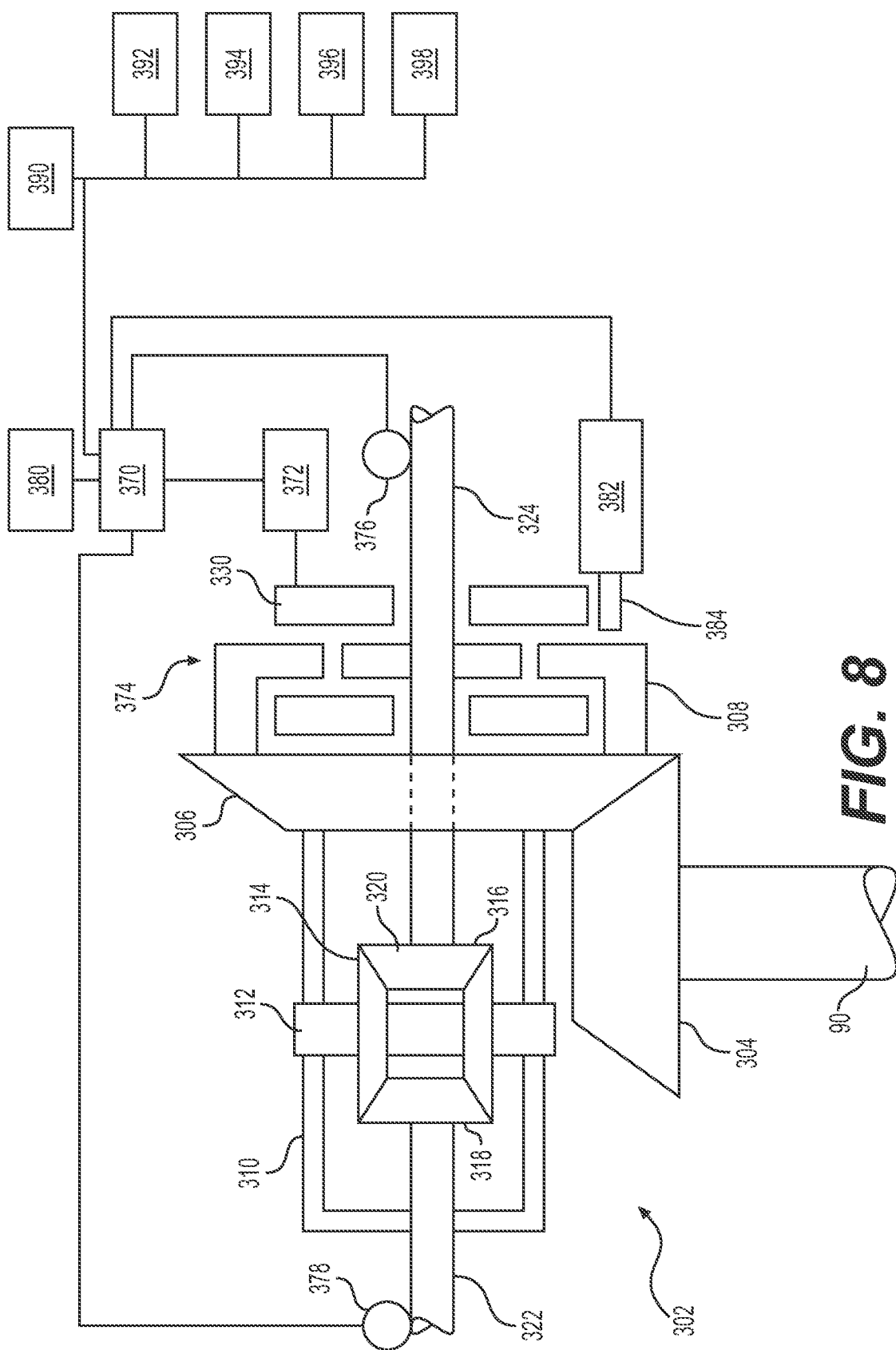
FIG. 8 is a schematic cross-sectional view of the differential assembly of FIG. 7.

FIGS. 7 and 8 show a limited slip differential assembly 300 including the LSD 302 connected to driven wheels of the vehicle 40. In an implementation, the differential assembly 300 drives the front wheels 44 of the vehicle 40. It should be understood that the differential assembly 300 could alternatively be used with the rear wheels 48 of the vehicle 40, or to any pair of wheels of any other type of vehicle. The differential assembly 300 includes the LSD 302, a control unit 370, an actuator 372, a solenoid 382, and one or more sensors. The actuator 372, the solenoid 382 and the sensors are electrically connected to the control unit 370. Sensors may include one or more wheel speed sensors 376, 378, a vehicle speed sensor 380, a steering angle sensor 390, an accelerator control sensor 392, an engine torque monitor 394, a shifter position indicator 396, and a user command sensor 398. The user command sensor 398 informs the control unit 370 of the state of the various toggle switches 59, 63 and 65. Some of these sensors may be present in some implementations and not present in some other implementations. All of these sensors, when present, are communicatively coupled with the control unit 370, to which they provide measurements and sensed information elements.

FIG. 8 illustrates a particular, non-limiting implementation of the LSD 302. In the LSD 302 as shown on FIG. 8, the input shaft 90 is connected to a first bevel gear acting as an input gear 304. Rotation of the input shaft 90 causes a rotation of the input gear 304 that, in turn, causes a rotation of a second bevel gear, or ring gear 306. Rotation of the ring gear 306 causes a rotation of first clutch plates 308 and of a carrier 310. A shaft 312 connects the carrier 310 to a gear set that includes at least two (2) planet gears 314, 316 and sun gears 318, 320. An output shaft 322 is mounted to the sun gear 318, the shaft 322 and the sun gear 318 rotating together. Likewise, an output shaft 324 is mounted to the sun gear 320, the shaft 324 and the sun gear 320 rotating together. The output shafts 322 and 324 are operatively connected to the half shafts 98 via universal joints or joints of other types (not shown) contained in boot covers 326 and 328 (shown on FIG. 7).

The LSD 302 has second clutch plates 330. When the clutch plates 308 and 330 are not compressed, the LSD 302 is not loaded. The output shafts 322 and 324 may rotate at the same speed or at distinct speeds. When both output shafts 322 and 324 rotate at a same speed, they also both rotate at the same rate as the ring gear 306, the carrier 310 and the sun gears 318, 320. At that time, the planet gears 314 and 316 do not rotate about the axis of the shaft 312 (they only rotate about the axis of the ring gear 306, following the movement of the carrier 310). When the two output shafts 322 and 324 rotate at distinct speeds, a rotational difference of the sun gears 318 and 316 causes a rotation of the planet gears 314 and 316 about the axis of the shaft 312. In that case, torque from the input shaft 90 is unequally transferred to the output shafts 322 and 324 and, ultimately, to the left and right wheels 44.

The actuator 372 may compress the clutch plates 308 and 330. This compression reduces, and eventually eliminates, a rotational speed difference between the ring gear 306 and the output shaft 324. If the clutch plates 308 and 330 are compressed to the point of eliminating any rotational speed difference between the ring gear 306 and the output shaft 324, the carrier 310 also rotates at the same speed as the output shaft 324. The planetary gears 314 and 316 cannot turn about the axis of the shaft 312 so the sun gear 318 and the output shaft 322 also rotate at the same speed as the output shaft 324. The LSD 302 is then effectively locked. In case of partial loading of the LSD 302, a moderate compression of the clutch plates 308 and 330 causes a reduction of a rotational speed difference between the ring gear 306 and the output shaft 324, without totally eliminating this difference. The LSD 302 is at that time allowing a limited slip of the wheels 44.

The LSD 302 is a conventional clutch-type limited slip differential and is controllable to allow a predetermined maximum difference in rotational speeds between the left and right front wheels 44. It is contemplated that any other suitable type of LSD 302 may alternatively be used.

The LSD 302 is mechanically coupled to an actuator 372, for example an electrical, hydraulic or magnetic actuator, that is electronically controlled by a control unit 370. To regulate the difference in rotational speeds between the left and right front wheels 44, the actuator 372 can vary the compression on the clutch plates 308 and 330 to vary the degree of engagement, or load, of the LSD 302. The LSD 302 may be engaged, i.e. loaded, when the control unit 370 detects that one of the wheels 44 is slipping.

In at least one implementation, in order to prevent eventual slipping of the wheels 44, the control unit 370 may control the LSD 302 to be loaded before the actual detection of a wheel slip. It can be said in such case that the LSD 302 is preloaded. In the context of the present disclosure, differences between the terms "load" and "preload" primarily relate to the circumstances under which the control unit 370 initiates the loading of the LSD 302. The LSD 302 operates essentially in the same manner whether it is loaded or preloaded. Application of a preload to the LSD 302 does not preclude further or increased loading of the LSD 302 in the event of a wheel slip.

The control unit 370 may cause the LSD 302 to act as an open differential (fully disengaged), a locked differential (fully engaged), or at any intermediate degree of engagement. The control unit 370 is electrically connected to wheel speed sensors 376, 378 that, on FIG. 8, are connected to the output shafts 324 and 322. The wheel speed sensors 376, 378 may alternatively be connected to the front wheels 44, to the front half-shafts 98, or to any other suitable component from which the control unit 370 receives signals indicative of the rotational speeds of the left and right front wheels 44.

Figure 9:
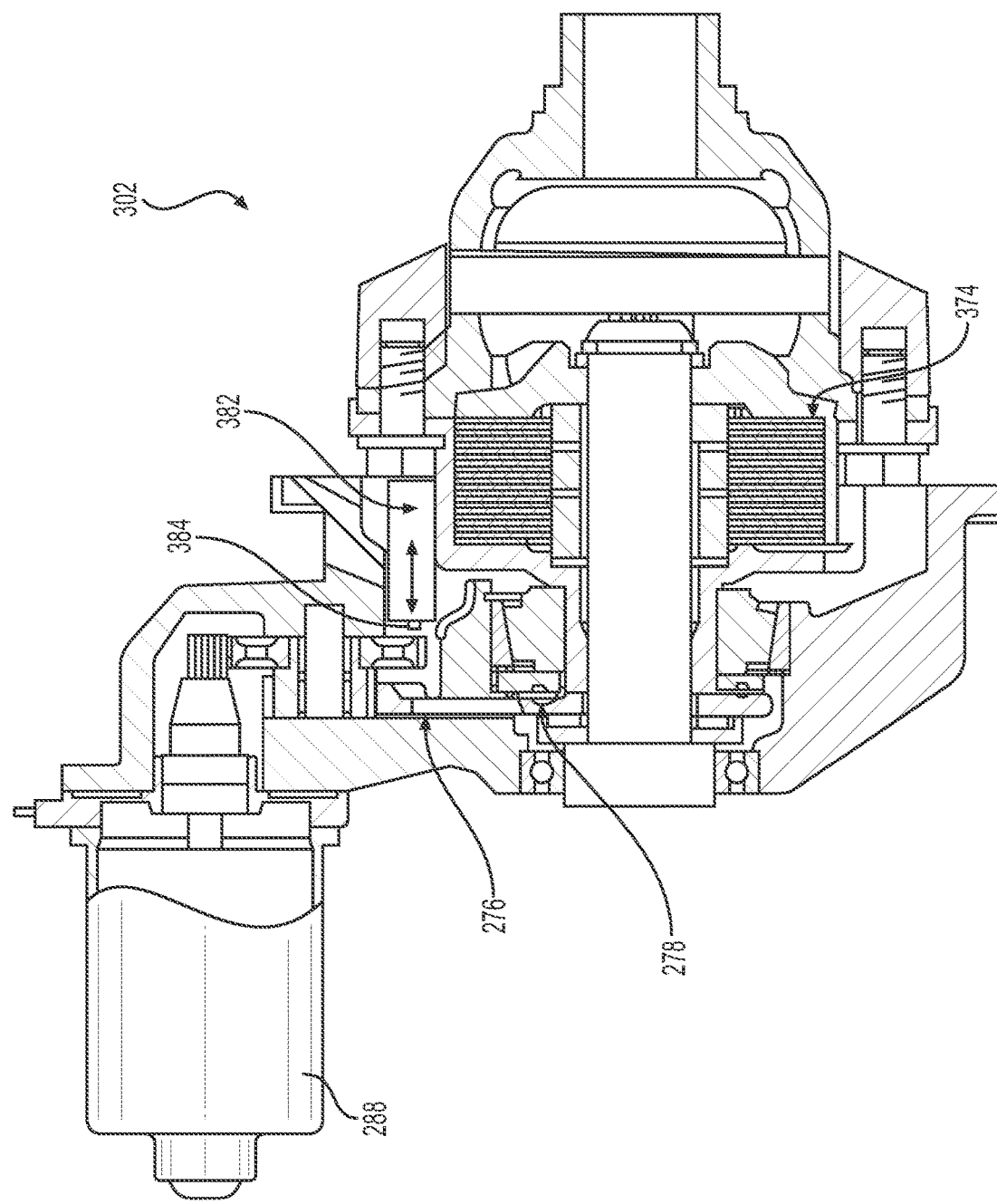
FIG. 9 is a cross-sectional view of an example construction of the differential assembly of FIG. 7.

FIG. 9 is a cross-sectional view of an example construction of the differential assembly of FIG. 7. The actuator 372 comprises an electric motor 288 that drives a gear set 276. A rotational motion of the gear set 276 is translated into an axial motion by a ball ramp 278. This axial motion is used to apply a pressure generated by the electric motor 288 to compress the clutch plates 308 and 330 of a clutch 374. This compression of the clutch 374 loads the LSD 302 to reduce the relative slip between the left and right half shafts 98. Sufficient compression of the clutch 374 may effectively lock the LSD 302. However, even under maximum compression, the clutch 374 may slip in some implementations, under severe conditions. Consequently, depending on the torque from the input shaft 90 being applied to the LSD 302 and depending on characteristics of the clutch 374, the LSD 302 may not lock to an absolute degree. In the context of the present disclosure, the LSD 302 is considered locked when maximum torque is applied on the clutch 374 although at the time a modest relative slip may still be present between the left and right half shafts 98. Consequently, the "locking of the LSD 302" should not be understood in the absolute.

In order to prevent overheating of the electric motor 288, a solenoid 382 having a tooth 384 at its end may be energized so that the tooth 384 meshes with a largest gear 386 of the gear set 276, thereby locking the gear set 276, the ball ramp 278 and the clutch 374 in a selected load position. As a result, the electric motor 288 no longer needs to be energized to maintain the load to the LSD 302. In an implementation, the solenoid 382 may be energized to lock the LSD 302 when the control unit 370 determines that loading has been applied for at least a predetermined time period duration. It should be observed that energizing the solenoid 382 requires much less current than energizing the electric motor 288. De-energizing the solenoid 382 causes it to retract, releasing the tooth 384 from the largest gear 386 of the gear set 276 and releasing the load to the LSD 302. In a variant, the solenoid 382 may be configured so that its tooth 384 meshes with the largest gear 386 of the gear set 276 when the solenoid 382 is not energized, energizing the solenoid 382 thus causing a release of the gear set 276 and unlocking of the clutch 374.

In an implementation, maximum compression of the clutch 374 may be applied by the electric motor 288, the gear set 276 and the ball ramp 278 prior to energizing the solenoid 382. In the same or another implementation, the solenoid 382 may also be energized to lock the LSD 302 when a user manually activates the toggle switch 63 to select to lock the LSD 302, as indicated by the user command sensor 398 that informs the control unit 370 of a user request to lock the LSD 302. In such case, the user request to lock the LSD 302 may optionally cause a maximum load of the LSD 302 by maximum compression of the clutch 374 by the electric motor 288, the gear set 276 and the ball ramp 278 prior to energizing the solenoid 382.

Other implementations of the differential assembly 300 and of the LSD 302 are also contemplated. The present technology is not limited to the particular implementation illustrated on FIGS. 7 to 9. In particular, a differential assembly that does not contain a ball ramp or clutch plates is also contemplated.

Control of the LSD 302 Based on a Steering Angle of the Vehicle 40

One aspect of the present technology provides control of the LSD 302 connected to the driven wheels 44 of the vehicle 40 based at least in part on rotational speeds of both left and right driven wheels 44 of the vehicle 40 and at least in part on a steering angle. In the context of the present disclosure, the steering angle may represent the angle of a steering wheel 58 or the angle of a handlebar, depending on the type of steering control mounted on the vehicle. In vehicles having so-called drive-by-wire steering systems, the ratio of a steering wheel input to the angle of steered wheels may vary according to the speed of the vehicle and, in some cases, according to some other factors.

Considering that it is natural for the inside wheels 44 and 48 to rotate at a slower rate than the outside wheels 44 and 48 when the vehicle 40 is in a curve, in an implementation, the control unit 370 determines an allowable slipping range between the left and right front wheels 44, the allowable slipping range being based at least in part on the steering angle and on the speed of the vehicle 40. This allows the control unit 370 to control loading of the LSD 302 using a narrower slipping range instead of conventional, broad slipping range.

Figure 10:
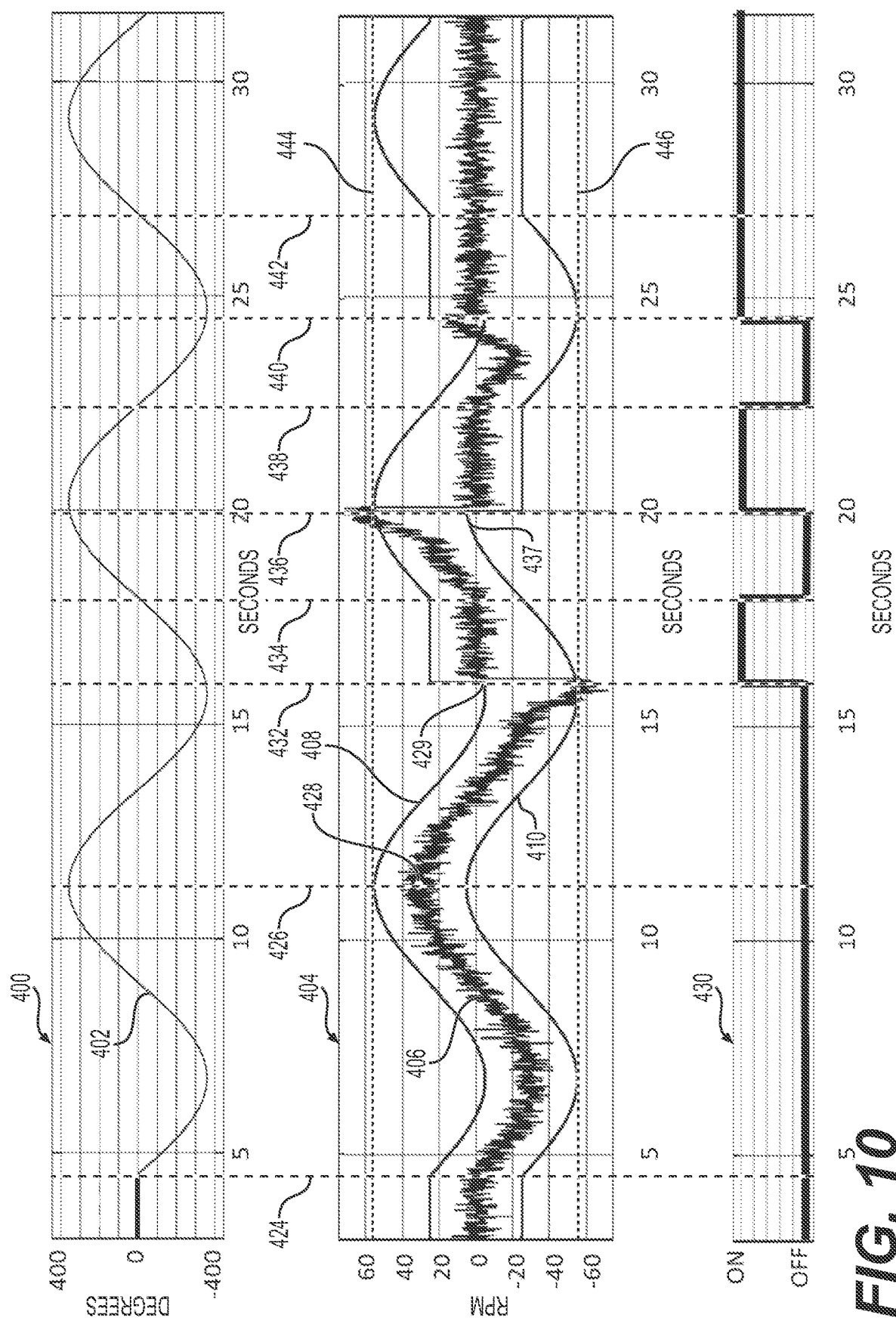
FIG. 10 provides timing diagrams showing variations of a steering angle (top diagram), wheel slip variations and a range between maximum and minimum allowed wheel slips calculated by the engine control unit (middle diagram), and control commands for loading and/or locking the LSD (bottom diagram)

FIG. 10 provides timing diagrams showing variations of a steering angle (top diagram 400), wheel slip variations and a range between maximum and minimum allowed wheel slips calculated by the engine control unit 370 (middle diagram 404), and control commands for loading and/or locking the LSD 302 (bottom diagram 430). For ease of illustration and without limiting the generality of the present disclosure, the diagrams of FIG. 10 are made in view of a constant speed of the vehicle 40, with its front wheels 44 rotating at an average speed of 100 RPM.

The top diagram 400 illustrates a steering angle 402 showing rotations of the steering wheel 58 between −360 and +360 degrees, over a 32-second period of time. An equivalent diagram showing angular variations of the front wheels 44, which are steered by action of the steering wheel 58 is also contemplated, in which case lesser angular ranges would be shown. The user initially maintains the steering wheel 58 in a straight (0 degree) position from an initial zero time to about 4.5 seconds. From that point in time, the user turns the steering wheel to cause the vehicle 40 to make a left turn, followed by a right turn, another left turn, and so on. A dashed line 424 highlights a starting point in time of the effect of this action from the user on other diagrams of FIG. 10. For illustration purposes, the user fully rotates the steering wheel 58, between −360 in left turns and +360 degrees in right turns.

A middle diagram 404 illustrates wheel slip variations between the left and right front wheels 44 over time. For illustration purposes, the diagram 404 shows a wheel slip 406 illustrated from the standpoint of the left front wheel. In the context of the present disclosure, the "wheel slip" is defined as a difference in the rotational speeds of the two (2) front wheels 44 of the vehicle 40. For illustration purposes, the wheel slip is calculated with the left wheel 44 as a reference. As such, a positive wheel slip value indicates that the left wheel rotates faster than the right wheel while a negative wheel slip value indicates that the left wheel rotates slower than the right wheel. When the vehicle 40 is taking a left turn for example, the left wheel naturally rotates slower than the right wheel, assuming no actual slip between the wheel and the ground. The curve of the wheel slip 406 therefore represents the speed of the left wheel minus the speed of the right wheel for different steering angles.

The vertical axis of the diagram 404 shows wheel slip values between −60 and +60 RPM. Assuming there is no slipping between the wheels and the terrain, the inside left wheel rotates at a slower rate than the outside right wheel when turning left and thus the wheel slip is negative for all steering angles between 0 and −360. When the steering wheel is turned in the opposite direction, between 0 and +360 steering angles, the left wheel rotates faster than the right wheel and thus the wheel slip is positive. Without any slipping between the wheels and the terrain, the curve for the wheel slip 406 follows an expected wheel slip that naturally results at a turning radius of the vehicle 40, the turning radius being in turn a function of the steering angle. A large steering angle causes the vehicle 40 to take a small turning radius, in turn causing an important wheel slip.

As illustrated, the curve for the wheel slip 406 is jagged, primarily because of noise in the measurements from the wheel speed sensors 376, 378, which may be caused for example by the wheels 44 hitting bumps and holes on the road.

The curve for the wheel slip 406 is for a particular implementation of the vehicle 40 with its front wheels 44 rotating at an average of 100 RPM without slipping with respect to the ground. For this implementation, the expected wheel slip at the maximum steering angle of +/−360 degrees is 30 RPM, with the inside front wheel 44 rotating at 85 RPM while the outside front wheel 44 rotates at 115 RPM, an average of the speeds of the front wheels 44 being 100 RPM. Otherwise stated, in this particular implementation, the vehicle 40 has a slip ratio of 30%, which is a fixed value defined as a ratio between the wheel slip value at the maximum steering angle over the average wheel speed. For the same vehicle 40, with an average wheel speed of 200 RPM, the expected wheel slip at the maximum steering angle is thus 60 RPM. For another vehicle, the slip ratio may be different depending on the steering ratio within the steering system of that vehicle. Also, in an embodiment, another vehicle may have a steering that can rotate by more or less than +/−360 degrees. For example, a steering wheel could be turned by more than one full turn to steer the wheels.

The diagram 404 also shows a maximum allowed wheel slip 408 and a minimum allowed wheel slip 410. Generally speaking, the maximum allowed wheel slip 408 has a peak value when the left wheel is on the outside of a curve (right turn) while the minimum allowed wheel slip 410 has a peak (negative) value when the left wheel is on the inside of a curve (left turn). Together, the maximum and minimum allowed wheel slips 408 and 410 define, for a given steering angle, a permissible slipping range for the front wheels 44. The wheel slip 406 may vary between these values before intervention from the control unit 370 to start loading the LSD 302.

The control unit 370 uses steering angle information from the steering angle sensor 390 to control the limited slip differential assembly 300. The control unit 370 determines the expected wheel slip that naturally results at a turning radius of the vehicle 40, the turning radius being in turn a function of the steering angle. The control unit 370 adds and subtracts a slip margin to and from the expected wheel slip, respectively, in order to expand the permissible range of relative slip between the front wheels 44. The slip margin may be fixed. The wheel slip may alternatively vary according to the rotational speed of the front wheels 44. The use of a slip margin prevents excessive reaction of the limited slip differential assembly 300 when a rotational speed difference of the front wheels 44 is within the permissible slipping range. The wheel slip margin is determined by the control unit 370. In an implementation, the slip margin may be selected at least in part so that noise from the measurements by the wheel speed sensors 376, 378 does not cause accidental interaction of the LSD 302. In the illustration of FIG. 10, the same slip margin is used for determining the maximum and minimum allowed wheel slips 408 and 410. Using different slip margins for any given steering angle and/or for determining ranges of allowable wheel slips for inside and outside wheels 44 is also contemplated. To calculate the maximum allowed wheel slip 408, the slip margin is added to the expected wheel slip at the current steering angle, for a given rotational speed of the front wheels 44. To calculate the minimum allowed wheel slip 410, the slip margin is subtracted from the expected wheel slip at the current steering angle, for a given rotational speed of the front wheels 44.

Figure 11:
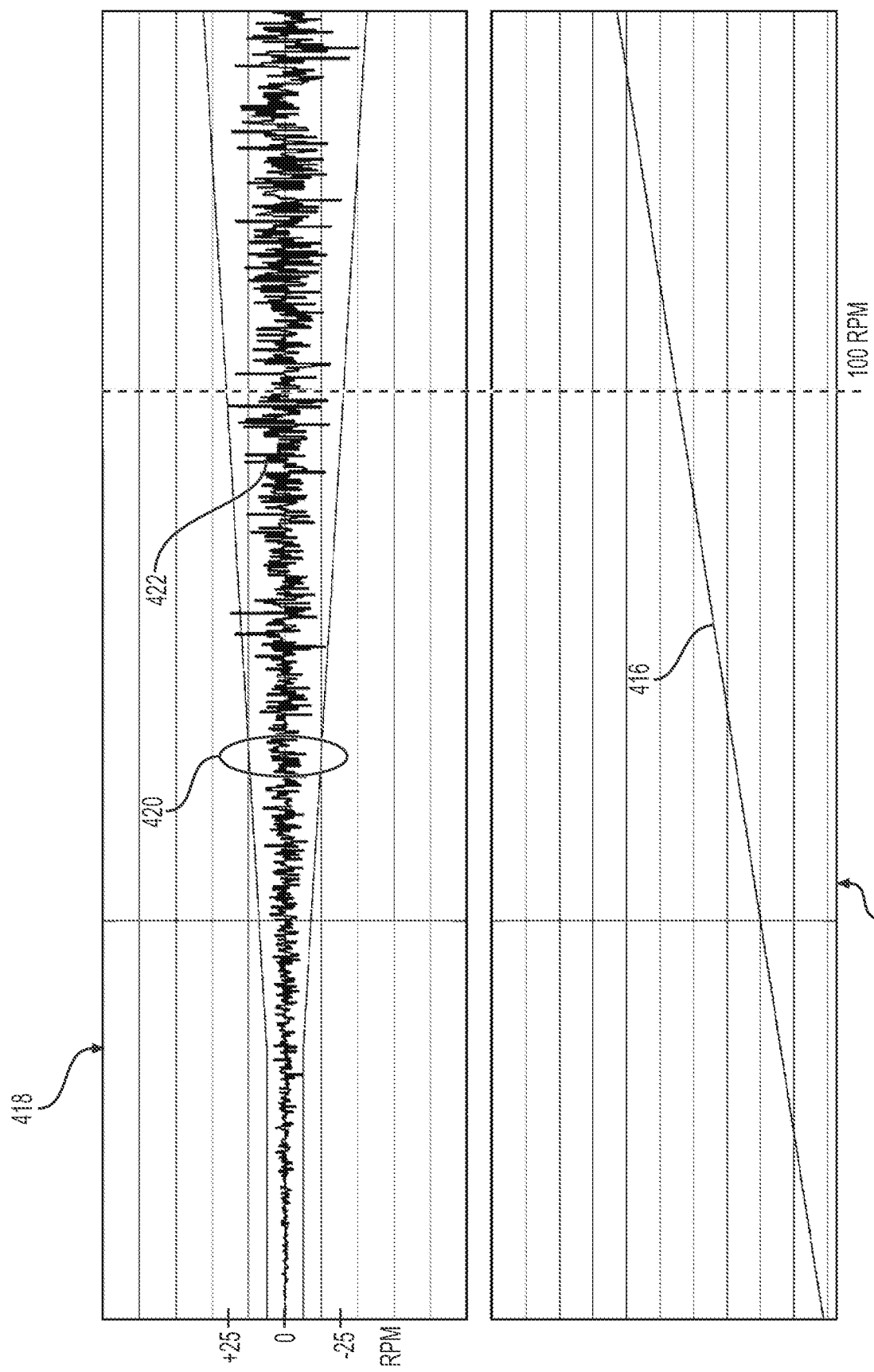
FIG. 11 is a graphical representation of a slip margin (top diagram) varying as a function of rotational speed of the front wheels of the vehicle of FIG. 1 (bottom diagram)

FIG. 11 is a graphical representation of a slip margin (top diagram 418) varying as a function of the rotational speed for the front wheels 44 of the vehicle 40 (bottom diagram 414). A bottom diagram 414 shows a speed 416 of the front wheels 44 of the vehicle 40, in RPM. A top diagram 418 shows a slip margin 420 for the wheels 44 and a noise level 422 from the measurements of the wheel speed sensors 376, 378. As the speed 416 of the vehicle increases, the noise level 422 increases as well. For that reason, the slip margin 420 used in the determination of the maximum and minimum allowed wheel slips 408 and 410 depends at least in part on the speed 416 of the vehicle so that the slip margin 420 remains greater than the noise level 422 in most circumstances. A relationship between the slip margin 420 and the speed 416 of the front wheels 44 may be linear or non-linear. In an implementation, a slip margin 420 of 25 RPM corresponds to an average speed of the front wheels 44 equal to 100 RPM. In an implementation, the control unit 370 stores a slip mapping table (sometimes called a look up table) of the relations between values of the slip margin 420 and speed 416 of the front wheels 44. A relationship between the steering angle and the angle of the steered wheels may be linear or non-linear. The ratio of the steering wheel input to the angle of the steered wheels is however known at all times by a controller of the drive-by-wire steering system.

Returning now to FIG. 10, the control unit 370 determines the speed of the front wheels 44 by averaging measurements of the wheel speed sensors 376, 378. A measurement of the steering angle is provided to the control unit 370 by the steering angle sensor 390. Before about 4.5 seconds (dashed line 424), the steering wheel 58 is held in a straight position and the expected wheel slip is zero RPM. The maximum and minimum allowed wheel slips 408, 410 are at the time respectively equal to the 25 RPM slip margin above and below the expected wheel slip value, this slip margin being for the front wheels 44 rotating at 100 RPM on average. At 4.5 seconds, the user starts turning the steering wheel 58, at first to the left and then to the right, and so on. The control unit 370 uses measurements from the steering wheel angle sensor 390 to modify the maximum and minimum allowed wheel slips 408 and 410 that may be allowed before applying a load to the LSD 302. In the illustrated example, at about 11.5 seconds (dashed line 426), the steering wheel 58 is turned to the right by 360 degrees, which causes a 30 RPM difference between the speeds of the front wheels 44, given the current wheel speed of 100 RPM and the 30% slip ratio of the vehicle 40. The left wheel 44 on the outside of the curve rotates at a higher speed while the right wheel 44 on the inside of the curve rotates at a lower speed (generally at point 428 on the wheel slip 406 curve). At that time, the minimum allowed wheel slip 410 is +5 RPM (30-25 RPM) while the maximum allowed wheel slip 408 is +55 RPM (30+25 RPM). Otherwise stated, the left wheel 44 being at the time the outside wheel would naturally rotate faster than the inside right wheel 44 by 30 RPM if on non-slippery terrain. Given the permissible slipping range, the left wheel 44 is allowed to rotate even faster, up to 55 RPM faster than the inside right wheel 44, before the control unit 370 starts applying a load to the LSD 302. At the same time, the positive value of the minimum allowed wheel slip 410 implies that the control unit 370 will apply a load to the LSD 302 if the outside left wheel 44 rotates less than 5 RPM faster than the inside right wheel 44. The 5 RPM value is calculated as the expected wheel slip at the current angle of the steering device (30 RPM) minus the slip margin, which has a value of 25 RPM. The difference between the maximum allowed wheel slip 408 and the minimum allowed wheel slip 410 is maintained constant at 50 RPM, this value reflecting the slip margin of 25 RPM being applied on both sides of the expected wheel slip, for the 100 RPM wheel speed.

A lower diagram 430 of FIG. 10 shows commands from the control unit 370 to load and then unload the LSD 302. These commands are generated by the control unit 360 when the wheel slip 406 moves out of the bounds defined by the maximum and minimum allowed wheel slips 408 and 410. The LSD 302 is initially unloaded (command is OFF). In the present example, the wheel slip 406 exceeds the minimum allowed wheel slip 410 at about 15.5 seconds and, in response, the control unit 370 sends a control command to the LSD 302 at a 16-second mark (dashed line 432; command is ON). The control unit 370 initially causes a load to be applied to the LSD 302 by energizing the electric motor 288. The control unit 370 may further energize the solenoid 382 to lock the LSD 302. In an implementation, the control unit 370 may determine a level of the load to be applied to the LSD 302 based on one or more of a plurality of parameters, including without limitation a torque provided by the engine 62, a position of the shifter 60 selecting a gear ratio of the transaxle 66, a magnitude of the wheel slip 406, and a magnitude of an excess of the wheel slip 406 in relation to the maximum or minimum allowed wheel slips 408, 410. The control unit 370 may also determine whether or not to lock the LSD 302 based on a combination of these parameters.

As illustrated, starting at the 16-second mark, the LSD 302 is sufficiently loaded, possibly being locked, to cause the wheel slip 406 to reduce substantially to zero RPM. At the same time, the control unit 370 adapts its calculation of the maximum and minimum allowed wheel slips 408 and 410. Before detecting that the wheel slip 406 is moving out of the bounds defined by the maximum and minimum allowed wheel slips 408 and 410, the maximum allowed wheel slip 408 calculated according to the steering angle is at −5 RPM (point 429) and the minimum allowed wheel slip 410 calculated according to the steering angle is at −55 RPM. The LSD 302 is loaded, and possibly locked, by the control unit 370. The actual wheel slip is thus reduced substantially to zero RPM.

Assuming that the control unit 370 would still determine the maximum allowed wheel slip 408 based on the steering angle, in the manner as described earlier, the maximum allowed wheel slip 408 would be equal to −5 RPM at that time and the control unit 370 would control the application of a load to the LSD 302 because of the zero RPM wheel slip being greater than −5 RPM. The LSD 302 being already loaded, this action of the control unit 370 would be superfluous. Consequently, the control unit 370 modifies its calculation of the maximum allowed wheel slip 408 in the manner expressed hereinbelow. At the same time, the control unit 370 would not act upon the minimum allowed wheel slip 410 calculated in view of the steering angle because, at −55 RPM, this minimum allowed wheel slip would not be exceeded. There is no need to modify the calculation of the minimum allowed wheel slip 410 at that time.

When the LSD 302 is loaded, the control unit 370 updates the maximum allowed wheel slip 408 by selecting the greater of: (a) a sum of the expected wheel slip and the slip margin for the current wheel speed; and (b) the slip margin for the current wheel speed. In the present example, as shown on the diagram 404, the maximum allowed wheel slip 408 becomes equal to the slip margin starting at the 16-second mark. The control unit also updates the minimum allowed wheel slip 410 by selecting the lower (most negative) of: (a) the expected wheel slip minus the slip margin for the current wheel speed; and (b) the slip margin for the current wheel speed expressed in the negative (i.e. zero minus the slip margin). In the present example, in that case, the minimum allowed wheel slip 410 remains unchanged because it is lower than the slip margin expressed in the negative. As a result, the maximum allowed wheel slip 408 is changed by the control unit 370 to 25 RPM (0+25 RPM), this value of the maximum allowed wheel slip 408 being the same as when the steering wheel 58 is held in a straight position (zero steering angle). Without this calculation change, the curve of the maximum allowed wheel slip 408 could intersect the actual wheel slip 406, which is substantially zero RPM at the time. In the example as illustrated on FIG. 10, the minimum allowed wheel slip 410 continues being calculated based on the actual angle of the steering wheel 58 and no intersection takes place between the wheel slip 406 and the minimum allowed wheel slip 410.

From the 16-second mark (dashed line 432), the control unit 370 tracks the wheel slip 406 and may gradually increase or decrease the load to the LSD 302 depending on a synchronization of the front wheels 44 and possibly depending on some of the above mentioned parameters used by the control unit 370 to determine the level of the load to be applied to the LSD 302. At 18 seconds (dashed line 434), the wheel slip 406 is within the maximum and minimum allowed wheel slips 408 and 410, and the level of load determined by the control unit 370 is at or near zero. The control unit 370 removes the loading command applied to the LSD 302 and recalculates the maximum allowed wheel slip 408 using the calculation method used before the 16-second mark, in which the maximum and minimum allowed wheel slips 408 and 410 are calculated according to the steering angle and to the slip margin, the latter optionally depending on the rotation speed of the wheels 44.

Figure 23:
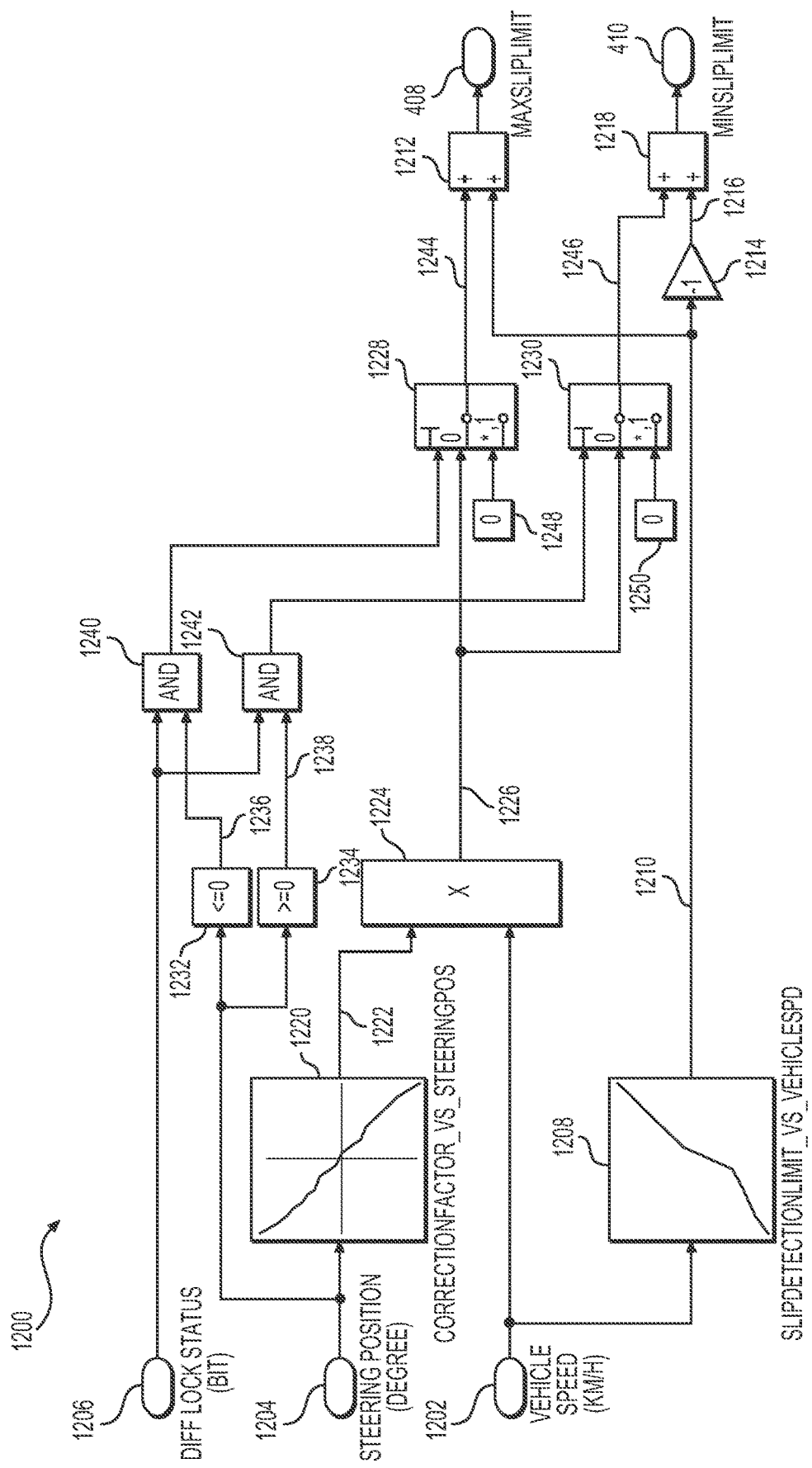
FIG. 23 is a block diagram showing internal operations of the control unit for determining the maximum and minimum allowed wheel according to an implementation.

FIG. 23 is a block diagram 1200 showing internal operations of the control unit 370 for determining the maximum and minimum allowed wheel slips 408 and 410 according to an implementation. The block diagram 1200 shows three (3) inputs that may be used by the control unit 370 to determine the maximum and minimum allowed wheel slips 420 and 410. It is contemplated that, in an implementation, this determination may be based on additional inputs. One such input is an average rotational wheel speed 1202 of the front wheels 44, expressed in RPM. Another input is a steering angle 1204 provided by the steering angle sensor 390, expressed in degrees. The steering angle 1204 may represent the angle of a steering wheel 58 or the angle of a handlebar. A further input is a binary status 1206 of the LSD 302. The binary status 1206 is set if the LSD 302 is loaded and/or locked. The binary status 1206 is reset otherwise.

The average rotational wheel speed 1202 is applied to the slip mapping table, which is illustrated as a block 1208 on FIG. 28. The slip mapping table outputs a slip margin 1210. In the example of FIG. 23, the slip margin 1210 has a positive value applied to a first adder 1212 and to a multiplier 1214 that has a gain of −1 to produce a negative version 1216 of the slip margin 1210, this negative version 1216 being applied to a second adder 1218.

The steering angle 1204 is applied to a block 1220 that is illustrated as a graphical representation of a steering angle mapping table that provides a correction factor 1222 as a function of the steering angle 1204. Table I is a non-limiting example of the steering angle mapping table.

TABLE I

| Steering angle 1204 (degrees) | Correction factor 1222 |
|---|---|
| −450 | 0.32 |
| −360 | 0.23 |
| −180 | 0.1 |
| −110 | 0.078 |
| −40 | 0.015 |
| 40 | −0.015 |
| 110 | −0.078 |
| 180 | −0.1 |
| 360 | −0.23 |
| 450 | −0.32 |

The block 1220 outputs the correction factor 1222. Because the steering angle 1204 may have a positive or a negative value, the correction factor 1222 may also have a positive or a negative value. A multiplier 1224 multiplies the average rotational wheel speed 1202 by the correction factor 1222 to provide an expected wheel slip 1226. The expected wheel slip 1226 is applied to inputs of a first switch 1228 and of a second switch 1230. It may be observed that the expected wheel slip 1226 may also have a positive or a negative value.

The steering angle 1204 is also applied to first and second comparators 1232 and 1234. The first comparator 1232 outputs a logical value 1236, for example a logical 1, when the steering angle is less than or equal to zero degrees. The second comparator 1234 outputs a logical value 1238, for example a logical 1, when the steering angle is greater than or equal to zero degrees. The binary status 1206 of the LSD 302 is applied to first and second AND boxes 1240 and 1242, along with, respectively, the logical values 1236 and 1238.

If the binary status 1206 of the LSD 302 is not set, the outputs of both AND boxes are reset, for instance producing logical 0's applied to the switches 1228 and 1230. In that case, outputs 1244 and 1246 of the switches 1228 and 1230 are both set to the expected wheel slip 1226. The adder 1212 sums the expected wheel slip 1226 and the slip margin 1210 to yield the maximum allowed wheel slip 408. The adder 1218 sums the expected wheel slip 1226 and the negative version 1216 of the slip margin 1210 to yield the minimum allowed wheel slip 410.

If the binary status 1206 of the LSD 302 is set, the LSD 302 being loaded or locked at the time, provided that the steering angle is not equal to zero degree, one of the AND boxes 1240 or 1242 issues a logical 1. If the steering angle 1204 is negative, the logical value 1236 is set and the AND box 1240 issues a logical 1 applied to the switch 1228. The output 1244 of the switch 1228 is set to a fixed value 1248, for example equal to 0 RPM. This value is added to the slip margin 1210 and the maximum allowed wheel slip 408 becomes equal to the slip margin 1210. This situation is exemplified on FIG. 10, between dashed lines 432 and 434, when the steering angle 1204 is negative and the LSD 302 is locked. At the same time, the logical value 1238 from the comparator 1234 is reset because the steering angle 1204 is not greater than or equal to zero. The AND box 1242 issues a logical 0 applied to the switch 1230. The output 1246 of the switch 1230 is not changed and the minimum wheel slip 410 remains equal to the sum of the expected wheel slip 1226 and the negative version 1216 of the slip margin 1210.

If the binary status 1206 of the LSD 302 is set and if the steering angle 1204 is positive, the logical value 1238 is set and the AND box 1242 issues a logical 1 applied to the switch 1230. The output 1246 of the switch 1230 is set to a fixed value 1250, for example equal to 0 RPM. This value is added to the negative version 1216 of the slip margin 1210 and the minimum allowed wheel slip 410 becomes equal to the negative version 1216 of the slip margin 1210. This situation is exemplified on FIG. 10, between dashed lines 436 and 438, when the steering angle 1204 is positive and the LSD 302 is locked. At the same time, the logical value 1236 from the comparator 1232 is reset because the steering angle 1204 is not less than or equal to zero. The AND box 1240 issues a logical 0 applied to the switch 1228. The output 1244 of the switch 1228 is not changed and the maximum wheel slip 408 remains equal to the sum of the expected wheel slip 1226 and the slip margin 1210.

If the binary status 1206 of the LSD 302 is set and the steering angle is equal to zero degrees, the AND boxes 1240 and 1242 each issue a logical 1. Because the expected wheel slip 1226 is at or near 0 RPM at that times, all the selectable inputs of the switches 1228 and 1230 are equivalently set to 0 RPM and thus the outputs of the AND boxes 1240 and 1242 have no impact on the calculations of the maximum and minimum allowed wheel slips 408 and 410.

Returning to FIG. 10, the control unit 370 may determine the proper time to remove the load to the LSD 302 according to a plurality of parameters. In a variant, the control unit 370 may remove the loading when the wheel slip 406 has remained within a permissible range defined by the maximum and minimum allowed wheel slips 420 and 410 for a predetermined time duration. In the same or another variant, a level of the loading may be gradually reduced by the control unit 370, the level being based at least in part on the magnitude of the excess of the current wheel slip in relation to the range between the maximum and minimum allowed wheel slips 408 and 410.

Figure 13:
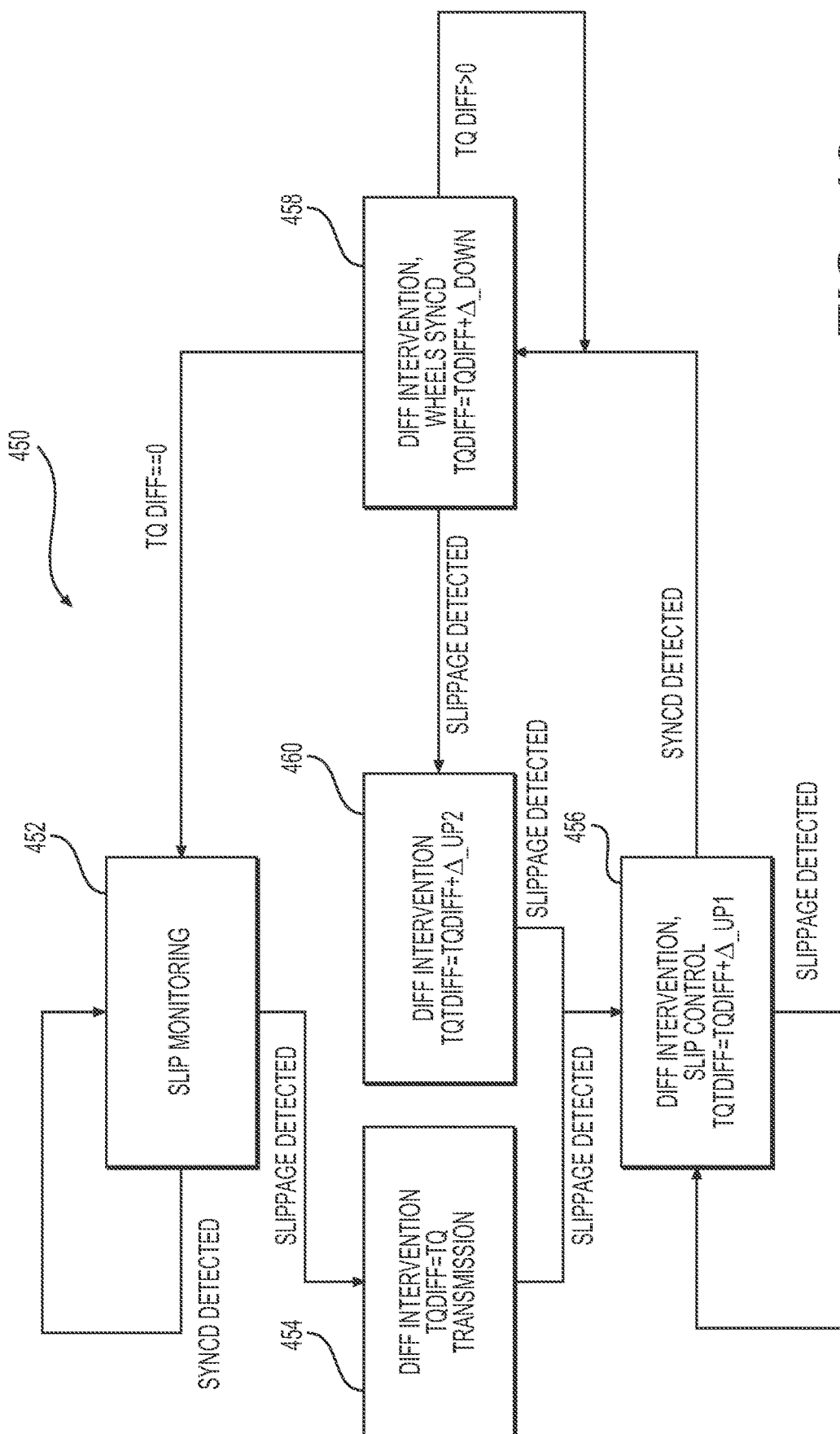
FIG. 13 is a logic diagram showing details of a method of applying a load on the limited slip differential.

For example, FIG. 13 is a logic diagram showing details of a method of applying a load on the limited slip differential. In a sequence 450, operation 452 comprises monitoring signals and measurements from the wheel speed sensors 376, 378 for eventually detecting that the wheel slip 406 exceeds the permissible slipping range defined by the maximum and minimum allowed wheel slips 408 and 410. Following such detection, the control unit 370 controls a loading of the LSD 302 at operation 454. Referring again to FIG. 9, the control of the LSD 302 to reduce the current wheel slip 406 is effected by loading the LSD 302. To this end, the clutch 374 of the LSD 302 is compressed to reduce a rotational speed difference of the output shafts 322 and 324, which are operatively connected to the half shafts 98 and further to the left and right driven wheels 44. Compression of the clutch 374 of the LSD 302 is made by the electric motor 288, which rotates the gear set 276 that in turn translates its rotational movement into an axial motion of the ball ramp 278 to apply a torque TqDiff on the clutch 374.

An initial torque value Tq is applied on the clutch 374. The initial torque value Tq may, for example, be proportional to the torque provided by the engine 62. If excessive wheel slip remains, the torque TqDiff is raised by an increment Δ_up1 at operation 456. Operation 456 may be repeated until the current wheel slip 406 returns within the permissible slipping range. Once the current wheel slip 406 has returned within the permissible slipping range, operation 458 gradually decreases the torque TqDiff applied on the clutch 374 by Δ_down steps. If the wheel slip 406 increases and falls again outside the permissible slipping range, the torque TqDiff is raised an increment Δ_up2 at operation 460, following which the sequence returns to operation 456. The increments Δ_up1 and Δ_up2 may either have equal or unequal values. When the torque TqDiff falls to zero, the wheel slip 406 being within the permissible slipping range, slip monitoring resumes at operations 452.

Other manners of calculating the torque TqDiff applied on the clutch 374 are contemplated. The torque may for example be calculated proportional to a difference between the current wheel slip 406 and the maximum and minimum allowed wheel slips 408 and 410.

Returning to FIG. 10, the wheel slip 406 is once again out of bounds at 20 seconds (dashed line 436), with the steering wheel 58 now turned to the right. The control unit 370 sends a control command to load the LSD 302. As a result, the LSD 302 becomes sufficiently loaded, and possibly locked, to reduce the wheel slip 406 substantially to zero RPM. At the same time, the control unit 370 adapts its calculation of the maximum and minimum allowed wheel slips 408 and 410. Before detecting that the wheel slip 406 is moving out of the bounds defined by the maximum and minimum allowed wheel slips 408 and 410, the maximum allowed wheel slip 408 calculated according to the steering angle is at about +55 RPM and the minimum allowed wheel slip 410 calculated according to the steering angle is at about +5 RPM (point 437). At the 20-second mark, the control unit 370 updates the maximum allowed wheel slip 408 by selecting the greater of: (a) a sum of the expected wheel slip and the slip margin for the current wheel speed; and (b) the slip margin for the current wheel speed. In the present example, as shown on the diagram 404, the maximum allowed wheel slip 408 remains unchanged as it is greater than the slip margin. The control unit also updates the minimum allowed wheel slip 410 by selecting the lower (most negative) of: (a) the expected wheel slip minus the slip margin for the current wheel speed (b) zero minus the slip margin for the current wheel speed. In the present example, the minimum allowed wheel slip 410 becomes equal to the slip margin expressed in the negative starting at the 20-second mark. As a result, the minimum allowed wheel slip 410 is changed by the control unit 370 to −25 RPM (0-25 RPM), as when the steering wheel 58 is held in a straight position (zero steering angle). Without this calculation change, the curve of the minimum allowed wheel slip 410 could intersect the actual wheel slip 406, which is substantially zero RPM at the time. In the example of FIG. 10, the maximum allowed wheel slip 408 continues being calculated based on the actual angle of the steering wheel 58 and no intersection takes place between the wheel slip 406 and the maximum allowed wheel slip 408.

From the 20-second mark (dashed line 436), the control unit tracks the wheel slip 406 and may gradually release the load to the LSD 302. At 22.5 seconds (dashed line 438), the wheel slip 406 is within the maximum and minimum allowed wheel slips 408 and 410 and the level of load determined by the control unit 370 is at or near zero. The control unit 370 removes the loading command applied to the LSD 302 and recalculates the minimum allowed wheel slip 410 according to the steering angle.

The wheel slip 406 exceeds the maximum allowed wheel slip 408 again at 24.5 seconds (dashed line 440), the steering wheel 58 being turned to the left at that time. The control unit 370 sends again a control command to load the LSD 302, optionally further locking the LSD 302. As a result, the LSD 302 becomes sufficiently loaded to substantially reduce the wheel slip 406 to zero RPM. At the same time, the control unit 370 adapts its calculation of the maximum and minimum allowed wheel slips 408 and 410. Before detecting that the wheel slip 406 is moving out of the bounds defined by the maximum and minimum allowed wheel slips 408 and 410, the maximum allowed wheel slip 408 calculated according to the steering angle is at about −5 RPM and the minimum allowed wheel slip 410 calculated according to the steering angle is at about −55 RPM. The control unit 370 updates the maximum allowed wheel slip 408 by selecting the greater of: (a) a sum of the expected wheel slip and the slip margin for the current wheel speed; and (b) the slip margin for the current wheel speed. In the present example, the maximum allowed wheel slip 408 becomes equal to the slip margin starting at the 24.5-second mark. The control unit also updates the minimum allowed wheel slip 410 by selecting the lower (most negative) of: (a) the expected wheel slip minus the slip margin for the current wheel speed; and (b) zero minus the slip margin for the current wheel speed. In the present example, the minimum allowed wheel slip 410 remains unchanged at the 24.5-second mark as it is lower than the slip margin expressed in the negative. As a result, the maximum allowed wheel slip 408 is changed by the control unit 370 to 25 RPM (0+25 RPM), as when the steering wheel 58 is held in a straight position (zero steering angle). The minimum allowed wheel slip 410 continues being calculated based on the actual angle of the steering wheel 58.

The user continues turning the steering wheel 58. At about 27 seconds (dashed line 442), the steering wheel 58 is turned to the right and the left wheel becomes the outside wheel. The control unit 370 continues selecting the maximum allowed wheel slip 408 as the greater of the maximum allowed wheel slip calculated according to the current steering angle and the slip margin. At the 27-second mark, the maximum allowed wheel slip 408 starts becoming greater than the slip margin. The control unit 370 also continues selecting the minimum allowed wheel slip 410 as the lesser (most negative) of: (a) the minimum allowed wheel slip calculated according to the current steering angle; and (b) the slip margin expressed in the negative. In that case, the minimum allowed wheel slip 410 becomes equal to the slip margin expressed in the negative starting at the 27-second mark.

The control unit 370 may issue a command to load the LSD 302 in response to other situations or driving conditions of the vehicle, for instance in response to a user command to lock the LSD 302. The LSD 302 may thus be loaded even though at the time the wheel slip 406 may be within the range between the maximum and minimum allowed wheel slips 408 and 410. Notwithstanding the reason for loading the LSD 302, in an implementation, the control unit 370 may select the maximum allowed wheel slip 408 as the greater of: (a) a sum of the expected wheel slip and the slip margin for the current wheel speed; and (b) the slip margin, also selecting the minimum allowed wheel slip 410 as the lesser (most negative) of: (a) the expected wheel slip minus the slip margin for the current wheel speed; and (b) zero minus the slip margin for the current wheel speed, whenever the LSD 302 is loaded.

Considering the middle diagram 404, it may be observed that a conventional limited slip differential not configured to react to the steering angle of the vehicle 40 and configured to allow a fixed wheel slip margin between +55 RPM and −55 RPM values (dotted lines 444 and 446, respectively) would operate in the following manner at points 429 and 437, at the 16-second mark and at the 20-second mark, respectively. In the event of a wheel slip exceeding +/−55 RPM bounds at those times, the conventional limited slip differential could be loaded and/or locked to bring back the wheel slip to about zero RPM. However, the conventional limited slip differential would not react as does the LSD 302 at the 24.5-second mark (dashed line 440) because the wheel slip would still be within the +/−55 RPM bounds. Otherwise stated, the conventional limited slip differential would be much slower to react to the onset of wheel slip than the present LSD 302.

It will be understood that FIG. 10 and its description relate to the wheel slip as a difference between the speed of the left wheel minus the speed of the right wheel, leading to obtaining negative wheel slip values when the left wheel rotates slower than the right wheel. The present technology can also be described in terms of wheel slip values for the right wheel, in which case a positive wheel slip value would be obtained when the left wheel rotates slower than the right wheel. In such a case, the present illustration would be modified in that the middle diagram 404 would be flipped so that the curve for the wheel slip 406 moves toward positive wheel slip values when the steering angle 402 moves towards negative values. The present LSD 302 and control unit 370 in fact react to differences between the speeds of the left and right driven wheels without prioritizing any of these wheels.

Figure 12A:
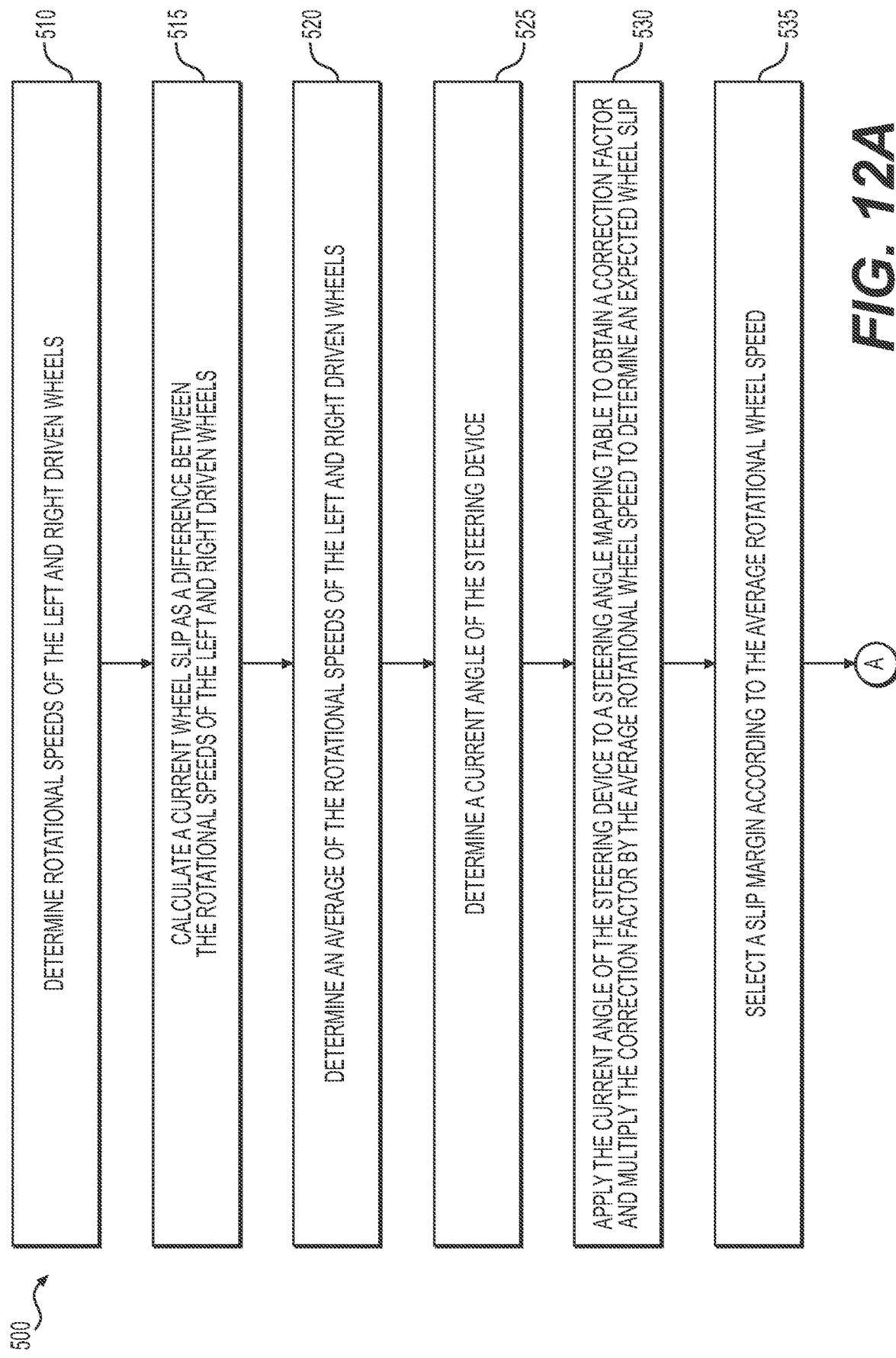
FIGS. 12a and 12b are a logic diagram showing operations of a method for controlling a limited slip differential based on a steering angle of a vehicle.
Figure 12B:
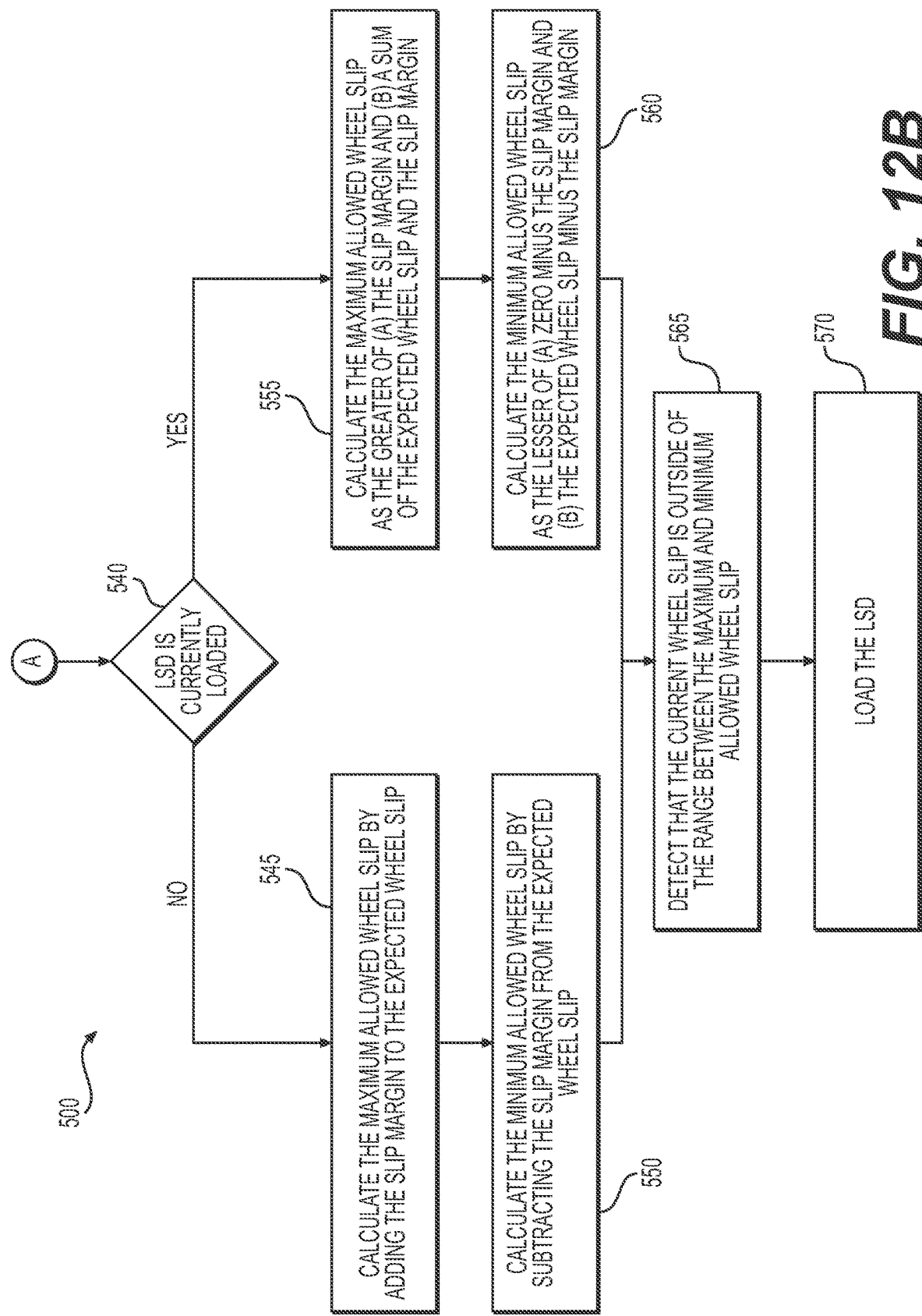

FIGS. 12a and 12b are a logic diagram showing operations of a method for controlling the LSD 302 based on a steering angle of the vehicle 40. A sequence 500 is best understood by consideration of FIGS. 12a and 12b along with FIG. 23. The sequence 500 comprises a plurality of operations that may be executed in variable order, some of the operations possibly being executed concurrently, some of the operations being optional. The sequence 500 may be implemented in a vehicle, for example the vehicle 40. The vehicle 40 has a steering device, for example the steering wheel 58. The vehicle may alternatively implement a handlebar as a steering device. A limited slip differential (LSD), for example the LSD 302, is connected to the half-shafts 98 of the vehicle 40. Left and right driven wheels such as the front wheels 44 are operably connected to the LSD 302 via the half-shafts 98.

In the sequence 500, operation 510 comprises determining rotational speeds of the left and right driven wheels 44. A current wheel slip 406 is calculated at operation 515 as a difference between the rotational speeds of the left and right driven wheels 44. The wheel slip 406 may either be calculated as the speed of the left wheel minus the speed of the right wheel or as the speed of the right wheel minus the speed of the left wheel. Operation 520 comprises determining the average rotational speed 1202 of the left and right driven wheels 44. The steering angle 1204 is determined at operation 525. Operation 530 comprises applying the current steering angle 1204 to the steering angle mapping table (Table I) to obtain the correction factor 1222 and multiplying the correction factor 1222 by the average rotational speed 1202 to determine the expected wheel slip 1226. The slip margin 1210 is selected at operation 535 by applying the average rotational wheel speed 1202 to the slip mapping table, which is a representation of diagrams 414 and 418 in the control unit 370.

At operation 540, the control unit 370 determines whether or not the LSD 302 is currently loaded, and sets or resets the binary status 1206 of the LSD 302 accordingly. If the binary status 1206 is not set, the switch 1228 allows the maximum allowed wheel slip 408 to be calculated at operation 545 by adding the slip margin 1210 to the expected wheel slip 1210 in the adder 1212. Also if the binary status 1206 is not set, the switch 1230 allows the minimum allowed wheel slip 410 to be calculated at operation 550 by subtracting the slip margin 1210 from the expected wheel slip 1226, the adder 1218 effectively adding the expected wheel slip 1226 to the negative version 1216 of the slip margin 1210.

If, at operation 540, the LSD 302 is loaded, the binary status 1206 is set, and one of the AND boxes 1240 and 1242 outputs a logical 1, depending on the steering angle 1204. As expressed in the foregoing description of FIG. 23, outputs of the AND boxes 1240 and 1242 are respectively applied to the switches 1228 and 1230, causing the outputs 1244 and 1246 of the switches 1228 and 1230 to be equal either to the expected wheel slip 1226 or to the fixed values 1248 and 1250, which are both equal to 0 RPM. If for example the steering angle 1204 is negative (the logical value 1236 is set) and LSD 302 is loaded, causing the binary status 1206 to be set, the AND box 1240 issues a logical 1, causing the output 1244 of the switch 1228 to be set to 0 RPM. At that time, because the steering angle 1204 is negative, the expected wheel slip 1226 is also negative. Consequently, when the binary status 1206 is set, the output 1244 of the switch 1228 is the greater of the expected wheel slip 1226 or 0 RPM. This output 1244 is added to the slip margin 1210 by the adder 1212. As a result, the maximum allowed wheel slip 408 is calculated at operation 555 as the greater of: (a) the slip margin 1210; and (b) a sum of the expected wheel slip 1226 and the slip margin 1210. In an equivalent manner, if the binary status 1206 is set, the minimum allowed wheel slip 410 is calculated at operation 560 as the lesser of: (a) the slip margin 1210 expressed in the negative 1216; and (b) the expected wheel slip 1226 minus the slip margin 1210.

Operation 565 comprises detecting that the current wheel slip 406 is outside the range between the maximum and minimum allowed wheel slips 408 and 410. This detection made at operation 565 causes the setting of the binary status 1206, if not previously set. If not previously loaded, the LSD 302 is loaded at operation 570. Increasing the loading of the LSD 302 following the detection made at operation 565, if the LSD 302 was previously loaded, is also contemplated.

Returning to FIGS. 10 and 13, operation 570 may end, for example, at the 18-second mark (dashed line 434) and at the 22.5-second mark (dashed line 438), when the torque TqDiff falls to zero, at which time the binary status 1206 of the LSD 302 may be reset by the control unit 370.

Figure 14:
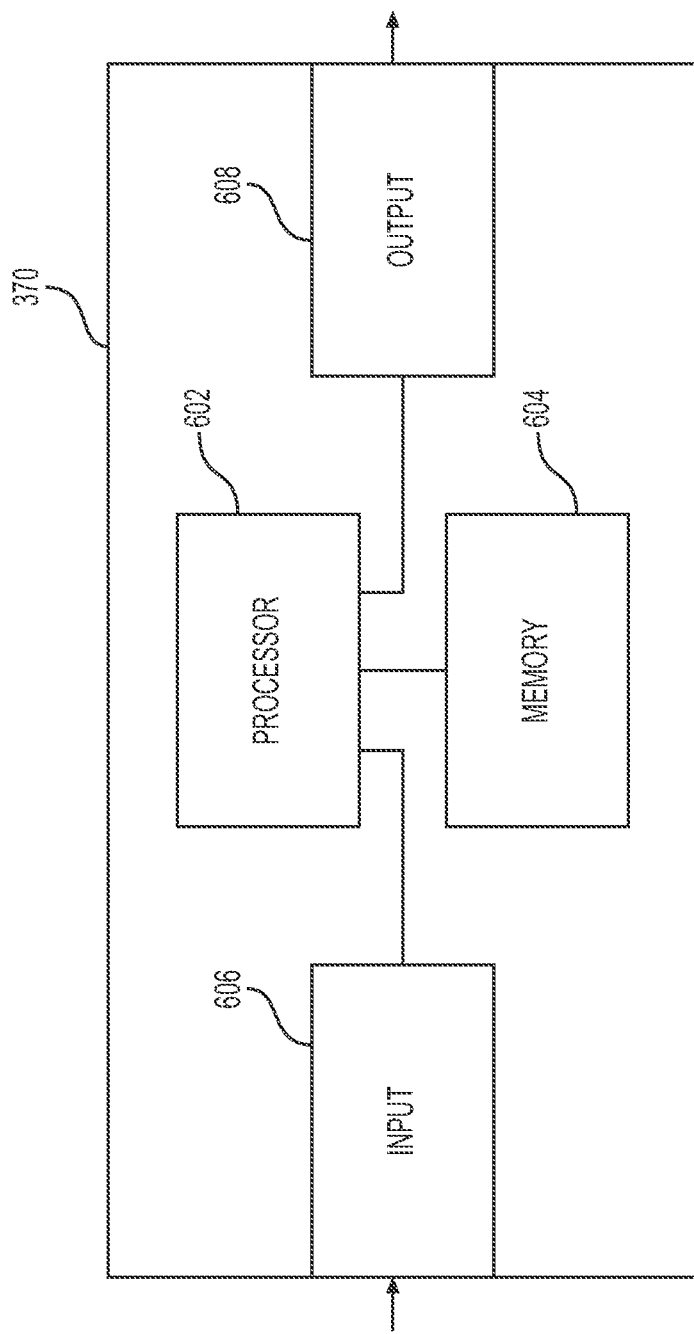
FIG. 14 is a block diagram of a control unit for the limited slip differential.

Each of the operations of the sequences 500 and 450 may be configured to be processed by one or more processors, the one or more processors being coupled to a memory. In more details, FIG. 14 is a block diagram of an exemplary control unit 370. The control unit 370 comprises a processor 602 operatively connected to a memory 604, an input port 606 and an output port 608. The processor 602 may include a plurality of co-processors. The memory 604 may include one or more memory modules. The input port 606 may include a plurality of input modules. Likewise, the output port 608 may include one or more output modules. The input port 606 and the output port 608 may be integrated as an input/output module.

In an implementation, the input port 606 receives signals and measurements from the wheel speed sensors 376, 378 and the steering angle sensor 390, and may further receive measurements form the vehicle speed sensor 380. The output port 608 provides control commands to the actuator 372 of the LSD 302 and to the solenoid 382 for loading and/or locking the LSD 302. The memory 604 stores configuration information for the control of the LSD 302, including the maximum steering angle or the vehicle 40, for example +/−360 degrees, the slip ratio for the vehicle 40, for example 30%, and the slip mapping table of the relations between values of the slip margin 420 and speed 416 of the front wheels 44.

In operation, the processor 602 analyses speed measurements for both wheels driven by the LSD 302 as well as the current steering angle. The processor 602 averages the speed measurements of the driven wheels 44 provided by the wheel speed sensors 376, 378. Use of measurements from the vehicle speed sensor 380 is also contemplated. Based on the current steering angle, on the average rotational speed of the wheels 44 and based on the slip ratio stored in the memory 604, the processor 602 calculates an expected wheel slip for the wheels 44. The processor 602 also reads the slip margin for the average rotational speed of the wheels 44 from the memory 604 and calculates the maximum and minimum allowed wheel slips by respectively adding and subtracting the slip margin to and from the expected wheel slip.

The processor 602 also calculates a current wheel slip as a difference between the rotational speeds of the left and right driven wheels 44. The processor 602 may calculate a loading level that should be applied to the LSD 302. If the wheel speed measurements show that the current wheel slip is within the range defined by the maximum and minimum allowed wheel slips 420 and 410, the processor 602 may determine that no load is needed; however, the processor 602 may still determine that some load is to be applied to the LSD 302 for other reasons. If the processor 602 determines that the wheel slip is beyond the range defined by the maximum and minimum allowed wheel slips 408 and 410, it may cause the output port 608 to provide a control command to the actuator 372, in turn causing the actuator 372 to start applying load to the LSD 302. The loading level for controlling the LSD 302 may for example be calculated as a function of a magnitude of the wheel slip or as a function of a difference between the actual wheel slip and the range defined by the maximum and minimum allowed wheel slips 408 and 410. The calculated loading level may be part of the control command provided to the actuator 372, for example in the form of a voltage or a current applied to the electric motor 288, this voltage or current being calculated to provide the calculated TqDiff value to be applied on the clutch 374. The processor 602 being continuously informed of the wheel speed measurements, the processor 602 may thus continuously recalculate the amount of load. Under some conditions, for example at maximum loading of the LSD 302 or when the loading is maintained for an extended period of time, the processor 602 may cause the output port 608 to provide another command to the solenoid 382 to lock the LSD 302. The processor 602 may then remove the application of loading and/or locking to the LSD 302 when the conditions that caused the loading of the LSD 302 are no longer present.

As the average rotational speed of the wheels 44 may constantly change, the processor 602 continuously reevaluates the expected wheel slip for the wheels 44 and the maximum and minimum allowed wheel slips 408 and 410 in view of the changing expected wheel slip. The processor may obtain a new value of the slip margin from the memory 604 as the average rotational speed of the wheels 44 changes.

In an implementation, while any load is applied to the LSD 302 for any reason, the processor 602 continuously recalculates the maximum and minimum allowed wheel slips 408 and 410 so that the maximum allowed wheel slip 408 remains equal or greater than the slip margin and so that the minimum allowed wheel slip 410 remains equal or lower than the slip margin expressed in the negative.

Control of the LSD 302 Based on an Engine Torque (Rock Crawling Mode)

Another aspect of the present technology provides control of the LSD 302 connected to the driven wheels 44 of the vehicle 40, this control being based at least in part on a current output torque of the engine 62, on a position of an accelerator control, and on an average speed of the wheels 44. The LSD 302 is preloaded in the sense that it is placed in condition for limiting an eventual slip between the two wheels 44 before an actual slip occurrence.

In an implementation, the user of the vehicle 40 can activate this feature, for example by setting the toggle switch 65 (FIG. 3) to the rock crawling mode. In the rock crawling mode, the control unit 370 determines whether or not to apply a preload to the LSD 302, this determination being based on the current output torque of the engine 62, on a current speed of the vehicle 40, and on a user demand placed on the engine 62 via the accelerator control. The user demand is detected by considering the position of the accelerator control, for example an accelerator pedal 91 (FIG. 2). It is contemplated that a twist accelerator (not shown) or a pushbutton (not shown) mounted on a handlebar (not shown) could be used as an accelerator control. Considering for example a relatively low speed of the vehicle 40 concurrent with a high output torque of the engine 62 and/or with a sudden heavy actuation of the accelerator control, the user may be leading to vehicle 40 into a steep incline, for example readying the vehicle 40 for climbing on a rocky surface. Preloading the LSD 302 at that time, in view of an engine torque that can be predicted based on the position of the accelerator control, enhances the control of the vehicle 40 provided to the user by preventing wheel slip before it actually happens.

Table II is a non-limiting example of a loading mapping table that may be used by the control unit 370 to control a preload of the LSD 302. The table shows torque values for application on the clutch 374 of the LSD 302, in Newton-meters (Nm), as a function of a predicted engine torque, also in Nm, and as a function of a speed of the vehicle 40, the speed being expressed both in kilometers per hour (KMH) and as an average of the rotational speeds of the left and right wheels 44 in revolutions per minute (RPM).

TABLE II

| | | Average Wheel Speed (RPM) | | | | | | | |
|---|---|---|---|---|---|---|---|---|---|
| | | 0 | 50 | 100 | 150 | 200 | 250 | 300 | 400 |
| | | Vehicle Speed (KMH) | | | | | | | |
| | | 0.0 | 6.7 | 13.3 | 20.0 | 26.7 | 33.3 | 40.0 | 53.3 |
| Predicted Engine | −20 | Null | Null | Null | Null | Null | Null | Null | Null |
| | 10 | Null | Null | Null | Null | Null | Null | Null | Null |

TABLE II-continued

| | | Average Wheel Speed (RPM) | | | | | | | |
|---|---|---|---|---|---|---|---|---|---|
| | | 0 | 50 | 100 | 150 | 200 | 250 | 300 | 400 |
| | | Vehicle Speed (KMH) | | | | | | | |
| | | 0.0 | 6.7 | 13.3 | 20.0 | 26.7 | 33.3 | 40.0 | 53.3 |
| Torque (Nm) | 20 | 0 | Null | Null | Null | Null | Null | Null | Null |
| | 30 | 100 | 100 | 0 | Null | Null | Null | Null | Null |
| | 40 | 200 | 200 | 150 | 100 | 0 | Null | Null | Null |
| | 50 | 300 | 300 | 250 | 200 | 100 | Null | Null | Null |
| | 70 | 400 | 400 | 400 | 300 | 200 | Null | Null | Null |
| | 90 | 500 | 500 | 500 | 500 | 500 | Null | Null | Null |

For illustration purposes, assuming an overall wheel diameter of about 71 centimeters, Table II provides torque values applied on the clutch 374 of the LSD 302 for speeds of the vehicle 40 up to about 53.3 KMH, corresponding to a wheel speed of 400 RPM, and for various predicted engine torque values.

Also in Table II, Null values reflect that the control unit 370 does not cause the application of any preload to the LSD 302 for corresponding combinations of predicted engine torque and of vehicle speed values. Though not shown in the particular example of Table II, the loading mapping table may also use Null values to represent situations where the electric motor 288 does not apply pressure to the clutch 374 while, at the same time, the clutch 274 and the LSD 304 are locked by energizing the solenoid 382 to lock the gear set 276. Examples of Null values reflecting locking the LSD 304 by use of the solenoid are introduced hereinbelow.

The control unit 370 may determine the speed of the vehicle 40 either based on the measurements from the vehicle speed sensor 380 or by averaging the measurements from the wheel speed sensors 376, 378. The control unit 370 also receives an engine torque measurement from the engine torque monitor 394. In an implementation, the engine torque monitor 394 determines the engine output torque based on admitted air and fuel measurements and based on an ignition timing advance. Use of a torque sensor operatively connected to the engine 62 is also contemplated.

The control unit 370 controls a torque to be applied on the clutch 374 of the LSD 302 in view of the predicted engine torque, as determined from the loading mapping table of Table II. The torque value to be applied on the clutch 374 is converted by the control unit 370 into a level of current that should be provided to the electric motor 288 to provide the desired preload level. This conversion is dependent on characteristics of the electric motor 288, of the gear set 276 and of the clutch 374. In a particular implementation in which the electric motor 288 is a 12-volt DC motor, a 500 Nm torque value applied to the clutch 374 is obtained by applying a 10 amperes current to the electric motor 288. The electric motor 288 may alternatively be a step motor, in which case the control unit 370 determines a number of steps sufficient to cause the electric motor 288 to apply the desired preload level to the LSD 302. It is also contemplated that the control unit 370 may use pulse width modulation to control the electric motor 288.

In a variant of the present technology, multiple tables similar to Table II may be defined in the control unit 370. Use of distinct loading mapping tables defined for different available gear ratios of the transaxle 66, as reported to the control unit 370 by the shifter position indicator 396 may be contemplated as well.

Without limitation, the above described shifter 60 for the transaxle 66 allows the driver to select between a reverse gear, high and low forward gears and a neutral position. For illustration purposes, the loading mapping table of Table II may apply to the reverse gear and to the low forward gear. When the high forward gear of the transaxle 66 is selected by the shifter 60, a distinct loading mapping table is applied by the control unit 370. Table III provides a non-limiting example of a loading mapping table applicable when the transaxle 66 is in high gear:

TABLE III

| | | Average Wheel Speed (RPM) | | | | | | | |
|---|---|---|---|---|---|---|---|---|---|
| | | 0 | 50 | 100 | 150 | 200 | 250 | 300 | 400 |
| | | Vehicle Speed (KMH) | | | | | | | |
| | | 0.0 | 6.7 | 13.3 | 20.0 | 26.7 | 33.3 | 40.0 | 53.3 |
| Predicted Engine Torque (Nm) | −20 | Null | Null | Null | Null | Null | Null | Null | Null |
| | 10 | Null | Null | Null | Null | Null | Null | Null | Null |
| | 20 | Null | Null | Null | Null | Null | Null | Null | Null |
| | 30 | 0 | Null | Null | Null | Null | Null | Null | Null |
| | 40 | 100 | 100 | 0 | Null | Null | Null | Null | Null |
| | 50 | 200 | 200 | 150 | 100 | 0 | Null | Null | Null |
| | 70 | 300 | 300 | 250 | 200 | 100 | Null | Null | Null |
| | 90 | 400 | 400 | 400 | 300 | 200 | Null | Null | Null |

When the transmission is in high gear, for a given predicted engine torque and a given vehicle speed, the torque applied on the clutch 374 of the LSD 302 is lower than when the transmission is in low gear, with the predicted engine torque and the same vehicle speed. In the non-limitative example of Table III, when the transaxle 66 is in high gear, torque values applied on the clutch 374 of the LSD 302 as a function of the predicted engine torque and as a function of a speed of the vehicle 40 are shifted toward the bottom of the loading mapping table so that, for example, when in high gear, preloading is applied for a predicted engine torque of 90 Nm at the same level as for a predicted engine torque of 70 Nm when in low gear.

In the same or another variant of the present technology, an estimation of the desired acceleration by the user of the vehicle 40 may be made by the control unit 370. To this end, the control unit 370 uses real-time information from the accelerator control sensor 392. The accelerator control sensor 392 provides signals indicative of a current position of the accelerator control actuated by the user of the vehicle 40, for example the accelerator pedal 91 (FIG. 2). It is contemplated that the accelerator control sensor 392 may alternatively provide a position of a butterfly valve in a throttle of the engine 62. The control unit 370 determines an acceleration of the accelerator control position based on the real-time information provided by the accelerator control sensor 392. A large, positive acceleration of the accelerator control position indicates that the user wishes the vehicle 40 to accelerate rapidly. A large, negative acceleration (i.e. deceleration) of the accelerator control position indicates that the user intends the vehicle 40 to slow down rapidly. It may be noted that the accelerator control sensor 392 is expected to react more rapidly than the driveline of the vehicle 40, including the engine 62, the CVT 64, the transaxle 66, and the like. As such, the control 370 is able to modify the preload to the LSD 302 before the actual increase or decrease of torque from the engine 62 becomes present at the input shaft 90.

The preload may thus be based on a predicted engine torque calculated according to equation (1):

$$\text{predicted\_engine\_torque} = \qquad (1)$$
$$\text{sensed\_torque} + \frac{\partial \text{taccelerator\_position}}{\partial t} \cdot \text{constant}$$

Wherein:
predicted_engine_torque is a prediction of the engine output torque;
sensed_torque is a measurement of the engine output torque;
accelerator_position is a measurement of the accelerator control position;

$$\frac{\partial \text{taccelerator\_position}}{\partial t}$$

is a rate of change of the accelerator control position over time; and
constant is a constant whose value is predetermined based on characteristics of the driveline of the vehicle 40.

Per equation (1), the predicted engine torque is therefore calculated by adding a torque adjustment, which is proportional to the rate of change of the accelerator control position over time, to the actual engine output torque as measured.

In an implementation, the control unit 370 implements equation (1) to calculate the predicted engine torque. In an alternative implementation, the control unit 370 uses a torque mapping table to store relations between the predicted engine torque, the accelerator control position and the rate of change of the accelerator control position.

Figure 15:
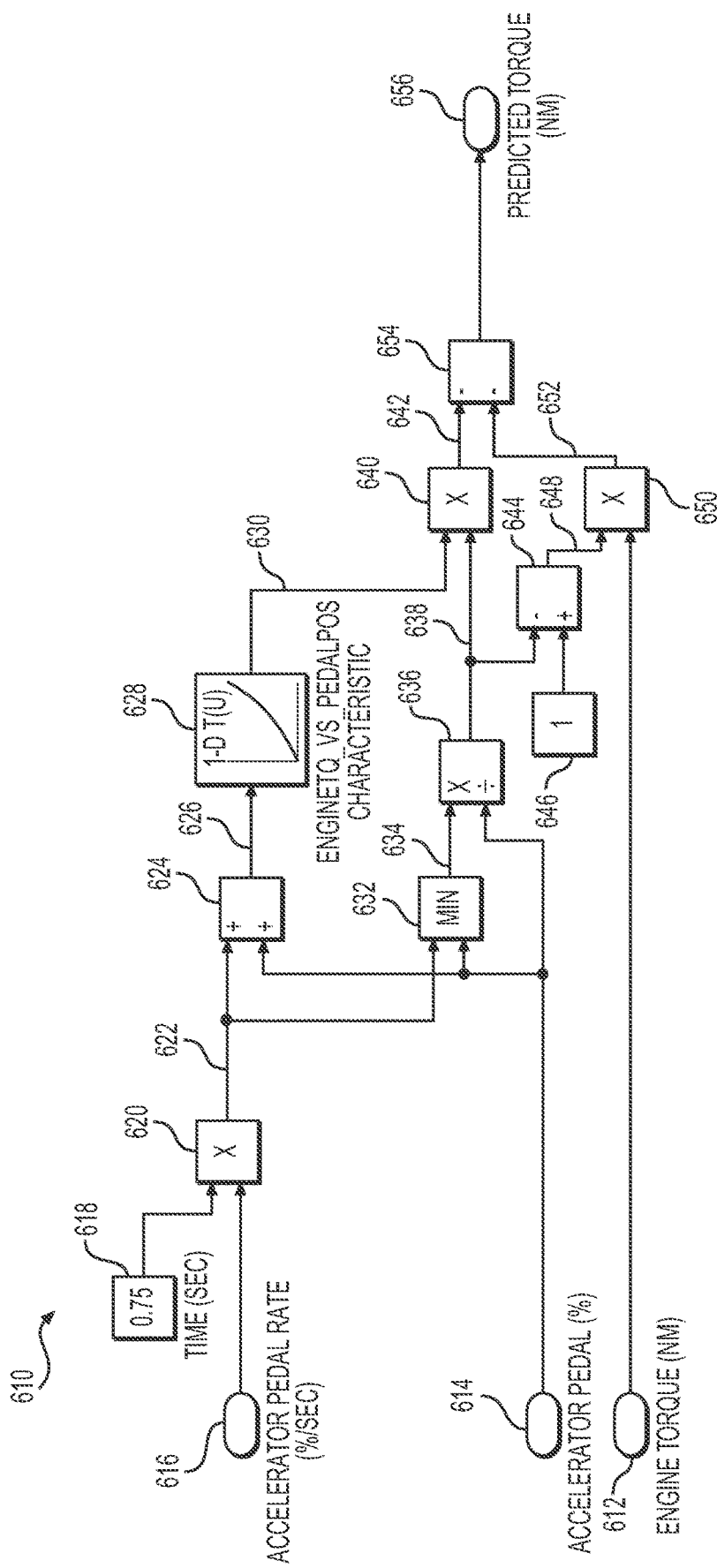
FIG. 15 is a block diagram showing internal operations of the control unit for determining the predicted engine torque, according to an implementation.

FIG. 15 illustrates a block diagram showing internal operations of the control unit 370 for determining the predicted engine torque, according to an implementation. The block diagram 610 shows that up to three (3) inputs may be used by the control unit 370 to determine the predicted engine torque. It is contemplated that, in an implementation, the control unit 370 may use additional inputs to determine the predicted engine torque. One such input is a current engine output torque 612, expressed in Nm, this value being provided to the control unit 370 by the engine torque monitor 394. Another input is a current accelerator control position 614, expressed in percentage, for example the position of the accelerator pedal 91, this value being provided to the control unit 370 by the accelerator control sensor 392. Yet another input is a rate of change 616 of the accelerator, expressed in a percent variation of the accelerator position per second. In the implementation of FIG. 15, the rate of change 616 of the accelerator is determined by the control unit 370 based on a signal by the accelerator control sensor 392. In a variant, the control unit 370 may internally track changes to the accelerator control position 614 to calculate the rate of change 616 of the accelerator.

The rate of change 616 of the accelerator is multiplied by a predetermined time-limiting interval 618 by a multiplier 620 to provide an accelerator control gain 622. In the non-limiting example of FIG. 15, the time-limiting interval 618 is equal to 0.75 second. This value implies the rate of change 616 of the accelerator is considered over a 0.75-second period. The accelerator control gain 622 and the accelerator control position 614 are applied to an adder 624. The adder 624 outputs an equivalent accelerator control position 626 that may be greater than 100% and thus exceed a realistic complete opening. This equivalent accelerator control position 626 is applied to a block 628. The block 628 is illustrated as a graphical representation of a torque mapping table that provides an engine torque estimate 630 as a function of the equivalent accelerator control position 626. Table IV provides a non-limiting example of a content of the torque mapping table that may be used by the control unit 370.

TABLE IV

| Equivalent accelerator control position 626 (%) | Engine Torque Estimate 630 (Nm) |
| --- | --- |
| 0 | 0 |
| 9 | 8.5 |
| 20 | 17.2 |
| 30 | 27.9 |
| 40 | 41.7 |
| 50 | 56.4 |
| 60 | 70.4 |
| 70 | 83.6 |
| 80 | 118.6 |
| 100 | 175 |
| 120 | 175 |

The accelerator control position 614 and the accelerator control gain 622 are also applied to a selection box 632 that selects the lower of these two (2) inputs. The selection box 632 then outputs a minimum accelerator control position 634, which is the lower of the accelerator control position 614 and the accelerator control gain 622. A divider 636 divides the minimum accelerator control position 634 by the accelerator control position 614 to provide an accelerator control correction factor 638 to be applied to the engine torque estimate 630. The accelerator control correction factor 638 is in a range between zero (0) and one (1), and is dimensionless. If both the minimum accelerator control position 634 and the accelerator control position 614 are equal to zero, the accelerator control correction factor 638 is set to one (1). A multiplier 640 multiplies the engine torque estimate 630 by the accelerator control correction factor 638 to provide a projected torque 642. Because the accelerator control correction factor 638 is defined in a range between zero and one, the projected torque 642 is less than or equal to the engine torque estimate 630. Otherwise stated, the accelerator control correction factor 638 limits the engine torque estimate 630 in view of a realistic accelerator control position prediction. A subtractor 644 subtracts the accelerator control correction factor 638 from unity 646 (i.e. from one (1)) to produce a torque correction factor 648. A multiplier multiplies the engine output torque 612 by the torque correction factor 648 to produce a torque correction 652. The torque correction 652 is added to the projected torque 642 in an adder 654 to produce the desired value, which is a predicted engine torque 656.

Whether an implementation determines the predicted engine torque according to equation (1) or using the operations described in relation to FIG. 15, the effect of determining the predicted engine torque is similar. For illustration purposes, though the engine output torque may at a given time be equal to 20 Nm for example, as reported by the engine torque monitor 394, a detection that the user is heavily acting upon the accelerator control may lead to the calculation of a predicted engine torque of 90 Nm for example. Assuming that, at that time, the speed of the vehicle 40 is 20 KMH, the torque to be applied on the clutch 374 would change from Null to 500 Nm. To control the preload, the control unit 370 inputs the predicted engine torque in the loading mapping tables of Table II and III, one of these loading mapping tables being selected according to the position of the shifter 60. In the above example, LSD 302 would rapidly move from a no preload condition to a maximum preload condition, this result being reached much faster than when the LSD 302 is loaded following the detection that the front wheels 44 are slipping. Depending on characteristics of the engine 32, the CVT 64, the driveshafts 82, 84 and the LSD 302 itself, the LSD 302 will reach the maximum preload condition before any actual change of a torque at the input shaft 90 of the LSD 302. It may be noted that the rate of change of the accelerator control position over time may be negative if the user releases the acceleration control. The predicted engine torque may therefore be lower than the engine output torque as measured, potentially causing a reduction or a release of the preload.

Figure 16:
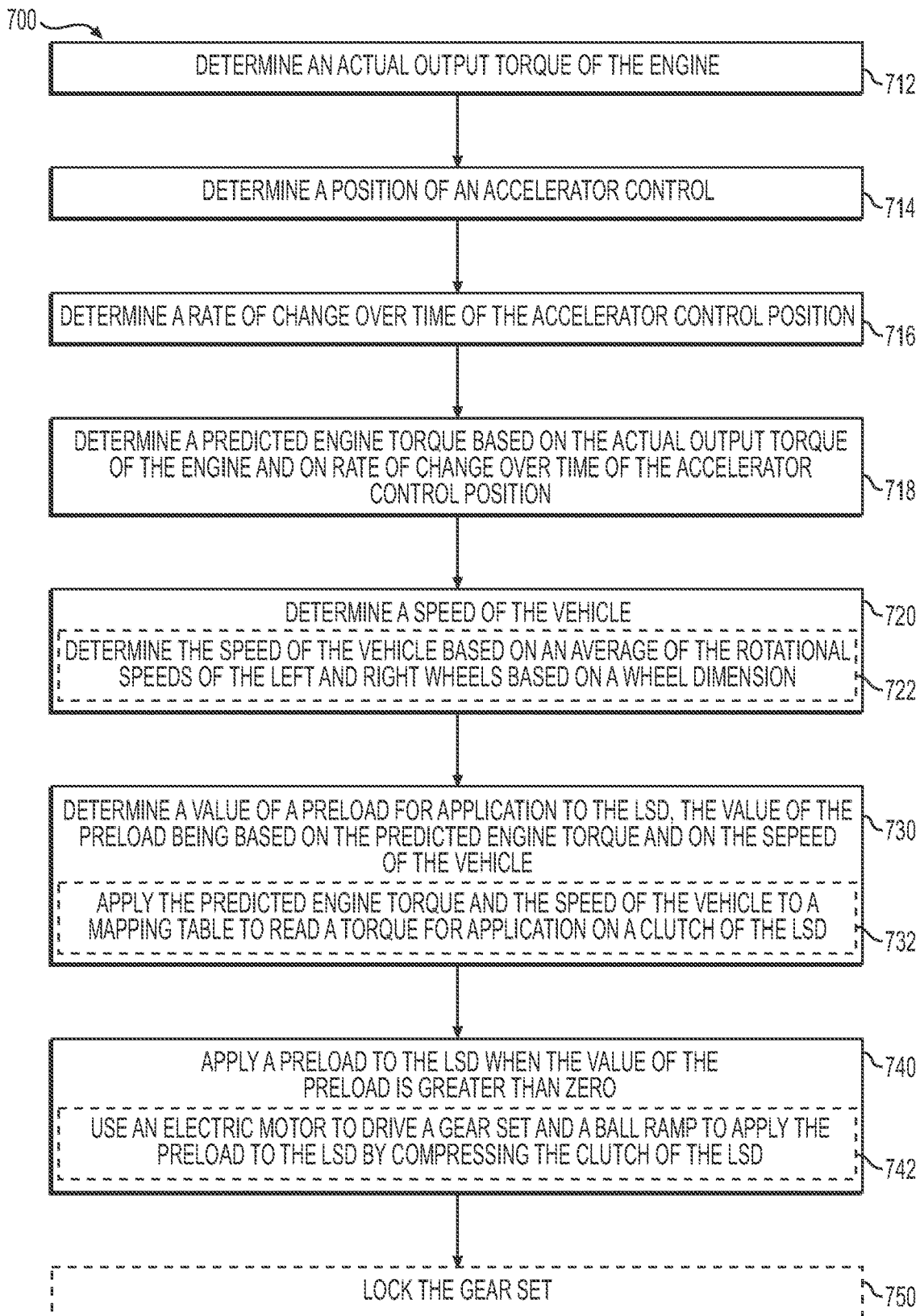
FIG. 16 is a logic diagram showing operations of a method for controlling a limited slip differential based on an engine torque.

FIG. 16 is a sequence diagram showing operations of a method for controlling the LSD 302 based on an engine torque, an accelerator control position and a rate of change of the accelerator control position. A sequence 700 comprises a plurality of operations that may be executed in variable order, some of the operations possibly being executed concurrently, some of the operations being optional. The sequence 700 may be implemented in a vehicle, for example the vehicle 40. The vehicle 40 has an engine and may have a transmission, for example the engine 62 and the CVT 64 coupled to the transaxle 66. A limited slip differential (LSD), for example the LSD 302, is operatively connected via the half-shafts 98 to wheels 44 driven by the engine 62. Torque from the engine 62 is applied to the LSD 302 via the input shaft 90.

In the sequence 700, operation 712 comprises determining a current output torque of the engine 62, this engine torque measurement being provided to the control unit 370 by the engine torque monitor 394. The control unit 370 determines a position of the accelerator control at operation 714 based on a measurement from the accelerator control sensor 392. A rate of change over time of the position of the accelerator control is determined at operation 716. The rate of change over time of the position of the accelerator control may be provided to the control unit 370 by the accelerator control sensor 392. Alternatively, the control unit 370 may calculate this rate of change based on successive measurements provided by the accelerator control sensor 392. The control unit 370 determines a predicted engine torque at operation 718, the predicted engine torque being based on the current output torque of the engine and on the rate of change over time of the position of the accelerator control. In operation 718, the control unit 370 may add the torque adjustment to the current output torque of the engine, according to equation (1). Alternatively, in operation 718, the control unit 370 may implement the operations of the block diagram 610 of FIG. 15. Another alternative in which the control unit 370 applies the current output torque of the engine, the position of an accelerator control and the rate of change over time of the position of the accelerator control to a three-dimensional look-up table to obtain the value of the predicted engine torque is also contemplated.

Then, a speed of the vehicle 40 is determined at operation 720. The speed of the vehicle 40 may be provided to the control unit 370 by the vehicle speed sensor 380. Alternatively, the operation 720 may include sub-operation 722 comprising measuring, by the wheel speed sensors 376, 378, rotational speeds of the left and right wheels 44. This measurement is provided to the control unit 370 that determines an average of the rotational speeds of the left and right wheels 44 to determine the speed of the vehicle 40, based on this average and further based on a dimension of the left and right wheels 44.

Operation 730 then comprises determining a value of a preload for eventual application to the LSD 302, the value of the preload being based on the predicted engine torque and on the speed of the vehicle 40. In an implementation, the operation 730 may comprise sub-operation 732 in which the predicted engine torque and the speed of the vehicle 40 are applied by the control unit 370 to a loading mapping table to read therefrom a value of a torque to be applied on the clutch 374 of the LSD 302. In a variant, the control unit may select the loading mapping table among a plurality of loading mapping tables, for example those illustrated in Tables II and III, according to a position of the shifter 60, this position being provided to the control unit 370 by the shifter position indicator 396.

Considering the loading mapping tables illustrated in Tables II and III, the value of the preload for application to the LSD 302, expressed in the form of a torque to be applied on the clutch 374 in the present example, may be zero (or Null) or may be greater than or equal to zero. At operation 740, the control unit 370 conditionally causes the application of a preload to the LSD 302, this application being conditional to the value of the preload being greater than zero (i.e. not Null or negative). Operation 740 may comprise sub-operation 742, in which the control unit 370 controls the electric motor 288 to drive the gear set 276 and the ball ramp 278 to compress the clutch 374 according to the torque value obtained from the loading mapping table. This operation loads the LSD 302, thereby preventing or reducing a rotational speed difference of the left and right wheels 44.

Optionally, the gear set 276 may be locked at operation 750. To this end, the control unit 370 may use the solenoid 382 to lock the gear set 276.

Each of the operations of the sequence 700 may be configured to be processed by one or more processors, the one or more processors being coupled to a memory, for example the processor 602 and the memory 604 of the control unit illustrated in FIG. 14.

In an implementation, the input port 606 receives signals and measurements from the wheel speed sensors 376, 378, the vehicle speed sensor 380, the accelerator control sensor 392, the engine torque monitor 394 and the shifter position indicator 396. The output port 608 provides commands to the actuator 372 of the LSD 302 and to the solenoid 382 for preloading and/or locking the LSD 302. The memory 604 stores configuration information for the control of the LSD 302, including for example a loading mapping table or a plurality of such loading mapping tables for a plurality of positions of the shifter 60, a torque mapping table of an engine torque estimate as a function of an accelerator control position, and dimensions of the wheels 44 expressed as a radius, a diameter or as a circumference.

In operation, the processor 602 analyses measurements obtained from the vehicle speed sensor 380 and/or measurements from the wheel speed sensors 376, 378 to determine a speed of the vehicle 40. In an implementation using the measurements from the wheel speed sensors 376, 378, the control unit determines the speed of the vehicle 40 based on an average of the rotational speeds of the left and right wheels 44. The processor 602 also analyses measurements from the engine torque monitor 394. The processor 602 determines, based on the measurements from the engine torque monitor 394, a value of an output torque of the engine 62. Based on the value of the output torque of the engine 62 and on the speed of the vehicle 40, the processor 602 determines a value of a preload, if any, to be applied to the LSD 302. The processor 602 causes the output port 608 to provide a command to the actuator 372, in turn causing the actuator 372 to apply the preload to the LSD 302 by compressing the clutch 374.

The configuration information stored in the memory 604 may include the loading mapping table of Table II. In an implementation, the memory 604 may optionally store a plurality of loading mapping tables for each of a plurality of positions of the shifter 60, as shown for example in Tables II and III. The processor 602 may use an indication received at the input port 606 from the shifter position indicator 396 to select one of these loading mapping tables in the memory 604. In any case, the processor 602 may apply the value of the output torque of the engine 62 and the speed of the vehicle 40 to the loading mapping table to determine a torque value to be applied on the clutch 374 of the LSD 302. The configuration information stored in the memory 604 may also include the torque mapping table of Table IV.

The processor 602 is optionally informed, via the input port 606, of a current position of the accelerator control provided by the accelerator control sensor 392. The accelerator control sensor 392 may also provide a rate of change of the accelerator control position, or the processor 602 may continuously determine a rate of change of the accelerator control position based on successive signals from the accelerator control sensor 392. If the processor 602 determines that the user has rapidly increased or decreased the accelerator control demand, the processor 602 may, in an implementation, apply the correction factor of equation (1) to obtain a prediction of the engine output torque of the engine 62. In another implementation, the processor 602 may implement the elements of the block diagram 610 and execute its various operations to determine the prediction of the engine output torque of the engine 62. In any case, this predicted output torque is used as the value of the output torque of the engine 62 for reading torque value to be applied on the clutch 374 of the LSD 302 from the loading mapping table, in view of preloading for the LSD 302.

The processor 602 may cause the output port 608 to provide a command to energize the solenoid 382, thereby causing the tooth 384 of the solenoid 382 to engage the gear set 276, effectively locking the LSD 302. This command to lock the LSD 302 may follow the application of a preload, for example a maximum compression of the clutch 374.

Control of the LSD 302 Optimized for Slippery Driving Conditions (Mud Mode)

A further aspect of the present technology provides control of the LSD 302 connected to the driven wheels 44 of the vehicle 40, this control being based at least in part on a detection of slippery driving conditions such as, for example, when the vehicle 40 is in deep mud or on other poorly tractable terrain. In the context of the present disclosure, the term "slippery driving conditions" is used for convenience purposes to refer to conditions such as driving on deep mud or on other very slippery surfaces, including without limitation loose gravel, icy roads, deep snow, shallow rivers, and the like. The present technology is applicable, in particular but not exclusively, to off-road vehicles.

In an implementation, the user of the vehicle 40 can activate this feature, for example by setting the toggle switch 65 (FIG. 3) to the mud mode. The control unit 370 can detect or infer that the vehicle 40 is rolling in deep mud or in other slippery driving condition using any one or a combination of three (3) situations. A first situation is when a predetermined number of wheel slip occurrences is detected. A second situation is when a wheel is slipping despite the application of a preload to the LSD 302. A third situation is when the torque output of the engine is above an engine load line.

Figure 17:
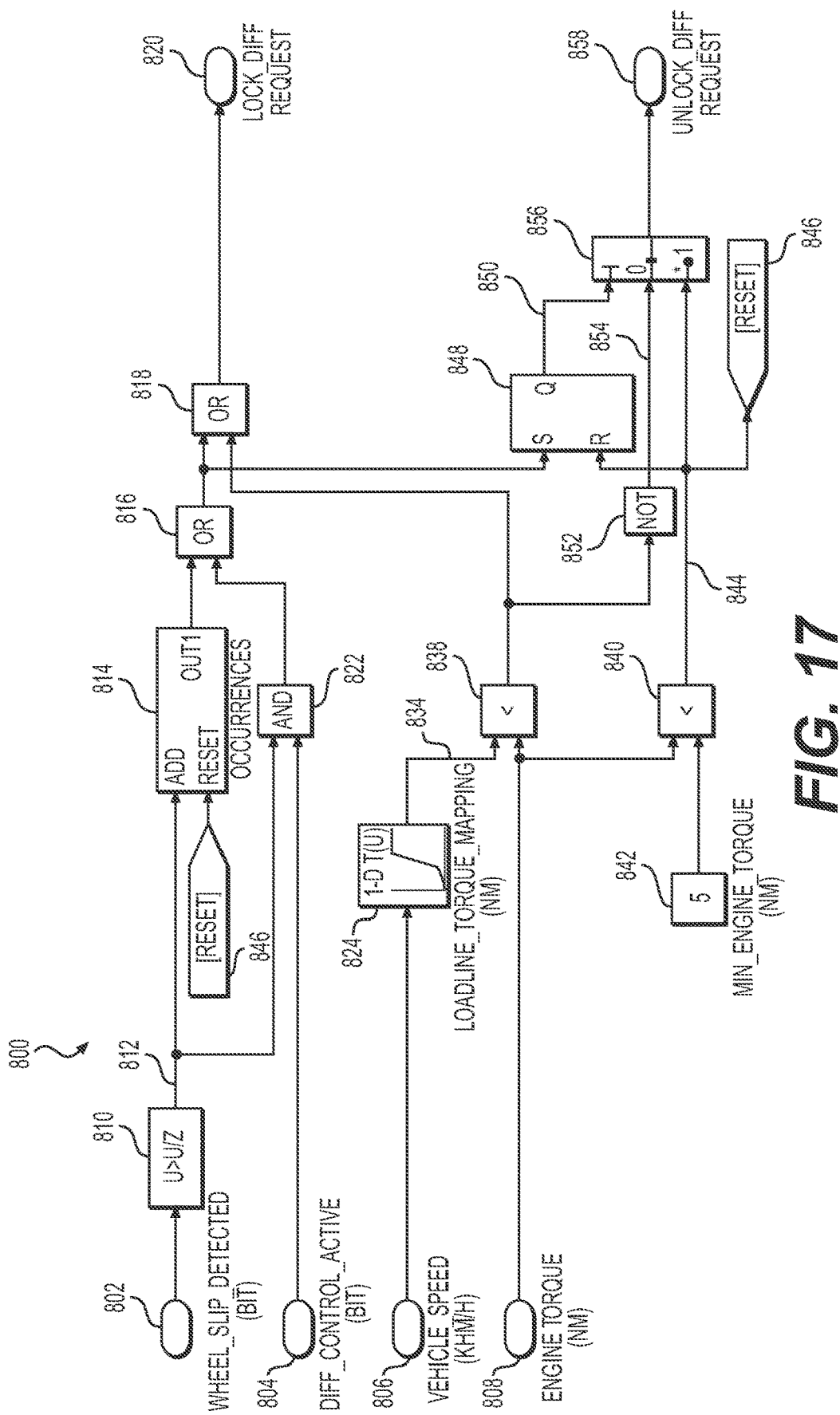
FIG. 17 is a block diagram showing internal operations of the control unit for controlling the LSD in mud mode, according to an implementation.

These three (3) situations are exemplified in FIG. 17, which is a block diagram 800 showing internal operations of the control unit 370 for controlling the LSD 302 in mud mode, according to an implementation. The block diagram 800 shows that, in the present implementation, up to four (4) inputs may be used by the control unit 370 to control the LSD 302 in the mud mode. It is contemplated that, in an implementation, the control unit 370 may use additional inputs.

One such input is a wheel slip detection 802. The wheel slip detection 802 may be internally generated by the control unit 370 when a difference between measurements of the rotational speeds of the left and right front wheels 44 from the wheel speed sensors 376, 378 indicates that one of the front wheels 44 is slipping by more than a predetermined threshold. Before detecting a wheel slip, the control unit 370 may allow a rotational speed difference exceeding a predetermined maximum difference in rotational speeds in order to account for the natural speed difference of the wheels 44 when the vehicle 40 is in a curve. For example in an implementation where the control of the LSD 302 based on a steering angle of the vehicle 40 and the control of the LSD 302 optimized for slippery driving conditions (Mud Mode) are both supported by the control unit 370, the wheel slip detection 802 may be generated when the wheel slip 406 is out of the permissible slipping range defined by the maximum and minimum allowed wheel slips 408 and 410.

A second input is an activity indication 804 for the LSD 302, this activity indication 804 being set when a load is being applied to the LSD 302 through the electric motor 288. A third input is a vehicle speed 806 that may be provided to the control unit 370 by the vehicle speed sensor 380. Alternatively, the vehicle speed 666 may equivalently be based on measurements, by the wheel speed sensors 376, 378 of rotational speeds of the left and right wheels 44, the vehicle speed 666 being deduced by the control unit 370 based on these measurements and on dimensions of the front wheels 44. A fourth input is a current engine output torque 808, expressed in Nm, this value being provided to the control unit 370 by the engine torque monitor 394.

An example will now be described with reference to FIG. 17. The block diagram 800 includes a number of logical components that implement logical AND, OR and NOT functions. The present description is made with mentions of logical 1's and 0's at the output of some of the components. This manner of describing the block diagram 800 is for simplification purposes and does not limit the present disclosure. Other implementations using opposite 0's and 1's or using other logical values, such as True or False, and implementations of the logic events of the block diagram 800 using software code, are also contemplated.

Considering the first situation, the wheel slip detection 802 is set to 1 if a wheel slip is detected, or to 0 in the absence of a wheel slip. This output is applied at an input of a change determination box 810 that briefly outputs a change indication 812 set to 1 when the input changes from 0 to 1, that is, when a wheel slip is first detected. The change indication 812 returns to 0 after a short delay and remains at 0 if the wheel slip detection 802 is changed to 0. The change indication 812 is applied to a counter 814 that counts a number of occurrences of the change indications 812 being set to 1. In effect, the counter 814 counts a number of occurrences of distinct wheel slip events. When the counter 814 exceeds a predetermined number of wheel slip occurrences, for example three (3) wheel slip occurrences, it applies a logical 1 to an input of a first OR box 816 having two (2) inputs. Then, regardless of a value applied at the other input of the first OR box 816, the first OR box 816 applies a logical 1 to an input of a second OR box 818 having two (2) inputs. Then, regardless of a value applied at the other input of the second OR box 818, the second OR box 816 issues a locking request 820 for the LSD 302. The locking request 820 may cause the application of a load to the LSD 302, for example the application of a maximum torque on the clutch 374, and may further cause to energize the solenoid 382 to effectively lock the LSD 302. The first situation is realized by repetitive wheel slips causing the locking of the LSD 302.

A reset box 846, which is described in details hereinbelow, may cause resetting of the counter 814 when the torque of the engine output torque 808 falls to a low torque set-point 842. The counter 814 is therefore expected to be reset at various times during normal operation of the vehicle 40. Use of a timer to reset the counter 814 when no wheel slip detection 802 is applied to the change determination box 810 after a predetermined time threshold is also contemplated.

Considering now the second situation, the activity indication 804 for the LSD 302, which is set when a load is applied to the LSD 302, and the change indication 812 are both applied to inputs of an AND box 822. The AND box 822 outputs a 1 when both of its inputs are set to 1, which is the case when the change indication 812 indicates that a wheel slip is detected while the activity indication 804 indicates that a load is already applied to the LSD 302. The 1 that is output from the AND box 822 propagates through the first and second OR boxes 816, 818, the latter issuing a locking request 820 for the LSD 302. The second situation is realized by the occurrence of a wheel slip while the LSD 302 is loaded causing the locking of the LSD 302.

Figure 18:
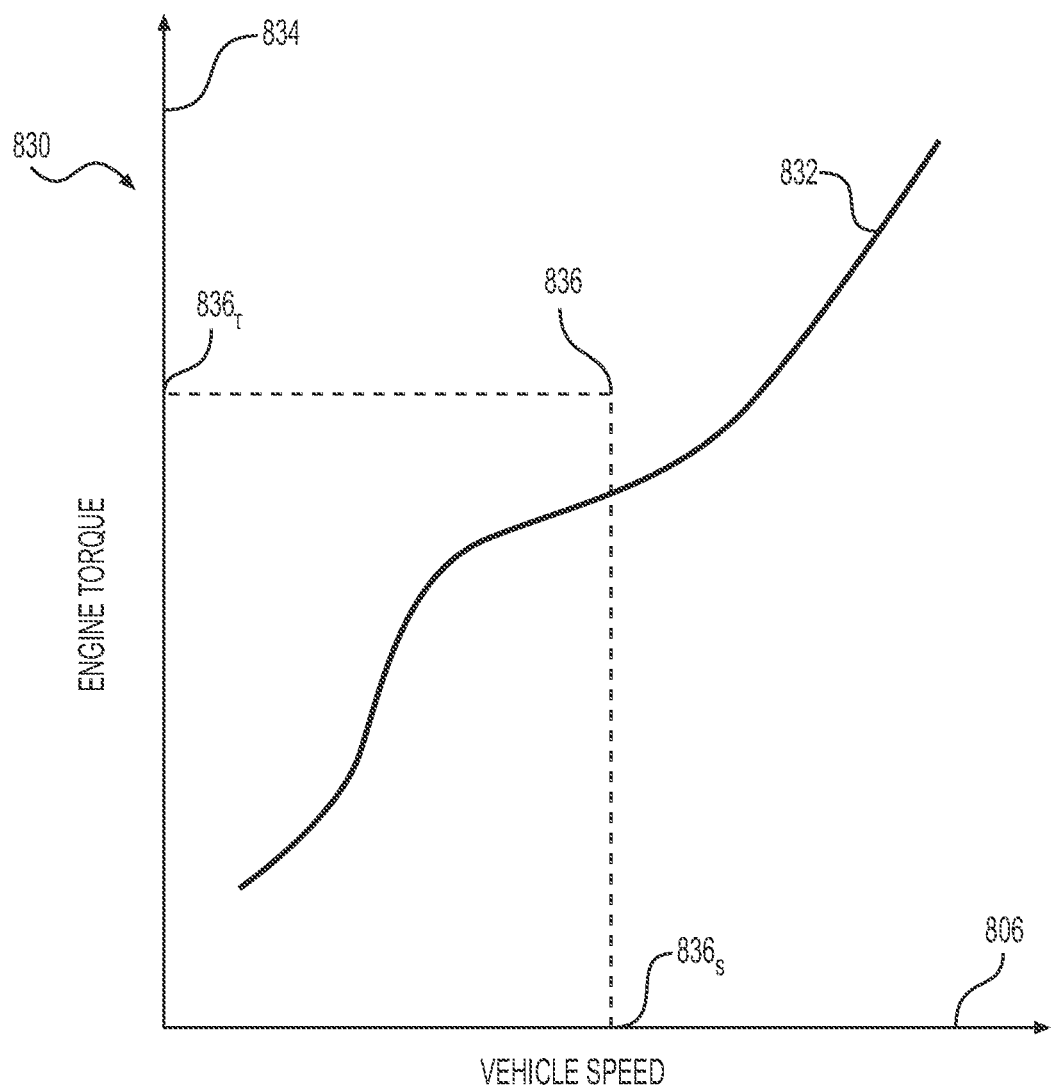
FIG. 18 is a graph of an engine load line.
Figure 19C:
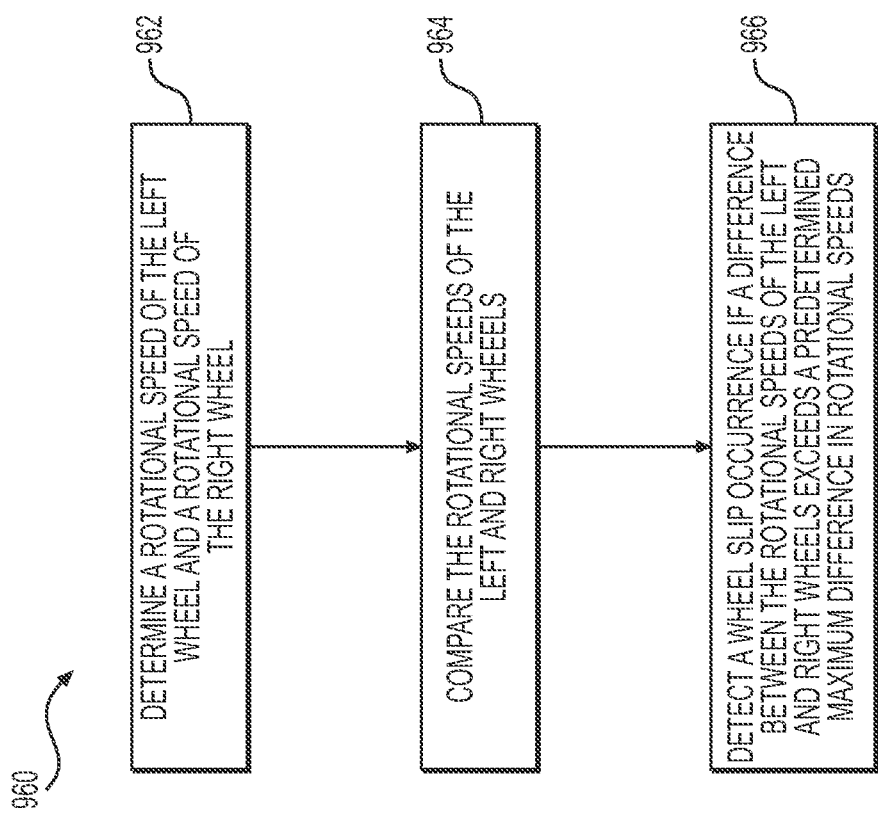

Considering now the third situation, the vehicle speed 806 is applied to a load line mapping table 824. FIG. 18 is a graph 830 of an engine load line 832. On the graph 830 shown in FIG. 18, the load line 832 is an idealized representation of an expected engine output torque 834 required to move the vehicle as a function of the vehicle speed 806 when the vehicle 40 travels along a flat level surface, with minimal external resistance. On the graph 830, a point 836 represents a situation where the vehicle 40 is rolling in deep mud or under another slippery driving condition. In that situation, an actual engine torque 836, is greater than the expected engine output torque 834 for a given speed 836$_S$ of the vehicle 40.

Table V is a non-limiting example of a load line mapping table 824 that may be used by the control unit 370 to determine when the torque requested by the user of the vehicle 40 is above the engine load line. The table shows the vehicle speed 806, expressed as an average of the rotational speeds of the left and right wheels 44 in revolutions per minute (RPM), as a function of the engine output torque 808, in Newton-meters (Nm).

TABLE V

| Vehicle Speed 806 (front wheels 44 (RPM)) | Expected Engine Output Torque 834 (Nm) |
|---|---|
| 0 | 20 |
| 20 | 20 |

TABLE V-continued

| Vehicle Speed 806 (front wheels 44 (RPM)) | Expected Engine Output Torque 834 (Nm) |
|---|---|
| 50 | 20 |
| 100 | 20 |
| 150 | 25 |
| 200 | 30 |
| 300 | 40 |
| 400 | 120 |
| 500 | 200 |
| 800 | 200 |

The load line mapping table 824 outputs the expected engine output torque 834 as a function of the vehicle speed 806. Returning to FIG. 17, the engine output torque 808 is compared with the expected engine output torque 834 by a first comparator 838. If the engine output torque 808 is greater than the expected engine output torque 834, the torque demand by the user is above the engine load line and the first comparator 838 outputs a 1 that is applied to the second OR box 818. The second OR box 818 issues a locking request 820 for the LSD 302. The third situation is realized by the excess engine torque causing the locking of the LSD 302.

When none of the inputs applied to the first and second OR boxes 816 and 818 is set to 1, their outputs are set to 0 and the locking request 820 is not issued.

Other components of the block diagram 800 are used to remove the effect of the locking request 820, if it has already been issued.

The engine output torque 808 is compared by a second comparator 840 to a low torque set-point 842, which is set to 5 Nm in the non-limiting example of FIG. 17. The second comparator 840 issues low torque indication 844 set to 1 if the engine output torque 808 is less than the low torque set-point 842. The low torque indication 844, if set to 1, causes a reset box 846 to reset the counter 814 to zero wheel slip occurrences. As a result, the counter 814 applies a logical 0 to the first OR box 816. If no logical 1 is applied to other inputs of the OR boxes 816 and 818 at that time, this may lead to the removal of the locking request 820. It may be noted that the removal of the locking request 820 is not sufficient to cause the unlocking of the LSD 302 as other operating conditions of the vehicle 40 may require that the LSD 302 remain locked.

The low torque indication 844 is also applied to a reset (R) input of a flip-flop box 848. The low torque indication 844 in fact applies a logical 1 to the R input of the flip-flop box 848 when the engine output torque 808 is lower than the low torque set-point 842.

The output of the first OR box 816 is also applied to a set (S) input of the flip-flop box 848. A logical 1 is therefore applied to the S input of the flip-flop box 848 when either of the first and second situations applies, that is when either the predetermined number of wheel slip occurrences is detected or when a wheel 44 is slipping despite the application of a preload to the LSD 302. The logical 1 is also applied to the S input of the flip-flop box 848 when both of these situations apply concurrently. The flip-flop box 848 has an output (Q) 850 that is set to 1 when the S input is set to 1. After being set to 1, the Q output 850 remains set if the S input is set to 0, until the R input of the flip-flop box 848 is set to 1, following which the Q output 850 is set to 0. Both S and R inputs are not expected to be set to 1 at the same time, as this condition would require slipping of the front wheels 44 while the engine torque 808 is very low. Regardless, the Q output 850 is set to 0 if this circumstance occurs. Summarily, the Q output 850 is set to 1 when conditions defined in the first and second situations for locking the LSD 302 are present.

The output of the first comparator 838 is negated by a NOT box 852. Its output is a load line indication 854 set to 0 when the torque demand by the user is above the engine load line and to 1 otherwise. A switch 856 has three (3) inputs to which the Q output 850 of the flip-flop switch 848, the load line indication 854 and the low torque indication 844 are applied. The switch 856 operates as follows.

If the Q output 850 is set to 1 (one of the first and second situations causing the issuance of the loading request 820), the switch 856 outputs the value of the low torque indication 844. At the time, the value of the low torque indication 844 is expected be set to 0 because wheel slip events causing the setting of the S input of the flip flop box 848 are generally not expected to occur at very low engine torque values. If the Q output 850 is set to 1 and the low torque indication is set to 0, the switch 856 does not issue the unlocking request 858.

If the Q output 850 is set to 0 (none of the first and second uses causing the issuance of the loading request 820) and if the load line indication 854 is set to 1, the switch 856 outputs the unlocking request 858, the torque demand by the user not exceeding the engine load line at that time (the third situation not causing the issuance of the loading request 820). If the Q output 850 is set to 0 and the load line indication 854 is set to 0, the switch 856 does not issue the unlocking request 858.

FIGS. 19a to 19e provide logic diagrams showing operations of a method for controlling the LSD 302 based on driving conditions. A sequence 900 comprises a plurality of operations that may be executed in variable order, some of the operations possibly being executed concurrently, some of the operations being optional. The sequence 900 may be implemented in a vehicle, for example the vehicle 40. In the sequence 900, operation 910 comprises determining at least one parameter indicative of a riding condition of the vehicle 40. Based on the at least one parameter, a slippery driving condition is detected at operation 920. In response to the detection made at operation 930, the LSD 302 is selectively locked at operation 930. The LSD 302 may be selectively unlocked at operation 940 when the slippery driving condition is no longer detected.

Operations 910 and 920 may optionally comprise sub-sequences 950 or 960, 970 or 980 (FIGS. 19b to 19e) or a combination of these sub-sequences.

In sub-sequence 950, sub-operations 952 and 954 respectively comprise determining a speed of the vehicle 40 and a torque of the engine 62. The slippery driving condition is detected at sub-operation 956 by determining that the torque of the engine is above a load line of the engine 62 for the speed of the vehicle 40.

In sub-sequence 960, a rotational speed of the left wheel 44 and a rotational speed of the right wheel 44 are determined at sub-operation 962, following which the rotational speeds of the left and right wheels 44 are compared at sub-operation 964. A wheel slip occurrence is detected at sub-operation 966 if a difference between the rotational speeds of the left and right wheels 44 exceeds a predetermined maximum difference in rotational speeds. The predetermined maximum difference in rotational speeds may be set to zero (0) RPM or to a larger value.

Sub-sequence 970 comprises the sub-sequence 960 for detecting wheel slip occurrences. The sub-sequence 960 is repeated multiple times and a count of the number of wheel slip occurrences is taken at sub-operation 972 The slippery driving condition is detected at sub-operation 974 when the number of wheel slip occurrences exceeds a predetermined number of wheel slip occurrences, for example three (3) wheel slip occurrences. Operation 976 may eventually detect that the torque of the engine is lower than a low threshold value, in which case operation 978 resets the counter of the number of wheel slip occurrences. Optionally, the counter of the number of wheel slip occurrences may also be reset when no such occurrence has been detected over a predetermined period of time.

In sub-sequence 980, a preload is applied to the LSD 302 at sub-operation 982. A wheel slip occurrence is detected at sub-sequence 960. The slippery driving condition is detected at sub-operation 984 because the wheel slip is detected while the LSD 302 is preloaded.

Each of the operations of the sequence 900 may be configured to be processed by one or more processors, the one or more processors being coupled to a memory, for example the processor 602 and the memory 604 of the control unit illustrated in FIG. 14.

In an implementation, the input port 606 receives signals and measurements from the wheel speed sensors 376, 378, from the vehicle speed sensor 380, and from the engine torque monitor 394. The output port 608 provides commands to the actuator 372 of the LSD 302 and to the solenoid 382 for loading and/or locking the LSD 302. The memory 604 stores configuration information for the control of the LSD 302, including for example a predetermined maximum difference in rotational speeds of the wheels 44 for wheel slip detection, a predetermined number of wheel slip occurrences for the detection of successive wheel slips, the load line mapping table 824, a wheel dimension and/or the low torque set-point 842.

In operation, the processor 602 analyses measurements and signals from one or more of the wheel speed sensors 376, 378, the vehicle speed sensor 380, and the engine torque monitor 394. The processor 602 detects a slippery driving condition based on at least one parameter indicative of a riding condition of the vehicle 40, the at least one parameter being received at the input port 606. The processor 602 controls, via the output port 608, locking of the LSD 302 in response to the detection of the slippery driving condition. In various implementations the processor 602 may detect the slippery driving condition using one or more of the following techniques.

For example, the processor 602 may compare the rotational speeds of the left and right wheels 44 reported by the wheel speed sensors 376, 378 and detect a wheel slip occurrence if a difference between the rotational speeds of the left and right wheels 44 exceeds the predetermined maximum difference in rotational speeds stored in the memory 604. The processor may detect the slippery driving condition when a number of wheel slip occurrences exceeds the predetermined number of wheel slip occurrences stored in the memory 604. As mentioned hereinabove, the counter for the number of wheel slip occurrences may be reset when the engine output torque 808 falls below a low torque set-point 842 or, optionally, after a predetermined period of time without any wheel slip occurrence.

In another example, the processor 602 causes the output port 608 to forward a command for applying a preload to the LSD 302, for example in response to the detection of a first wheel slip occurrence or for other reasons. The processor 602 detects a slippery driving condition when a wheel slip occurrence is detected while the preload is applied to the LSD 302.

In yet another example, the processor 602 may determine a vehicle speed based on the speed measurement received at the input port 606 from the vehicle speed sensor 380, or based on an average of the rotational speeds of the left and right front wheels 44 as measured by the wheel speed sensors 376, 378, factoring the dimension of the front wheels 44 to determine of the vehicle speed. The processor 602 then reads, from load line mapping table 824 stored in the memory 604, an expected engine torque value corresponding to the vehicle speed. The processor 602 detects the slippery driving condition when the engine output torque measurement exceeds the expected engine torque value.

When the processor 602 has caused the LSD 302 to lock in response to the detection of a slippery driving condition, the processor 602 may eventually control unlocking of the LSD 302. To this end, the processor 602 may detect, based on one or more readings from the various sensors, that none of the conditions for the detection of the slippery driving condition remains. The processor 602 may then control, via the output port 608, the unlocking of the LSD 302. In particular, the processor 602 may implement the various blocks of the block diagram 800.

Control of the LSD 302 Based on an Accelerator Control Position (Trail Active Mode)

A still further aspect of the present technology provides control of the LSD 302 connected to the driven wheels 44 of the vehicle 40, this control being based at least in part on the accelerator control position. Heavy actuation of the accelerator control, in what is colloquially called a "holeshot start" may, under some conditions, cause the application of a high load to the LSD 302 in order to prevent wheel spin. In view of enhancing directional stability, a stabilization load may also be applied to the LSD 302 when a speed of the vehicle 40 meets or exceeds a predetermined threshold. In at least one implementation, the high load applied to the LSD 302 upon heavy actuation of the accelerator control may be a maximum possible load that can be provided by the electric motor 288.

In an implementation, the user of the vehicle 40 can activate this feature, for example by setting the toggle switch 65 (FIG. 3) to the trail active mode. Upon heavy actuation of the accelerator control by the user at very low vehicle speed, for example upon a standing start, the control unit 370 may cause the application of a high load to the LSD 302. This is expected to prevent wheel spin before it actually occurs, or at least significantly reduce the amount of wheel spin occurring as a result of high initial acceleration. A stabilization load is also selectively applied to the LSD 302 when the vehicle speed exceeds a predetermined speed threshold. This stabilization load reduces potential slipping of the front wheels 44 at high vehicle speeds, and thus improves the directional stability of the vehicle 40.

Figure 20:
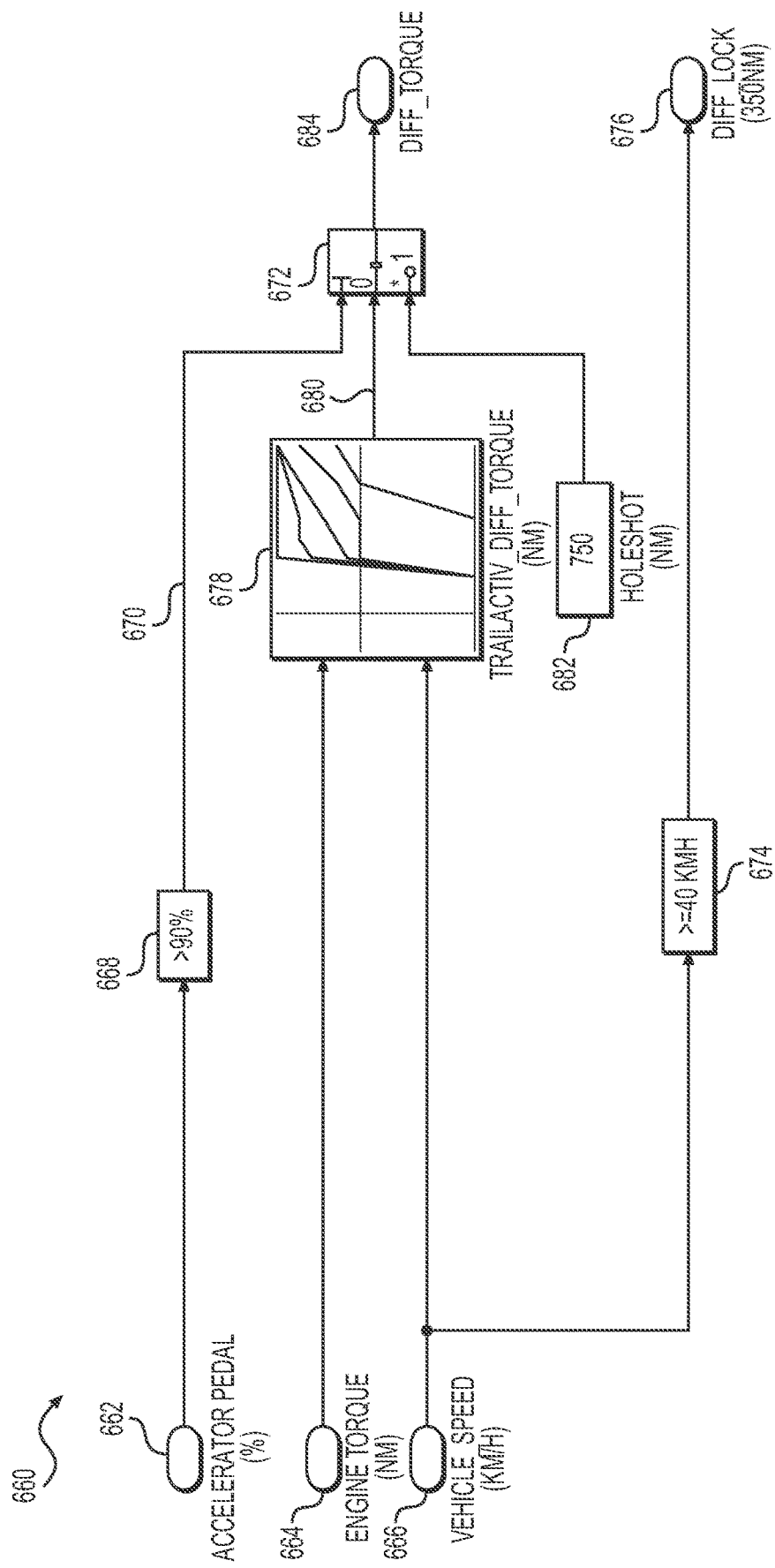
FIG. 20 is a block diagram showing internal operations of the control unit for controlling the LSD in trail active mode, according to an implementation.

FIG. 20 is a block diagram showing internal operations of the control unit 370 for controlling the LSD 302 in trail active mode, according to an implementation. A block diagram 660 shows that up to three (3) inputs may be used by the control unit 370 to load the LSD in trail active mode. It is contemplated that, in an implementation, the control unit 370 may use additional inputs to determine in the trail active mode. One such input is a current accelerator position 662, expressed in percentage, this value being provided to the control unit 370 by the accelerator control sensor 392. A minimum actuation of the accelerator control, for example a complete release of the accelerator pedal 91, may be expressed as a 0% value. A maximum actuation of the accelerator control, for example a complete depression of the accelerator pedal 91 may be expressed as a 100% value. Another input is a current engine output torque 664, expressed in Nm, this value being provided to the control unit 370 by the engine torque monitor 394. Yet another input is a vehicle speed 666 that may be provided to the control unit 370 by the vehicle speed sensor 380. Alternatively, the vehicle speed 666 may equivalently be based on measurements, by the wheel speed sensors 376, 378 of rotational speeds of the left and right wheels 44, the vehicle speed 666 being deduced by the control unit 370 based on these measurements and on dimensions of the front wheels 44. These inputs are applied to various blocks within the block diagram 660.

The accelerator position 662 is applied to an accelerator position threshold block 668 that defines a predetermined accelerator position threshold that may generally be considered as indicative of a full actuation of the accelerator control. This threshold is for example at a 90% depression of the accelerator pedal 91 in the non-limiting example of FIG. 20. Other threshold values up to 100% as well as lower values are also contemplated. When the accelerator position 662 meets or exceeds the predetermined accelerator position threshold, the accelerator position threshold block 668 issues a loading command 670 applied as a first input to a switch 672.

The vehicle speed 666 is applied to a steering stabilization threshold block 674 that defines a predetermined speed threshold. That threshold is at 40 KMH in the non-limiting example of FIG. 20. Higher and lower threshold values are also contemplated. When the vehicle speed 666 meets or exceeds the predetermined speed threshold, the steering stabilization threshold block 674 issues a torque assignment 676 defining a fixed torque value, for example 350 Nm, this value being selected so that a stabilization load is applied to the LSD 302, the stabilization load being less than the high load. In order to prevent overheating of the electric motor 288, application of the stabilization load to the LSD 302 be followed by a command to lock the LSD 302 by activation of the solenoid 382, following which the electric motor 288 can be de-energized.

The engine output torque 664 and vehicle speed 666 are both applied to a trail active mapping table. The trail active mapping table is illustrated as a block 678 on FIG. 20. The block 678 provides a graphical representation of the trail active mapping table. Table VI provides a non-limiting example of a content of a trail active mapping table that may be used by the control unit 370 to control the application of a load to the LSD 302. As in the case of Tables II and III, Table VI shows torque values for application on the clutch 374 of the LSD 302, in Newton-meters (Nm), as a function of the output torque of the engine 62, also in Nm, and as a function of a speed of the vehicle 40, the speed being expressed both in kilometers per hour (KMH) and as an average of the rotational speeds of the left and right wheels 44 in revolutions per minute (RPM).

TABLE VI

| | | Average Wheel Speed (RPM) | | | | | | | |
|---|---|---|---|---|---|---|---|---|---|
| | | 0 | 50 | 100 | 150 | 200 | 250 | 300 | 400 |
| | | Vehicle Speed (KMH) | | | | | | | |
| | | 0.0 | 6.7 | 13.3 | 20.0 | 26.7 | 33.3 | 40.0 | 53.3 |
| Engine Output | −20 | Null | Null | Null | Null | Null | Null | Null | Null |
| | 10 | Null | Null | Null | Null | Null | Null | Null | Null |

TABLE VI-continued

| | | Average Wheel Speed (RPM) | | | | | | | |
|---|---|---|---|---|---|---|---|---|---|
| | | 0 | 50 | 100 | 150 | 200 | 250 | 300 | 400 |
| | | Vehicle Speed (KMH) | | | | | | | |
| | | 0.0 | 6.7 | 13.3 | 20.0 | 26.7 | 33.3 | 40.0 | 53.3 |
| Torque (Nm) | 20 | Null | Null | Null | Null | Null | Null | Null | Null |
| | 30 | Null | Null | Null | 0 | 50 | 200 | 350 | Null |
| | 40 | Null | Null | Null | 0 | 100 | 250 | 350 | Null |
| | 50 | Null | Null | Null | 0 | 150 | 250 | 350 | Null |
| | 70 | Null | Null | 0 | 100 | 250 | 300 | 350 | Null |
| | 90 | Null | Null | 100 | 250 | 350 | 350 | 350 | Null |

Application of engine output torque 664 and of the vehicle speed 666 to the trail active mapping table yields a torque value 680, which may be a Null value, the torque value 680 being output by the block 678. The torque value 680 is a second input to the switch 672. A third input to the switch 672 is a predetermined, high loading torque parameter 682, having a value of 750 Nm in the present implementation.

The switch 672 operates as follows. If the loading command 670 is present at its first input, the switch 672 issues a distinct torque assignment 684 having a value equal to the predetermined, high loading torque parameter 682. If the loading command 670 is not present at the first input of the switch 672, the torque assignment 684 is set to the torque value 680, which may have a Null value.

It may be noted that, in the implementation of FIG. 20, the accelerator position threshold block 668 may issue the loading command 670 at any vehicle speed, provided that the current accelerator position 662 meets or exceeds the predetermined position threshold. For that reason, the torque assignment 684 may be set to the 750 Nm torque value of the high loading torque parameter 682 whenever the accelerator control is fully engaged. The effect of the loading command 670 may be ignored by the control unit 370 when the control unit 370 selects the torque assignment 676 due to it being a nonzero value, as is the case when the vehicle speed 666 is at least 40 KMH, effectively negating the effect of the torque assignment 684 and of the loading command 670. When the torque assignment 676 is at zero because the vehicle speed is less than 40 KMH, the control unit 370 selects the torque assignment 684, which may either have a zero or a nonzero value and may be equal to the 750 Nm torque value when the loading command 670 is present. The control unit 370 causes the application on the clutch 374 of the LSD 302 of the selected one of the torque assignments 676 or 684, if one of the torque assignments 676 and 684 is greater than zero.

Figure 21:
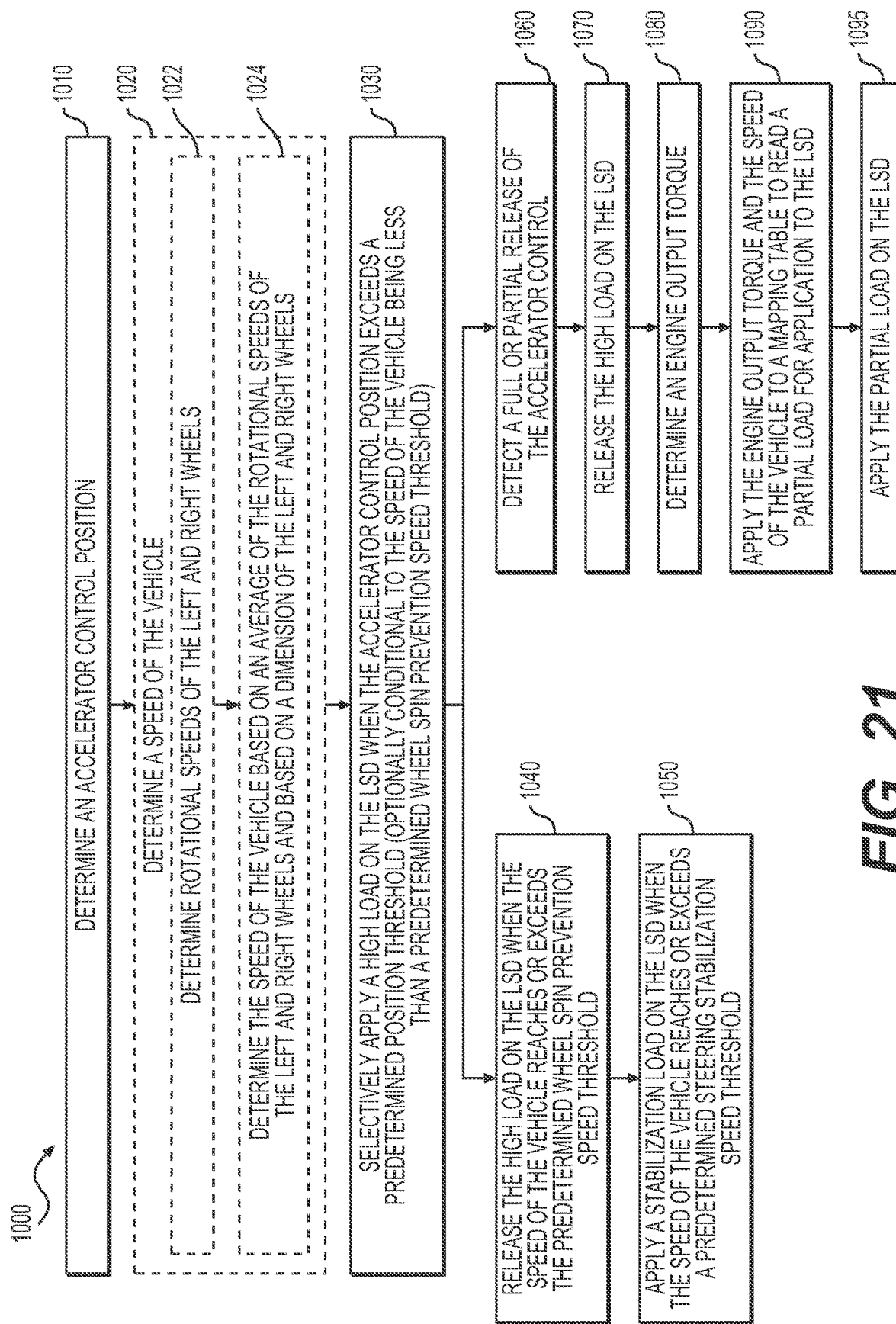
FIG. 21 is a logic diagram showing operations of a method for controlling a limited slip differential based on an accelerator control position.

FIG. 21 is a logic diagram showing operations of a method for controlling the LSD 302 based on an accelerator control position. A sequence 1000 comprises a plurality of operations that may be executed in variable order, some of the operations possibly being executed concurrently, some of the operations being optional. The sequence 1000 may be implemented in a vehicle, for example the vehicle 40. The vehicle 40 has an engine, for example the engine 62, the engine having a throttle operatively connected to the accelerator control, for example, the accelerator pedal 91, and a limited slip differential (LSD), for example the LSD 302.

In the sequence 1000, operation 1010 comprises determining an accelerator control position by the accelerator control sensor 392. Optionally, a speed of the vehicle 40 may be determined at operation 1020. In an implementation, operation 1020 may comprise reading the speed of the vehicle 40 from the vehicle speed sensor 380. In another implementation, operation 1020 may comprise sub-operations 1022 and 1024. In sub-operation 1022, rotational speeds of the left and right wheels 44 are determined by the wheel speed sensors 376, 378. The speed of the vehicle 40 is then determined at sub-operation 1024 based on an average of the rotational speeds of the left and right wheels 44 and based on a dimension of the left and right wheels 44.

Regardless, a high load is selectively applied to the LSD 302 at operation 1030, provided that the accelerator control position meets or exceeds a predetermined position threshold. The predetermined position threshold may generally be considered as indicative of a heavy actuation of the accelerator control, for example 90%. Optionally, selectively applying the high load may be conditional to the speed of the vehicle 40 being less than the predetermined speed threshold, for example the 40 KMH value defined by the steering stabilization threshold block 674 of FIG. 20.

The application of the high load to the LSD 302 may optionally be followed by the energizing of the solenoid 382 to lock the LSD 302, using the technique described in the foregoing description of FIG. 9.

In an implementation where the speed of the vehicle 40 is determined, operation 1040 may comprise releasing the high load when the speed of the vehicle 40 meets or exceeds the predetermined speed threshold. In the same or another implementation, operation 1050 may comprise applying a stabilization load when the speed of the vehicle 40 meets or exceeds the predetermined speed threshold. In the example of FIG. 20, the steering stabilization threshold block 674 defines the predetermined speed threshold.

Regardless, when a full or partial release of the accelerator control is detected at operation 1060, the high load is released at operation 1070. A partial release of the accelerator control may for example be detected as soon as the accelerator control sensor 392 reports an accelerator control position that no longer meets or exceeds the predetermined position threshold.

While the high load is not applied to the LSD 302, the accelerator control position being less than the predetermined position threshold, the control unit 370 may, at operation 1090, apply the engine output torque and the speed of the vehicle to the trail active mapping table to read a value of a partial load for application to the LSD. The control unit 370 controls the application of the partial load to the LSD at operation 1095. The partial load applied to the LSD is in most circumstances lower than the high load.

The values of the predetermined position threshold and of the predetermined speed threshold are illustrative only and do not limit the present disclosure.

Figure 22:
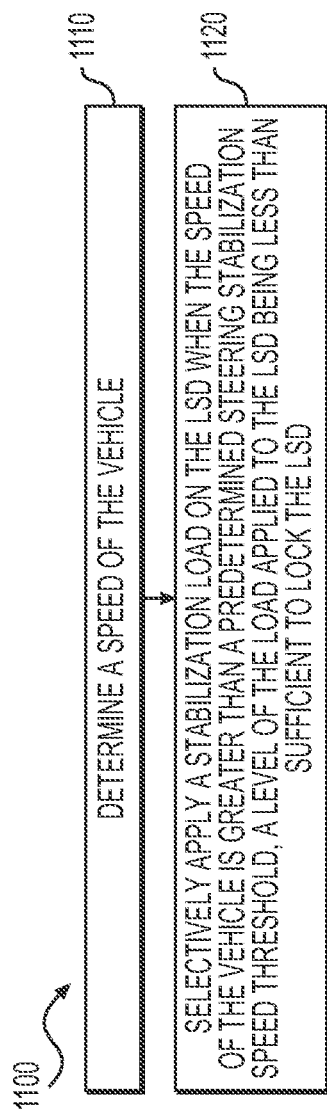
FIG. 22 is a logic diagram showing operations of a method for controlling a limited slip to stabilize the steering of a vehicle.

FIG. 22 is a logic diagram showing operations of a method for controlling the LSD 302 to stabilize the steering of a vehicle. A sequence 1100 also comprises a plurality of operations that may be executed in variable order, some of the operations possibly being executed concurrently, some of the operations being optional. The sequence 1100 may also be implemented in vehicle 40.

A speed of the vehicle 40 is determined at operation 1110. As in the case of sequence 1100, the speed of the vehicle 40 may be determined based on measurements provided by the vehicle speed sensor 380 or by the wheel speed sensors 376, 378. A stabilization load is selectively applied to the LSD 302 at operation 1120 when the speed of the vehicle 40 is greater than the predetermined speed threshold. In this manner, directional stability of the vehicle 40 is enhanced.

In an implementation, the vehicle 40 may implement the sequence 1000 described hereinabove with reference to FIG. 21. In another implementation, the vehicle 40 may implement the sequence 1100 described hereinabove with reference to FIG. 22. In yet another implementation, the vehicle 40 may implement both sequences 1000 and 1100. These sequences may therefore be implemented independently or jointly.

Each of the operations of the sequences 1000 and 1100 may be configured to be processed by one or more processors, the one or more processors being coupled to a memory, for example the processor 602 and the memory 604 of the control unit illustrated in FIG. 14.

In an implementation, the input port 606 receives signals and measurements from the accelerator control sensor 392 and, optionally, from the wheel speed sensors 376, 378 and/or the vehicle speed sensor 380. The output port 608 provides control commands to the actuator 372 of the LSD 302 and to the solenoid 382 for loading and/or locking the LSD 302. The memory 604 stores configuration information for the control of the LSD 302, including for example a dimension of the left and right wheels 44, the predetermined position threshold and, optionally, the predetermined speed threshold, and/or the trail active mapping table.

In operation, the processor 602 determines the control commands for controlling a selective application of a high load to the LSD 302 when the accelerator control position indicated by the accelerator control sensor 392 meets or exceeds the predetermined position threshold stored in the memory 604. The processor 602 may receive a measurement of the speed of the vehicle 40 from the vehicle speed sensor 380 or determine the speed of the vehicle 40 based on an average of the rotational speeds of the left and right wheels 44 provided by the wheel speed sensors 376, 378 and based on a dimension of the left and right wheels 44. Regardless, if the speed of the vehicle 40 is available, the processor 602 may control the selective application of the high load to the LSD 302 when the accelerator control position indicated by the accelerator control sensor 392 meets or exceeds the predetermined position threshold on the condition that the speed of the vehicle 40 is less than the predetermined speed threshold stored in the memory 604. The processor 602 may cause the output port 608 to stop the control command for the application of the high load to the LSD 302 when informed by the accelerator control sensor 392 that the accelerator control position falls below the predetermined position threshold or when the vehicle speed meets of exceeds the predetermined speed threshold.

In an implementation, the control command forwarded by the output port 608 causes the actuator 372 to apply the high load may be followed by another control command for locking of the LSD 302 by the solenoid 382.

Independently from the accelerator control position, if the speed of the vehicle 40 is known, the processor 602 may determine that the speed of the vehicle 40 is greater than the predetermined speed threshold stored in the memory 604. In that case, the processor 602 may cause the output port 608 to forward a control command to the LSD 302 for the application of a stabilization load. The stabilization load limits, without preventing, a rotational speed difference between the left and right wheels 44 of the vehicle 40 to enhance directional stability.

The processor 602 may receive, via the input port 606, an engine output torque value provided by the engine torque monitor 394. The processor applies the speed of the vehicle and the engine output torque value to the trail active mapping table stored in the memory 604 to read a value of a partial load for application to the LSD 302. This partial load is expressed in terms of a torque for application on the clutch 374. If the accelerator control position is less than the predetermined position threshold, the processor 602 may cause the output port 608 to forward a control command for controlling an application of the partial load to the LSD 302. Referring again to FIG. 20, it may be observed that if the loading command 670 is present at the input of the switch 672, any partial load value from the trail active mapping table is ignored by the switch 672. It may further be observed that if the torque assignment 676 has a nonzero value, any partial load value from the trail active mapping table is also ignored by the control unit 370.

The present disclosure introduces various techniques for controlling the LSD 302, these techniques being exemplified in the diagrams of FIGS. 12a, 12b, 13, 15, 16, 17, 19a-e, 20, 21 and 22. A particular implementation of limited slip differential assembly 300 mounted in a particular vehicle 40 may integrate any one of these techniques. Another implementation may integrate all of these techniques. Yet another implementation may integrate any combination of these techniques.

The method, differential assembly and vehicle implemented in accordance with some non-limiting implementations of the present technology can be represented as follows, presented in numbered clauses.

Clauses

[Clause 1] A method of controlling a limited slip differential (LSD) of a vehicle, the vehicle having a steering device, the LSD, and left and right driven wheels operably connected to the LSD, the method comprising:

determining rotational speeds of the left and right driven wheels;

calculating a current wheel slip as a rotational speed difference between one of the left and right driven wheels and the other one of the left and right driven wheels;

determining a current angle of the steering device;

calculating a maximum allowed wheel slip and a minimum allowed wheel slip as a function of the current angle of the steering device;

detecting that the current wheel slip is outside a range between the maximum and minimum allowed wheel slips; and in response to detecting that the current wheel slip is outside the range between the maximum and minimum allowed wheel slips, loading the LSD.

[Clause 2] The method of clause 1, wherein calculating the maximum allowed wheel slip and the minimum allowed wheel slip as a function of the current angle of the steering device comprises:

determining an average of the rotational speeds of the left and right driven wheels;

calculating an expected wheel slip based on:
  a ratio between the current angle of the steering device and a maximum steering angle,
  the average of the rotational speeds of the left and right driven wheels, and
  a slip ratio for the vehicle;

while the LSD is not loaded, calculating the maximum allowed wheel slip by adding a slip margin to the expected wheel slip; and while the LSD is not loaded, calculating the minimum allowed wheel slip by subtracting the slip margin from the expected wheel slip.

[Clause 3] The method of clause 2, wherein the slip margin is selected based on the average of the rotational speeds of the left and right driven wheels.

[Clause 4] The method of clause 2 or 3, further comprising, while the LSD is loaded:
calculating the maximum allowed wheel slip as the greater of:
the slip margin, and
a sum of the expected wheel slip and the slip margin, and
calculating the minimum allowed wheel slip as the lesser of:
zero minus the slip margin, and
the expected wheel slip minus the slip margin.

[Clause 5] The method of clause 4, wherein a loading level of the LSD is calculated based on a magnitude of an excess of the current wheel slip in relation to the range between the maximum and minimum allowed wheel slips.

[Clause 6] The method of clause 4 or 5, further comprising, after loading the LSD in response to detecting that the current wheel slip is outside the range between the maximum and minimum allowed wheel slips:
detecting that the current wheel slip has returned within the range between the maximum and minimum allowed wheel slips; and
in response to detecting that the current wheel slip has returned within the range between the maximum and minimum allowed wheel slips, unloading the LSD.

[Clause 7] The method of clause 6, wherein unloading the LSD comprises gradually unloading the LSD.

[Clause 8] The method of any one of clauses 1 to 4, wherein loading the LSD comprises compressing a clutch of the LSD to reduce the rotational speed difference between the left and right driven wheels.

[Clause 9] The method of clause 8, wherein compressing the clutch of the LSD comprises using an electric motor to drive a gear set and a ball ramp to apply a torque on the clutch.

[Clause 10] The method of clause 9, wherein compressing the clutch of the LSD further comprises using a solenoid to lock the gear set.

[Clause 11] The method of any one of clauses 8 to 10, further comprising:
in response to detecting that the current wheel slip is outside the range between the maximum and minimum allowed wheel slips, calculating an initial torque for application to the clutch;
following the application of the initial torque on the clutch:
increasing the torque applied on the clutch if the current wheel slip is still outside the range between the maximum and minimum allowed wheel slips;
decreasing the torque applied on the clutch if the current wheel slip falls within the range between the maximum and minimum allowed wheel slips; and
terminating the loading to the LSD when the torque applied on the clutch falls to zero.

[Clause 12] A differential assembly for use in a vehicle having a steering device and left and right driven wheels, the differential assembly comprising:
a limited slip differential (LSD) operatively connectable to a driveshaft and to the left and right driven wheels, the LSD being adapted for transferring torque from the driveshaft to the left and right driven wheels;
a steering angle sensor operatively connectable to the steering device;
wheel speed sensors operatively connectable to the left and right driven wheels; and
a control unit operatively connected to the LSD, to the steering angle sensor and to the wheel speed sensors, the control unit being adapted for:
calculating, based on measurements of rotational speeds of the left and right driven wheels received from the wheel speed sensors, a current wheel slip as a rotational speed difference between one of the left and right driven wheels and the other one of the left and right driven wheels;
calculating, based on a measurement received from the steering angle sensor, a maximum allowed wheel slip and a minimum allowed wheel slip as a function of a current angle of the steering device;
detect that the current wheel slip is outside a range between the maximum and minimum allowed wheel slips; and
in response to detecting that the current wheel slip is outside the range between the maximum and minimum allowed wheel slips, controlling loading of the LSD.

[Clause 13] The differential assembly of clause 12, further comprising an electric motor, wherein the control unit commands the electric motor to load the LSD.

[Clause 14] The differential assembly of clause 13, wherein the LSD further comprises a compressible clutch and wherein the electric motor loads the LSD by applying a torque on the clutch.

[Clause 15] The differential assembly of clause 14, wherein the LSD further comprises a gear set and a ball ramp, the gear set being adapted for transferring the torque from the electric motor to the ball ramp for compressing the clutch.

[Clause 16] The differential assembly of clause 15, further comprising a solenoid having a tooth adapted for engaging the gear set when the solenoid is energized, wherein the control unit is further adapted for controlling the solenoid for locking the LSD.

[Clause 17] The differential assembly of clause 16, wherein the control unit is further adapted for controlling the LSD to apply a maximum load before locking the LSD.

[Clause 18] The differential assembly of any one of clauses 12 to 17, wherein the control unit comprises:
an input port adapted for receiving measurements from the steering angle sensor and from the wheel speed sensors;
an output port adapted for forwarding control commands to the LSD; and
a processor operatively connected to the input port and to the output port, the processor being adapted for:
calculating the maximum and minimum allowed wheel slips;
calculating the current wheel slip;
detecting that the current wheel slip is outside the range between the maximum and minimum allowed wheel slips; and
in response to detecting that the current wheel slip is outside the range between the maximum and minimum allowed wheel slips, causing the output port to forward a control command for loading the LSD.

[Clause 19] The differential assembly of clause 18, wherein:
the control unit further comprises a memory storing configuration information for controlling the LSD;
the processor is operatively connected to the memory; and
the configuration information comprises:
a maximum steering angle for the vehicle,
a slip ratio for the vehicle, and
a slip mapping table of relations between values of the slip margin speed values for the left and right driven wheels.

[Clause 20] The differential assembly of clause 19, wherein the processor is further adapted for:

determining an average of the rotational speeds of the left and right driven wheels;
calculating an expected wheel slip based on:
a ratio between the current angle of the steering device and a maximum steering angle,
the average of the rotational speeds of the left and right driven wheels, and
a slip ratio for the vehicle;
reading from the slip mapping table a slip margin for the average of the rotational speeds of the left and right driven wheels;
while the LSD is not loaded, calculating the maximum allowed wheel slip by adding the slip margin to the expected wheel slip; and
while the LSD is not loaded, calculating the minimum allowed wheel slip by subtracting the slip margin from the expected wheel slip.

[Clause 21] The differential assembly of clause 20, wherein the processor is further adapted for, while the LSD is loaded:
calculating the maximum allowed wheel slip as the greater of:
the slip margin, and
a sum of the expected wheel slip and the slip margin, and
calculating the minimum allowed wheel slip as the lesser of:
zero minus the slip margin, and
the expected wheel slip minus the slip margin.

[Clause 22] The differential assembly of clause 21, wherein the processor is further adapted for:
calculating a loading level of the LSD based on a magnitude of an excess of the current wheel slip in relation to the range between the maximum and minimum allowed wheel slips; and
configuring the control command to load the LSD according to the calculated loading level.

[Clause 23] The differential assembly of clause 21, wherein the processor is further adapted for, after causing the output port to forward the control command for loading the LSD:
cause the output port to forward a control command to increase the load to the LSD if the current wheel slip is still outside the range between the maximum and minimum allowed wheel slips; and
cause the output port to forward a control command to decrease the load to the LSD if the current wheel slip falls within the range between the maximum and minimum allowed wheel slips.

[Clause 24] A vehicle, comprising:
a frame;
a front suspension assembly connected to the frame;
a rear suspension assembly connected to the frame;
a left driven wheel and a right driven wheel connected to one of the front and rear suspension assemblies;
at least one other wheel connected to an other one of the front and rear suspension assemblies;
a steering device operatively connected to one of both driven wheels and the at least one other wheel;
an engine connected to the frame;
a transmission operatively connected to the engine for receiving torque from the engine;
a driveshaft operatively connected to the transmission for transferring torque from the transmission to the left and right driven wheels; and
the differential assembly of any one of clauses 12 to 23, the LSD being operatively connected to the driveshaft and operatively connected to the left and right driven wheels.

[Clause 25] The vehicle of clause 24, further comprising:
a transaxle for transferring torque from the transmission to the at least one other wheel; and
a selector adapted for selectively operatively connecting the LSD to the driveshaft.

Modifications and improvements to the above-described implementations of the present technology may become apparent to those skilled in the art. For example, it is contemplated that the LSD 302 may be mounted at the rear of the vehicle 40 and operatively connected to the rear wheels 48, whether the vehicle 40 has a two-wheel drive or an all-wheel drive configuration. The foregoing description is intended to be exemplary rather than limiting. The scope of the present technology is therefore intended to be limited solely by the scope of the appended claims.

What is claimed is:

1. A method of controlling a limited slip differential (LSD) of a vehicle, the vehicle having a steering device, the LSD, and left and right driven wheels operably connected to the LSD, the method comprising:
determining rotational speeds of the left and right driven wheels;
calculating a current wheel slip as a rotational speed difference between one of the left and right driven wheels and the other one of the left and right driven wheels;
determining a current angle of the steering device;
calculating a maximum allowed wheel slip and a minimum allowed wheel slip as a function of the current angle of the steering device;
detecting that the current wheel slip is outside a range between the maximum and minimum allowed wheel slips; and
in response to detecting that the current wheel slip is outside the range between the maximum and minimum allowed wheel slips, loading the LSD to reduce the rotational speed difference between the one of the left and right driven wheels and the other one of the left and right driven wheels.

2. The method of claim 1, wherein calculating the maximum allowed wheel slip and the minimum allowed wheel slip as a function of the current angle of the steering device comprises:
determining an average of the rotational speeds of the left and right driven wheels;
calculating an expected wheel slip based on:
a ratio between the current angle of the steering device and a maximum steering angle,
the average of the rotational speeds of the left and right driven wheels, and
a slip ratio for the vehicle;
while the LSD is not loaded, calculating the maximum allowed wheel slip by adding a slip margin to the expected wheel slip; and
while the LSD is not loaded, calculating the minimum allowed wheel slip by subtracting the slip margin from the expected wheel slip.

3. The method of claim 2, wherein the slip margin is selected based on the average of the rotational speeds of the left and right driven wheels.

4. The method of claim 2, further comprising, while the LSD is loaded:
calculating the maximum allowed wheel slip as the greater of:
the slip margin, and
a sum of the expected wheel slip and the slip margin; and calculating the minimum allowed wheel slip as the lesser of:
  zero minus the slip margin, and
  the expected wheel slip minus the slip margin.

5. The method of claim 4, wherein a loading level of the LSD is calculated based on one of (i) the current wheel slip minus the maximum allowed wheel slip if the current wheel slip is greater than the maximum allowed wheel slip and (ii) the minimum allowed wheel slip minus the current wheel slip if the current wheel slip is less than the minimum allowed wheel slip.

6. The method of claim 4, further comprising, after loading the LSD in response to detecting that the current wheel slip is outside the range between the maximum and minimum allowed wheel slips:
  detecting that the current wheel slip has returned within the range between the maximum and minimum allowed wheel slips; and
  in response to detecting that the current wheel slip has returned within the range between the maximum and minimum allowed wheel slips, terminating the loading to the LSD.

7. The method of claim 1, wherein loading the LSD comprises compressing a clutch of the LSD to reduce the rotational speed difference between the left and right driven wheels.

8. The method of claim 7, further comprising:
  in response to detecting that the current wheel slip is outside the range between the maximum and minimum allowed wheel slips, calculating an initial torque for application to the clutch; and
  following the application of the initial torque on the clutch:
    increasing the torque applied on the clutch if the current wheel slip is still outside the range between the maximum and minimum allowed wheel slips, and
    decreasing the torque applied on the clutch if the current wheel slip falls within the range between the maximum and minimum allowed wheel slips.

9. A differential assembly for use in a vehicle having a steering device and left and right driven wheels, the differential assembly comprising:
  a limited slip differential (LSD) operatively connectable to a driveshaft and to the left and right driven wheels, the LSD being adapted for transferring torque from the driveshaft to the left and right driven wheels;
  a steering angle sensor operatively connectable to the steering device;
  wheel speed sensors operatively connectable to the left and right driven wheels; and
  a control unit operatively connected to the LSD, to the steering angle sensor and to the wheel speed sensors, the control unit being adapted for:
    calculating, based on measurements of rotational speeds of the left and right driven wheels received from the wheel speed sensors, a current wheel slip as a rotational speed difference between one of the left and right driven wheels and the other one of the left and right driven wheels,
    calculating, based on a measurement received from the steering angle sensor, a maximum allowed wheel slip and a minimum allowed wheel slip as a function of a current angle of the steering device,
    detect that the current wheel slip is outside a range between the maximum and minimum allowed wheel slips, and
    in response to detecting that the current wheel slip is outside the range between the maximum and minimum allowed wheel slips, controlling loading of the LSD to reduce the rotational speed difference between the one of the left and right driven wheels and the other one of the left and right driven wheels.

10. The differential assembly of claim 9, further comprising an electric motor, wherein the control unit commands the electric motor to load the LSD.

11. The differential assembly of claim 10, wherein the LSD further comprises a compressible clutch and wherein the electric motor loads the LSD by applying a torque on the clutch.

12. The differential assembly of claim 11, wherein the LSD further comprises a gear set and a ball ramp, the gear set being adapted for transferring the torque from the electric motor to the ball ramp for compressing the clutch, the differential assembly further comprising a solenoid having a tooth adapted for engaging the gear set when the solenoid is energized, the control unit being further adapted for controlling the solenoid for locking the LSD.

13. The differential assembly of claim 12, wherein the control unit is further adapted for controlling the LSD to apply a maximum load before locking the LSD.

14. The differential assembly of claim 9, wherein the control unit comprises:
  an input port adapted for receiving measurements from the steering angle sensor and from the wheel speed sensors;
  an output port adapted for forwarding control commands to the LSD; and
  a processor operatively connected to the input port and to the output port, the processor being adapted for:
    calculating the maximum and minimum allowed wheel slips,
    calculating the current wheel slip,
    detecting that the current wheel slip is outside the range between the maximum and minimum allowed wheel slips, and
    in response to detecting that the current wheel slip is outside the range between the maximum and minimum allowed wheel slips, causing the output port to forward a control command for loading the LSD.

15. The differential assembly of claim 14, wherein:
  the control unit further comprises a memory storing configuration information for controlling the LSD;
  the processor is operatively connected to the memory; and
  the configuration information comprises:
    a maximum steering angle for the vehicle,
    a slip ratio for the vehicle, and
    a slip mapping table of relations between values of the slip margin and speed values for the left and right driven wheels.

16. The differential assembly of claim 15, wherein the processor is further adapted for:
  determining an average of the rotational speeds of the left and right driven wheels;
  calculating an expected wheel slip based on:
    a ratio between the current angle of the steering device and a maximum steering angle,
    the average of the rotational speeds of the left and right driven wheels, and
    a slip ratio for the vehicle;
  reading from the slip mapping table a slip margin for the average of the rotational speeds of the left and right driven wheels;

while the LSD is not loaded, calculating the maximum allowed wheel slip by adding the slip margin to the expected wheel slip; and while the LSD is not loaded, calculating the minimum allowed wheel slip by subtracting the slip margin from the expected wheel slip.

17. The differential assembly of claim 16, wherein the processor is further adapted for, while the LSD is loaded:

calculating the maximum allowed wheel slip as the greater of:
the slip margin, and
a sum of the expected wheel slip and the slip margin; and calculating the minimum allowed wheel slip as the lesser of:
zero minus the slip margin, and
the expected wheel slip minus the slip margin.

18. The differential assembly of claim 17, wherein the processor is further adapted for:

calculating a loading level of the LSD based on one of (i) the current wheel slip minus the maximum allowed wheel slip if the current wheel slip is greater than the maximum allowed wheel slip and (ii) the minimum allowed wheel slip minus the current wheel slip if the current wheel slip is less than the minimum allowed wheel slip; and configuring the control command to load the LSD according to the calculated loading level.

19. A vehicle, comprising:
a frame;
a front suspension assembly connected to the frame;
a rear suspension assembly connected to the frame;
a left driven wheel and a right driven wheel connected to one of the front and rear suspension assemblies;
at least one other wheel connected to an other one of the front and rear suspension assemblies;
a steering device operatively connected to one of both driven wheels and the at least one other wheel;
an engine connected to the frame;
a transmission operatively connected to the engine for receiving torque from the engine;
a driveshaft operatively connected to the transmission for transferring torque from the transmission to the left and right driven wheels; and
the differential assembly of claim 9, the LSD being operatively connected to the driveshaft and operatively connected to the left and right driven wheels.

20. The vehicle of claim 19, further comprising:
a transaxle for transferring torque from the transmission to the at least one other wheel; and
a selector adapted for selectively operatively connecting the LSD to the driveshaft.

* * * * *